US012253823B2

(12) United States Patent
Ando et al.

(10) Patent No.: US 12,253,823 B2
(45) Date of Patent: Mar. 18, 2025

(54) ELECTROPHOTOGRAPHIC PHOTORECEPTOR, PRODUCTION METHOD THEREFOR, ELECTROPHOTOGRAPHIC PHOTORECEPTOR CARTRIDGE, AND IMAGE FORMING APPARATUS

(71) Applicant: Mitsubishi Chemical Corporation, Tokyo (JP)

(72) Inventors: Akira Ando, Tokyo (JP); Atsushi Yoshizawa, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 690 days.

(21) Appl. No.: 17/505,988

(22) Filed: Oct. 20, 2021

(65) Prior Publication Data

US 2022/0043363 A1 Feb. 10, 2022

Related U.S. Application Data

(63) Continuation of application No. PCT/JP2020/017095, filed on Apr. 20, 2020.

(30) Foreign Application Priority Data

Apr. 22, 2019 (JP) ................................ 2019-081060

(51) Int. Cl.

| | |
|---|---|
| ***G03G 5/06*** | (2006.01) |
| ***G03G 5/147*** | (2006.01) |
| ***G03G 15/08*** | (2006.01) |

(52) U.S. Cl.

CPC ....... *G03G 5/0618* (2013.01); *G03G 5/14769* (2013.01); *G03G 5/14791* (2013.01); *G03G 15/0868* (2013.01)

(58) Field of Classification Search

CPC .................................................... G03G 5/0618

See application file for complete search history.

(56) References Cited

U.S. PATENT DOCUMENTS

| | | |
|---|---|---|
| 4,050,934 A | 9/1977 | Turner |
| 4,835,081 A | 5/1989 | Ong et al. |

(Continued)

FOREIGN PATENT DOCUMENTS

| | | |
|---|---|---|
| JP | S63-015254 A | 1/1988 |
| JP | H11-237751 A | 8/1999 |

(Continued)

OTHER PUBLICATIONS

English machine translation of the description of JP-2016090593-A (Year: 2016).*

(Continued)

*Primary Examiner* — Peter L Vajda
*Assistant Examiner* — Boone Alexander Evans
(74) *Attorney, Agent, or Firm* — Morgan, Lewis & Bockius LLP

(57) ABSTRACT

The present invention relates to an electrophotographic photoreceptor having a plurality of layers containing at least one outermost layer, wherein at least one of the outermost layer contains a polymer having a first structure where at least one carbonyl group is bonded to an aromatic group and a second structure represented by Formula (A). In Formula (A), at least two of $R^{11}$ to $R^{13}$ are groups represented by Formula (2), and in Formula (2), $R^{21}$ represents a hydrogen atom or a methyl group, and $R^{22}$ and $R^{23}$ each independently represent a hydrogen atom, a hydrocarbon group or an alkoxy group:

(Continued)

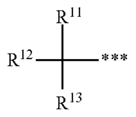

(A)

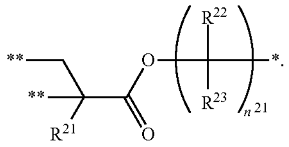

(2)

17 Claims, 1 Drawing Sheet

(56) References Cited

U.S. PATENT DOCUMENTS

| | | | | |
|---|---|---|---|---|
| 6,068,969 | A * | 5/2000 | Mikoshiba | G03C 7/39232 430/607 |
| 9,746,816 | B2 * | 8/2017 | Mizushima | G03G 5/04 |
| 2005/0266325 | A1 | 12/2005 | Yanagawa et al. | |
| 2008/0138725 | A1 | 6/2008 | Fujiwara et al. | |
| 2015/0099225 | A1 | 4/2015 | Bellino et al. | |

FOREIGN PATENT DOCUMENTS

| | | | | |
|---|---|---|---|---|
| JP | 2003-316038 | A | | 11/2003 |
| JP | 2004-126136 | A | | 4/2004 |
| JP | 2005-338222 | A | | 12/2005 |
| JP | 2006-039483 | A | | 2/2006 |
| JP | 2007-11005 | A | | 1/2007 |
| JP | 2008-026689 | A | | 2/2008 |
| JP | 2008-170767 | A | | 7/2008 |
| JP | 2016090593 | A | * | 5/2016 |
| JP | 2017-049547 | A | | 3/2017 |
| JP | 2020-033397 | A | | 3/2020 |

OTHER PUBLICATIONS

International Search Report issued in related International Patent Application No. PCT/JP2020/017095 dated Jul. 14, 2020.

Office Action issued in corresponding Japanese Patent Application No. 2021-516110 dated Aug. 8, 2023.

* cited by examiner

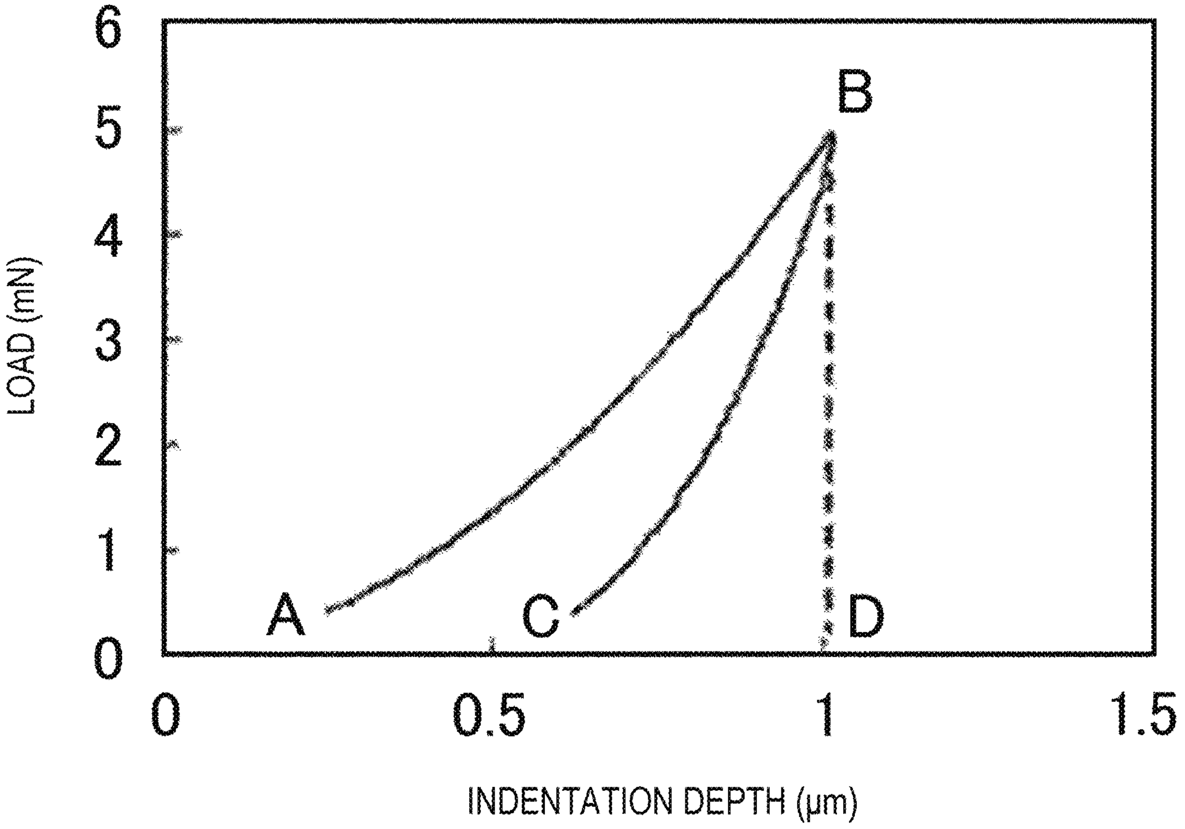
6
5
4
3
2
1
0
LOAD (mN)
B
A
C
D
0
0.5
1
1.5
INDENTATION DEPTH (μm)

ELECTROPHOTOGRAPHIC PHOTORECEPTOR, PRODUCTION METHOD THEREFOR, ELECTROPHOTOGRAPHIC PHOTORECEPTOR CARTRIDGE, AND IMAGE FORMING APPARATUS

TECHNICAL FIELD

The present invention relates to an electrophotographic photoreceptor, a production method therefor, an electrophotographic photoreceptor cartridge, and an image forming apparatus used in a copier, a printer, and the like. In detail, the present invention relates to an electrophotographic photoreceptor having good electrical characteristics and excellent durability, a production method therefor, an electrophotographic photoreceptor cartridge including the photoreceptor, and an image forming apparatus including the photoreceptor.

BACKGROUND ART

Electrophotographic technology has been widely used in the fields of copiers and various printers since immediacy and high quality images can be obtained. Regarding electrophotographic photoreceptors (hereinafter, simply referred to as "photoreceptors") which are the core of the electrophotographic technology, photoreceptors using an organic photoconductive substance having advantages such as non-pollution, ease of film formation, and ease of production have been used.

The electrophotographic photoreceptor is repeatedly used in an electrophotographic process, that is, a cycle of charging, exposure, development, transfer, cleaning, discharging or the like, and thus deteriorates due to various stresses during the time. Examples of such deterioration include chemical damages to a photosensitive layer by strongly oxidizing ozone and NOx generated from a corona charger commonly used as a charger, and chemical and electrical deterioration such as carrier (current) generated by image exposure flowing in the photosensitive layer, or decomposition of a photosensitive layer composition due to static elimination light and external light. Other examples include mechanical deterioration such as abrasion, scratches and film peeling of the surface of the photosensitive layer due to rubbing with a cleaning blade or a magnetic brush, contact with a developer or paper, or the like. Such mechanical stress deterioration is likely to appear on the image, and directly influences the image quality, which is a major factor limiting the lifespan of the photoreceptor.

As a technique for improving abrasion resistance and mechanical strength of the surface of the photoreceptor, a method of using a curable resin as a binder resin on the outermost layer of the photoreceptor is disclosed. At this time, in order to impart the charge transport ability to the outermost layer, a method of using a charge transport substance in addition to the curable resin and a method of using metal oxide particles are known (see, for example, Patent Literatures 1 to 3).

CITATION LIST

Patent Literature

Patent Literature 1: US-A-2015-099225
Patent Literature 2: JP-A-2005-338222
Patent Literature 3: JP-A-2006-39483

SUMMARY OF INVENTION

Technical Problem

However, when the compatibility between the curable resin and the charge transport substance is poor, or when the dispersibility of the metal oxide particles is poor, there is a problem that the mechanical strength is lowered or the electrical characteristics are deteriorated due to the non-uniformity of the outermost layer.

The present invention has been made in view of the above related arts. That is, an object of the present invention is to provide an electrophotographic photoreceptor having excellent mechanical strength and excellent electrical characteristics, a production method therefor, an electrophotographic photoreceptor cartridge using the electrophotographic photoreceptor, and an image forming apparatus using the electrophotographic photoreceptor.

Solution to Problem

As a result of diligent studies on an electrophotographic photoreceptor that can satisfy the above object, the present inventors have found that when the outermost layer contains a polymer having a specific structure, the above problems can be solved. Thus, the present invention has been completed.

The gist of the present invention belongs to the following [1] to [12],

[1] An electrophotographic photoreceptor, having a plurality of layers containing at least one outermost layer, wherein at least one of the outermost layer contains a polymer having a first structure where at least one carbonyl group is bonded to an aromatic group and a second structure of the following Formula (A).

(A)

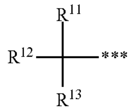

(In Formula (A), $R^{11}$ to $R^{13}$ each independently represent a hydrogen atom, a hydrocarbon group, an alkoxy group, a methylol group, or a group of the following Formula (2), wherein at least two of $R^{11}$ to $R^{13}$ are groups of the following Formula (2), and *** indicates a bond with an arbitrary atom.)

(2)

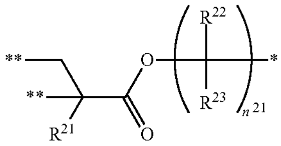

(In Formula (2), $R^{21}$ represents a hydrogen atom or a methyl group, $R^{22}$ and $R^{23}$ each independently represent a hydrogen atom, a hydrocarbon group or an alkoxy group, $n^{21}$ is an integer of 1 or more and 10 or less, * indicates a bond with a carbon atom to which $R^{11}$ to $R^{13}$ in the above Formula (A) are bonded, and ** indicates a bond with an arbitrary atom.)

[2] The electrophotographic photoreceptor according to [1], wherein the polymer is a cured product obtained by curing a compound having the first structure where at least one carbonyl group is bonded to an aromatic group and a second structure of the following Formula (A').

(A')

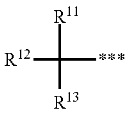

(In Formula (A'), $R^{11}$ to $R^{13}$ each independently represent a hydrogen atom, a hydrocarbon group, an alkoxy group, a methylol group, or a group of the following Formula (2'), wherein at least two of $R^{11}$ to $R^{13}$ are groups of the following Formula (2'), and *** indicates a bond with an arbitrary atom.)

(2')

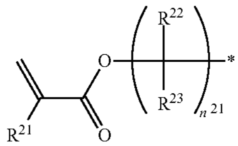

(In in Formula (2'), $R^{21}$ represents a hydrogen atom or a methyl group, $R^{22}$ and $R^{23}$ each independently represent a hydrogen atom, a hydrocarbon group or an alkoxy group, $n^{21}$ is an integer of 1 or more and 10 or less, and * indicates a bond with a carbon atom to which $R^{11}$ to $R^{13}$ in the above Formula (A') are bonded.)

[3] An electrophotographic photoreceptor, having a plurality of layers containing at least one outermost layer, wherein at least one of the outermost layer contains a polymer having a structure of the following Formula (1).

(1)

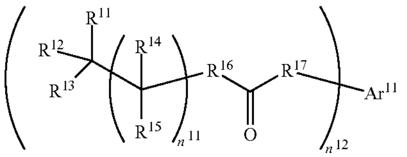

(In Formula (1), $Ar^{11}$ represents an aromatic group, with the proviso that the aromatic group is optionally substituted with at least one selected from the group consisting of an alkyl group, a halogen atom, an alkoxy group, an amino group, an alkyl carbonyl group, an aryl carbonyl group, an alkyl ester group and an aryl ester group, $R^{11}$ to $R^{13}$ each independently represent a hydrogen atom, a hydrocarbon group, an alkoxy group, a methylol group, a group of the following Formula (2) or a group of the following Formula (3), wherein at least two of $R^{11}$ to $R^{13}$ are groups of the following Formula (2) or groups of the following Formula (3), $R^{14}$ and $R^{15}$ each independently represent a hydrogen atom, a hydrocarbon group or an alkoxy group, $R^{16}$ and $R^{17}$ are a single bond or an oxygen atom, and $n^{12}$ represents an integer of 1 or more and 6 or less, and $n^{11}$ represents an integer of 1 or more and 10 or less.)

(2)

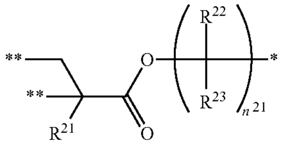

(In Formula (2), $R^{21}$ represents a hydrogen atom or a methyl group, $R^{22}$ and $R^{23}$ each independently represent a hydrogen atom, a hydrocarbon group or an alkoxy group, $n^{21}$ is an integer of 1 or more and 10 or less, * indicates a bond with a carbon atom to which $R^{11}$ to $R^{13}$ in the above Formula (1) are bonded, and ** indicates a bond with an arbitrary atom.)

(3)

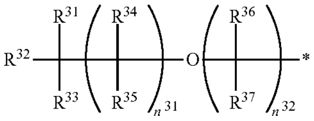

(In Formula (3), $R^{31}$ to $R^{33}$ each independently represent a hydrogen atom, a hydrocarbon group, an alkoxy group, a methylol group, or a group of the above Formula (2), wherein at least two of $R^{31}$ to $R^{33}$ represent groups of the above Formula (2), $R^{34}$ to $R^{37}$ each independently represent a hydrogen atom, a hydrocarbon group or an alkoxy group, and $n^{31}$ and $n^{32}$ are each independently an integer of 1 or more and 10 or less, and * indicates a bond with a carbon atom to which $R^{11}$ to $R^{13}$ in the above Formula (1) are bonded.)

[4] The electrophotographic photoreceptor according to [3], wherein the structure of Formula (1) is a structure of the following Formula (1-A).

(1-A)

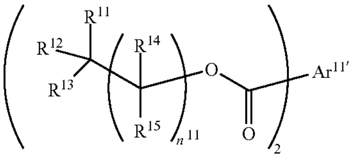

(In Formula (1-A), $Ar^{11'}$ represents a divalent aromatic group, with the proviso that the divalent aromatic group is optionally substituted with at least one selected from the group consisting of an alkyl group, a halogen atom, an alkoxy group, an amino group, an alkyl carbonyl group, an aryl carbonyl group, an alkyl ester group and an aryl ester group, $R^{11}$ to $R^{13}$ each independently represent a hydrogen atom, a hydrocarbon group, an alkoxy group, a methylol group, a group of the above Formula (2) or a group of the above Formula (3), wherein at least two of $R^{11}$ to $R^{13}$ are groups of the above Formula (2) or groups of the above Formula (3), $R^{14}$ and $R^{15}$ each independently represent a hydrogen atom, a hydrocarbon group or an alkoxy group, and $n^{11}$ is an integer of 1 or more and 10 or less.)

[5] The electrophotographic photoreceptor according to any one of [1] to [4], wherein the polymer further contains a partial structure having a charge transport ability.

[6] The electrophotographic photoreceptor according to [5], wherein the partial structure having a charge transport ability is a triarylamine structure.

[7] The electrophotographic photoreceptor according to [6], wherein a weight ratio of the structure in which at least one carbonyl group is bonded to the aromatic group to the triarylamine structure is 0.2 or more and 4 or less.

[8] The electrophotographic photoreceptor according to any one of [5] to [7], wherein the partial structure having a charge transport ability is a structure of the following Formula (4).

(4)

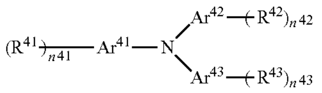

(In Formula (4), $Ar^{41}$ to $Ar^{43}$ represent an aromatic group, $R^{41}$ to $R^{43}$ each independently represent a hydrogen atom, an alkyl group, an alkoxy group, an aryl group, an alkyl halide group, a halogen atom, a benzyl group or a group of the following Formula (5), $n^{41}$ to $n^{43}$ are independently an integer of 1 or more, with the proviso that:

when $n^{41}$ is 1, $R^{41}$ is the group of the following Formula (5), when $n^{41}$ is an integer of 2 or more, $R^{41}$ existing of 2 or more may be the same or different, and at least one $R^{41}$ is the group of the following Formula (5), when $n^{42}$ is an integer of 2 or more, $R^{42}$ existing of 2 or more may be the same or different; and when $n^{43}$ is an integer of 2 or more, $R^{43}$ existing of 2 or more may be the same or different.)

(5)

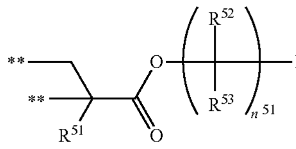

(In Formula (5), $R^{51}$ represents a hydrogen atom or a methyl group, $R^{52}$ and $R^{53}$ each independently represent a hydrogen atom, a hydrocarbon group or an alkoxy group, $R^{54}$ represents a single bond or an oxygen atom, $n^{51}$ represents an integer of 0 or more and 10 or less, * indicates a bond with $Ar^{41}$ to $Ar^{43}$ in the above Formula (4), and ** indicates a bond with an arbitrary atom.)

[9] The electrophotographic photoreceptor according to any one of [1] to [8], wherein the outermost layer further contains metal oxide particles.

[10] An electrophotographic photoreceptor cartridge having the electrophotographic photoreceptor according to any one of [1] to [9],

[11] An image forming apparatus having the electrophotographic photoreceptor according to any one of [1] to [9],

[12] A method for producing an electrophotographic photoreceptor having a plurality of layers containing at least one outermost layer, containing polymerizing a compound having a first structure where at least one carbonyl group bonded to an aromatic group and a second structure of the following Formula (A') to form at least one of the outermost layer.

(A')

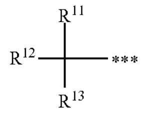

(In Formula (A'), $R^{11}$ to $R^{13}$ each independently represent a hydrogen atom, a hydrocarbon group, an alkoxy group, a methylol group, or a group of the following Formula (2'), wherein at least two of $R^{11}$ to $R^{13}$ are groups of the following Formula (2'), and *** indicates a bond with an arbitrary atom.)

(2')

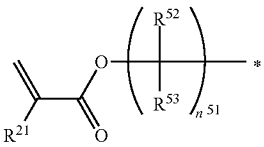

(In Formula (2'), $R^{21}$ represents a hydrogen atom or a methyl group, $R^{22}$ and $R^{23}$ each independently represent a hydrogen atom, a hydrocarbon group or an alkoxy group, and $n^{21}$ is an integer of 1 or more and 10 or less, and * indicates a bond with a carbon atom to which $R^{11}$ to $R^{13}$ in the above Formula (A') are bonded.)

Effects of Invention

According to the present invention, it is possible to provide an electrophotographic photoreceptor having excellent mechanical strength and excellent electrical characteristics, an electrophotographic photoreceptor cartridge using the electrophotographic photoreceptor, and an image forming apparatus using the electrophotographic photoreceptor.

BRIEF DESCRIPTION OF DRAWINGS

The FIGURE is a graph showing a change in load with respect to an indentation depth when universal hardness of the surface of a photoreceptor is measured.

DESCRIPTION OF EMBODIMENTS

Hereinafter, embodiments for implementing the present invention (hereinafter, embodiments of the invention) will be described in details. The present invention is not limited to the following embodiments, and various modifications can be made within the scope of the gist thereof.

Electrophotographic Photoreceptor>

The electrophotographic photoreceptor of the present invention has a plurality of layers containing at least one outermost layer, and at least one of the outermost layer contains a polymer having a specific structure.

The electrophotographic photoreceptor of the present invention can have a plurality of layers similar to that of a general electrophotographic photoreceptor. Examples of the plurality of layers of the general electrophotographic photoreceptor include those having at least a photosensitive layer on a conductive support. The photosensitive layer may be any one of a lamination type photosensitive layer having a configuration in which a charge generation layer containing at least one kind of charge generation substance and a charge transport layer containing at least one kind of charge transport substance are laminated, and a single-layer type photosensitive layer having a charge generation substance and a charge transport substance in the same layer. In the case of the lamination type photosensitive layer, any one of a mode in which the charge generation layer and the charge transport layer are laminated in this order from the conductive support side and conversely, a mode in which the charge transport layer and the charge generation layer are laminated in this order from the conductive support side may be possible.

In the photoreceptor of the present invention, in the case of the plurality of layers having a conductive support, the side opposite to the conductive support is the upper side or the front side, and the conductive support side is the lower side or the back side. Therefore, in the case of the plurality of layers having a conductive support, the surface opposite to the conductive support is the outermost layer.

Hereinafter, parts constituting the electrophotographic photoreceptor will be described.

<Conductive Support>

The electrophotographic photoreceptor of the present invention may include a conductive support.

The conductive support is not particularly limited as long as it supports the layer formed thereon and exhibits conductivity. As the conductive support, a metallic material such as aluminum, an aluminum alloy, stainless steel, copper, and nickel, a resinous material to which conductivity is imparted by coexistence of a conductive powder, e.g., a metal, carbon and tin oxide, and a resin, glass, paper, or the like having a surface on which a conductive material, e.g., aluminum, nickel, or ITO (alloy of indium oxide and tin oxide) has been vapor deposited or coated are mainly used. Examples of the shape of the conductive support include a drum-shape, sheet-shape, belt-shape, or the like. A conductive support made of a metallic material having a surface coated with a conductive material having a suitable resistance may be used in order to control the conductivity and surface properties thereof, and to coat defects.

When a metallic material such as an aluminum alloy is used as the conductive support, this material may be used after an anodized coating film is applied to the metallic material.

For example, the metallic material is anodized in an acidic bath of chromic acid, sulfuric acid, oxalic acid, boric acid, sulfamic acid, or the like, thereby forming an anodized coating film on the surface of the metallic material.

When the anodized coating film is applied to the metallic material, the material is preferably subjected to a pore-sealing treatment. The pore-sealing treatment can be performed by a known method. For example, it is preferable to perform a low-temperature pore-sealing treatment in which the metallic material is immersed in an aqueous solution containing nickel fluoride as a main component, or a high-temperature pore-sealing treatment in which the metallic material is immersed in an aqueous solution containing nickel acetate as a main component.

The average film thickness of the anodized coating film is generally preferably 20 μm or less, and particularly 7 μm or less.

The surface of the conductive support may be smooth, or may be roughened by applying a special cutting method or a polishing treatment. The surface of the conductive support may also be roughened by mixing particles having an appropriate particle diameter with a material constituting the support.

In order to improve the adhesiveness, the blocking property and the like, an undercoat layer described below may be provided between the conductive support and the photosensitive layer.

<Photosensitive Layer>

The electrophotographic photoreceptor of the present invention may include a photosensitive layer, and the following materials may be used for the photosensitive layer.

(Charge Generation Substance)

As the charge generation substance used for the photosensitive layer, various photoconductive materials, for example, selenium and alloys thereof, cadmium sulfide, and other inorganic photoconductive materials; and organic pigments such as phthalocyanine pigments, azo pigments, quinacridone pigments, indigo pigments, perylene pigments, polycyclic quinone pigments, anthanthrone pigments, and benzimidazole pigments can be used. Among them, organic pigments are particularly preferred, and further, phthalocyanine pigments and azo pigments are more preferred.

When a phthalocyanine pigment is used as the charge generation substance, specific examples thereof include metal-free phthalocyanines, and phthalocyanines which are coordinated with metals such as copper, indium, gallium, tin, titanium, zinc, vanadium, silicon, germanium, or oxides and halides of the metals. Examples of the ligand to the trivalent or higher metal atom include a hydroxy group and an alkoxy group in addition to an oxygen atom and a chlorine atom shown above. Among them, particularly preferred are X-form and x-form metal-free phthalocyanines having high sensitivity, A-form, B-form and D-form of titanyl phthalocyanine, vanadyl phthalocyanine, chloroindium phthalocyanine, chlorogallium phthalocyanine and hydroxy gallium phthalocyanine.

Among the crystal forms of the titanyl phthalocyanine mentioned here, the A-form and B-form are respectively shown as I phase and II phase according to W. Heller (Zeit. Kristallogr. 159 (1982) 173), and A-form is known as a stable form. D-form is a crystal form characterized in that the crystal shows a clear peak of the diffraction angle 2θ±0.2° at 27.3° in powder X-ray diffraction using CuKα rays.

In addition, when an azo pigment is used, various known bisazo pigments and trisazo pigments are appropriately used. Examples of preferred azo pigments are shown below.

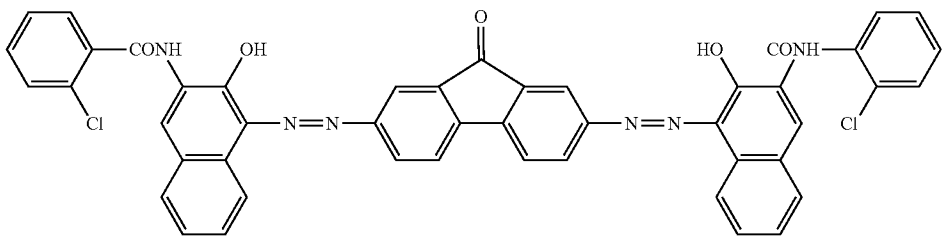

-continued
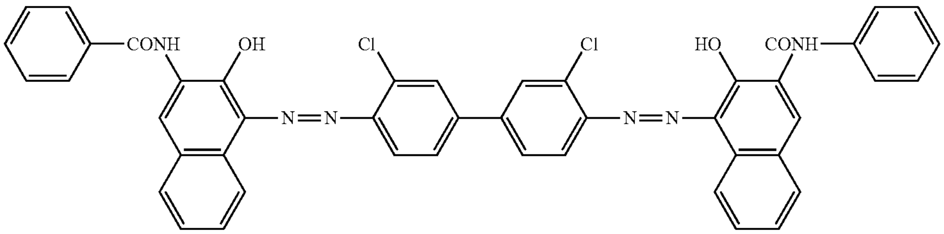
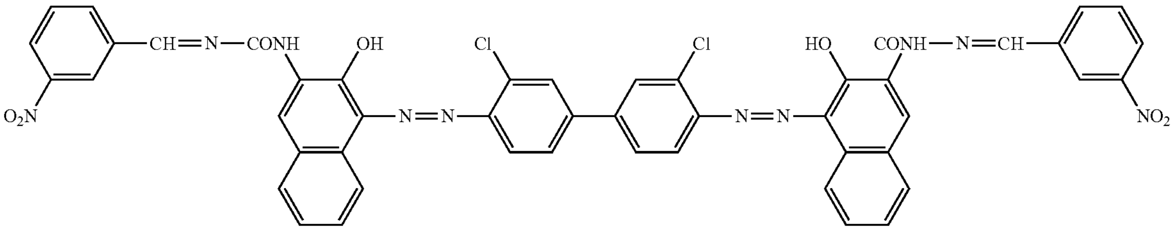
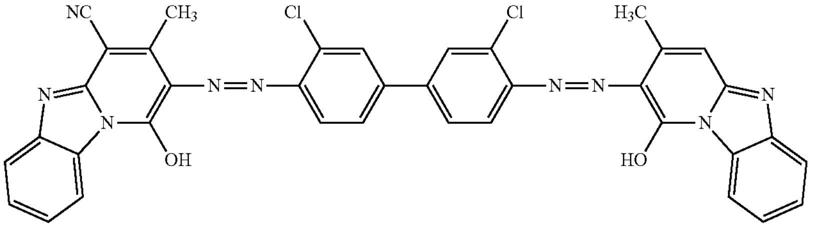
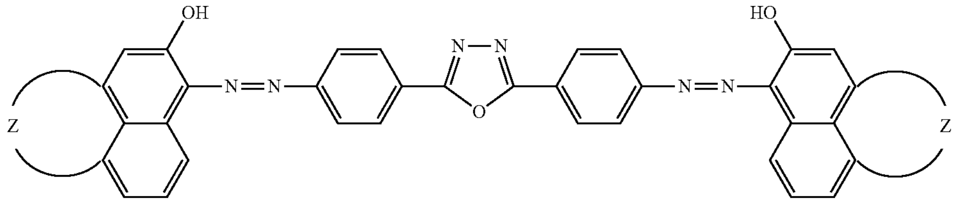
Z is 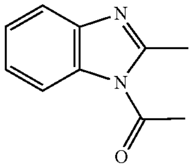 or 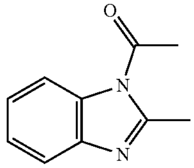
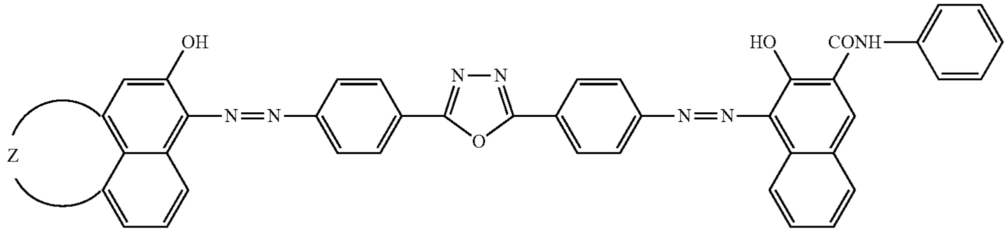
Z is 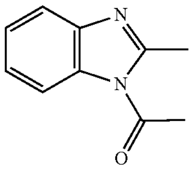 or 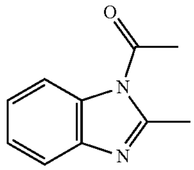

-continued
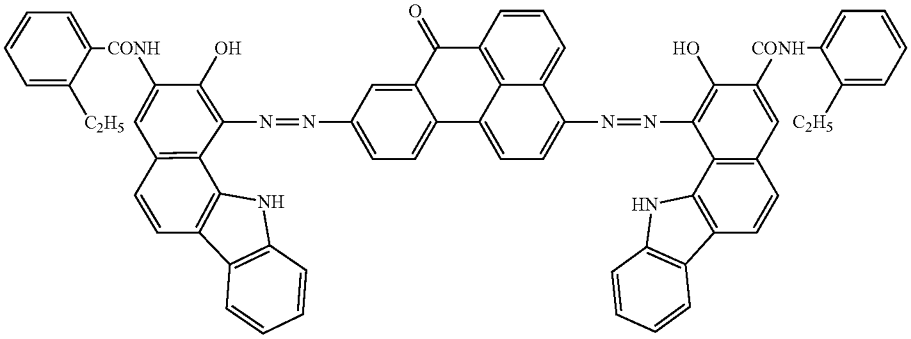
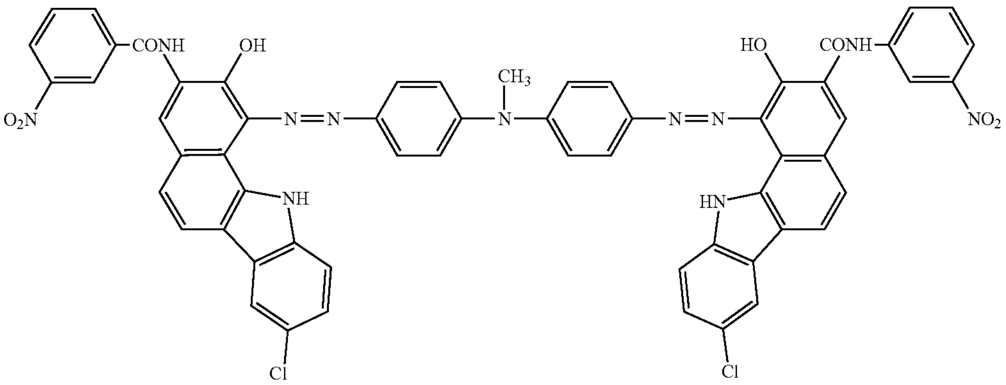
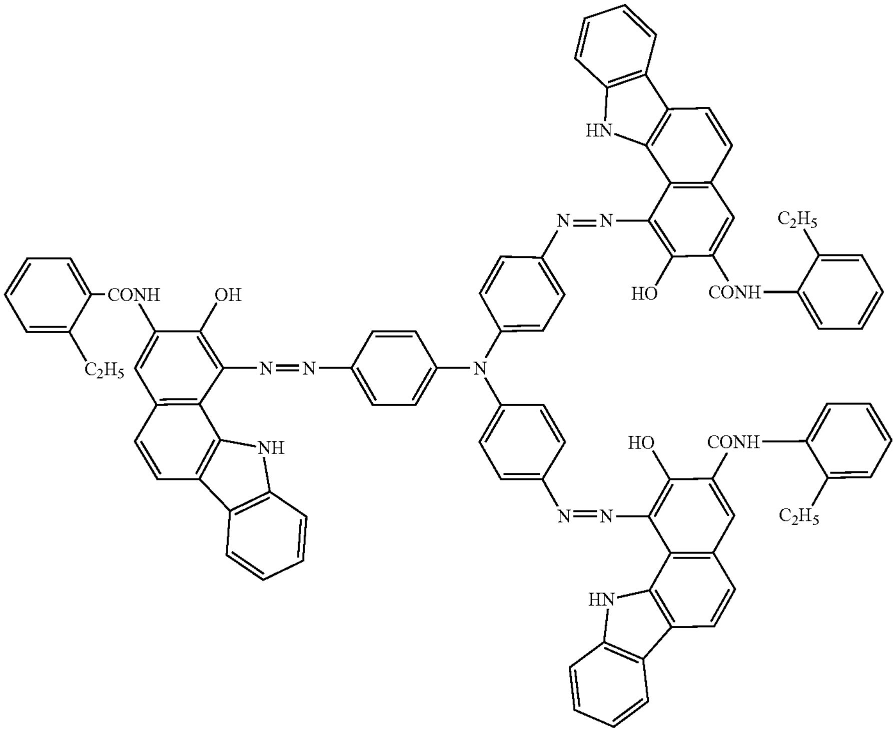

-continued

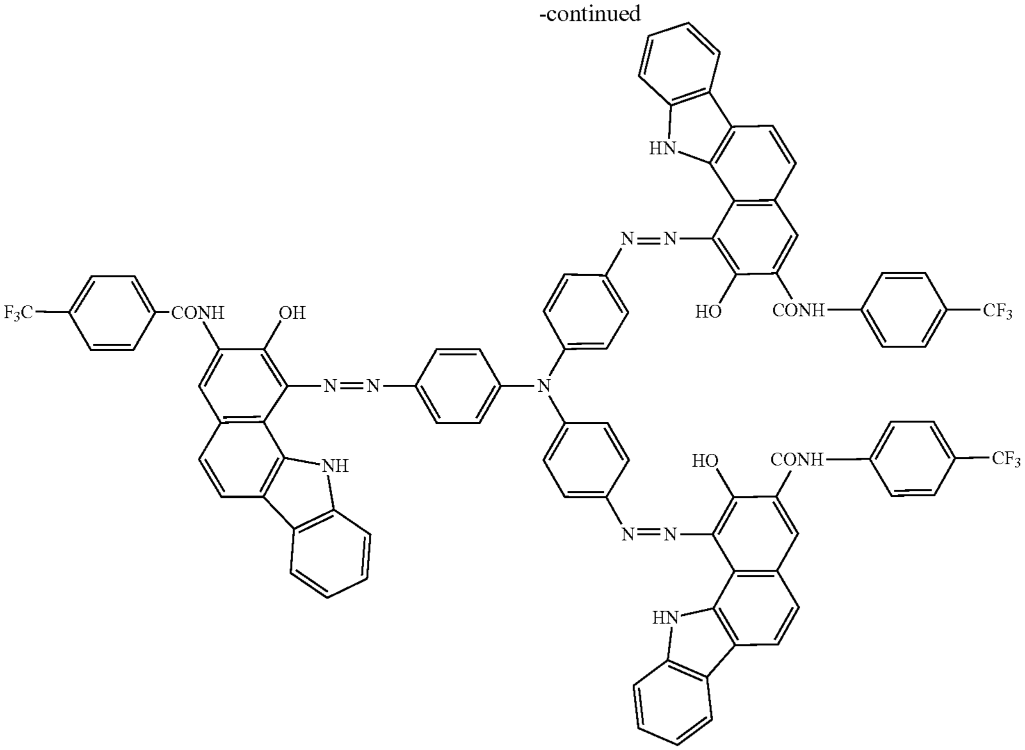

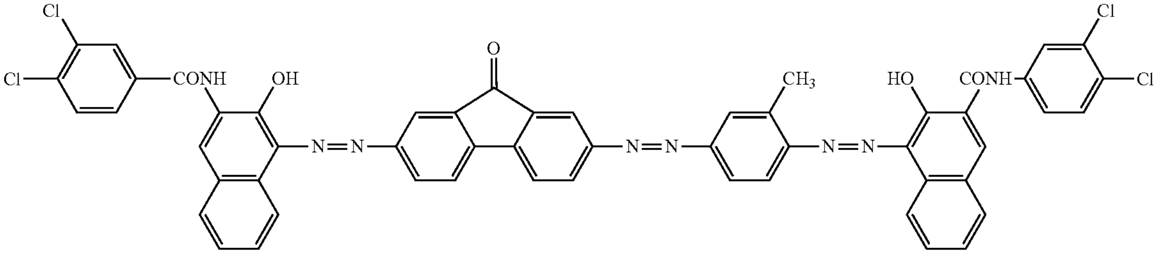

One of the charge generation substances may be used alone, or two or more of the charge generation substances may be used in any desired combination and in any desired proportion. Further, when two or more charge generation substances are used in combination, the charge generation substances to be used in combination may be mixed before using, or may be mixed and used in the production/treatment steps of the charge generation substances such as synthesis, pigment formation, and crystallization. Such treatments as known include an acid paste treatment, grinding treatment, solvent treatment, and the like.

It is desired that the particle diameter of the charge generation substance in the photosensitive layer is sufficiently small. Specifically, the particle diameter is generally preferably 1 μm or less, and more preferably 0.5 μm or less.

The amount of the charge generation substance in the photosensitive layer is generally preferably 0.1% by mass or more, and more preferably 0.5% by mass or more, from the viewpoint of sensitivity. In addition, the above amount is generally preferably 50% by mass or less, and more preferably 20% by mass or less, from the viewpoints of sensitivity and electrostatic property.

(Charge Transport Substance)

The charge transport substances are mainly classified into a hole transport substance having a hole transport ability and an electron transport substance having an electron transport ability. Only one of the hole transport substance and the electron transport substance may be used, or both may be used in combination.

[Hole Transport Substance]

The hole transport substance is not particularly limited as long as it is a known material, and examples thereof include heterocyclic compounds such as a carbazole derivative, an indole derivative, an imidazole derivative, an oxazole derivative, a pyrazole derivative, a thiadiazole derivative, and a benzofuran derivative, and electron donating substances such as an aniline derivative, a hydrazone derivative, an aromatic amine derivative, an arylamine derivative, a stilbene derivative, a butadiene derivative, an enamine derivative, and a combination of a plurality of kinds of these compounds or a polymer having a group formed of these compounds in a main chain or a side chain. Among them, a carbazole derivative, an aromatic amine derivative, an arylamine derivative, a stilbene derivative, a butadiene derivative, an enamine derivative, and a combination of a plurality of kinds of these compounds are preferred.

Structures of preferred hole transport substances are exemplified below. In the present description, in the chemical formula, "Me" means a methyl group, "Et" means an ethyl group, and "$nC_4H_9$" means a normal butyl group.

HTM1
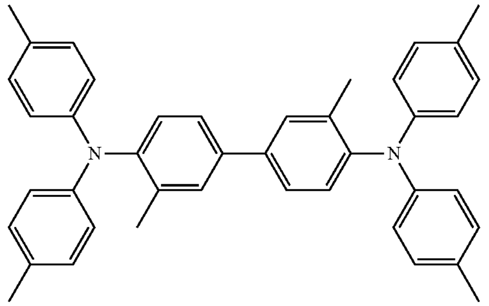
HTM2
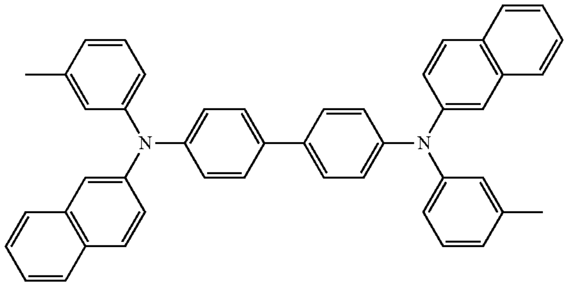
HTM3
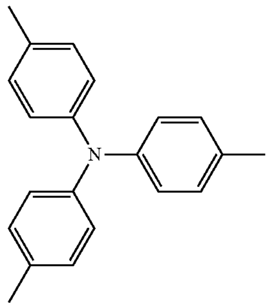
HTM4
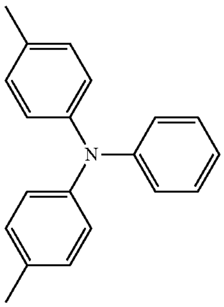
HTM5
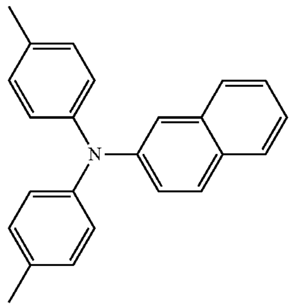
HTM6
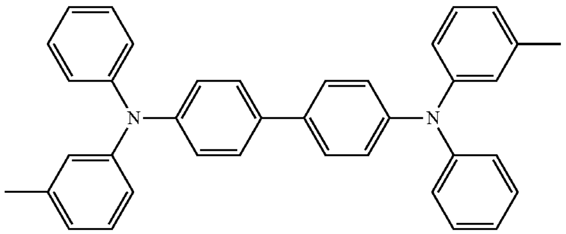
HTM7
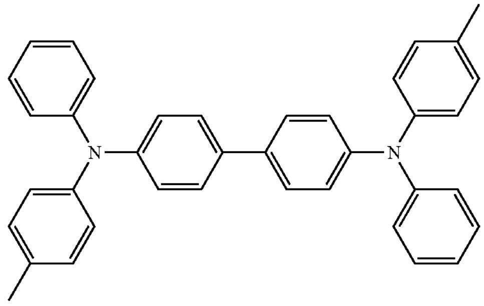
HTM8
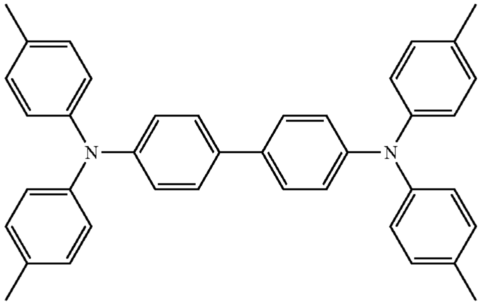
HTM9
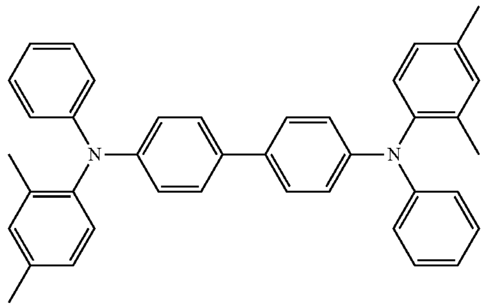
HTM10
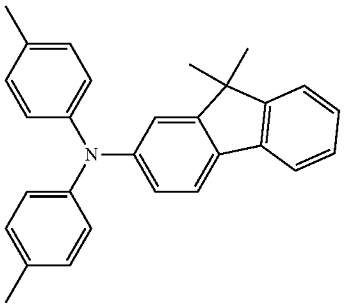

-continued
HTM11
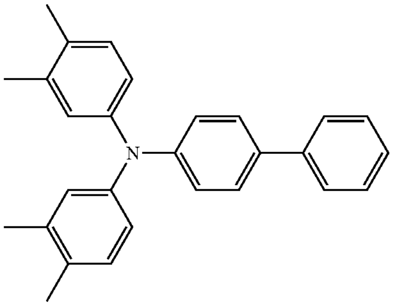
HTM12
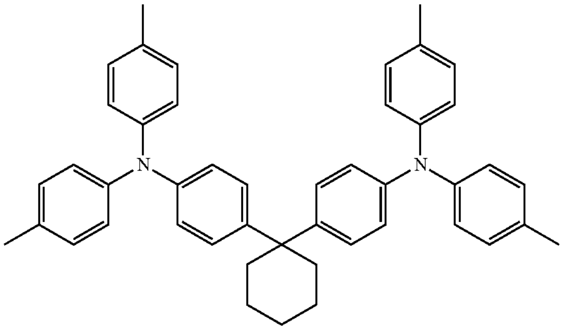
HTM13
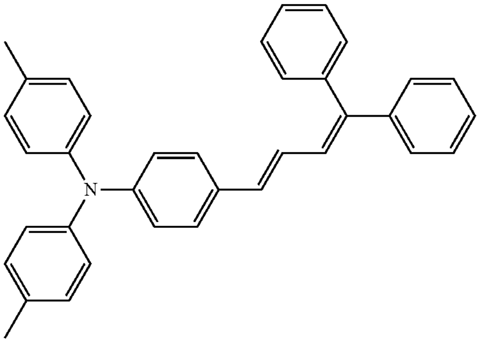
HTM14
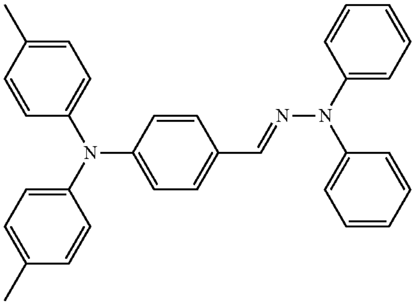
HTM15
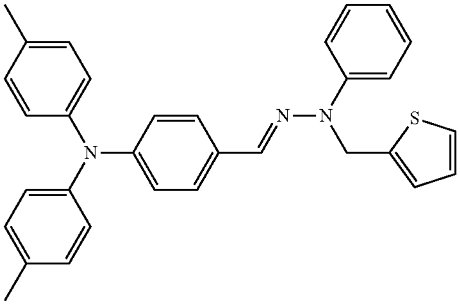
HTM16
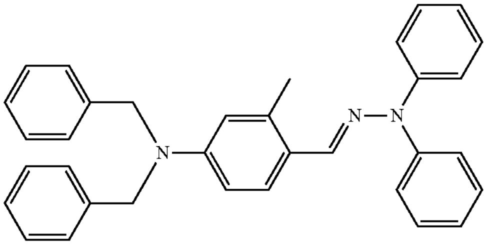
HTM17
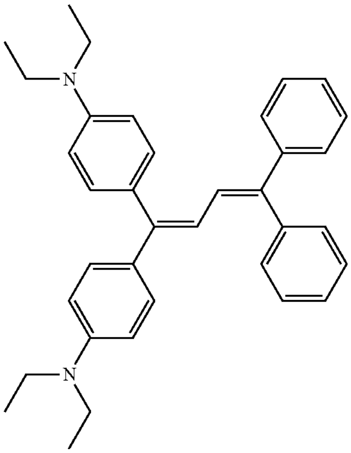
HTM18
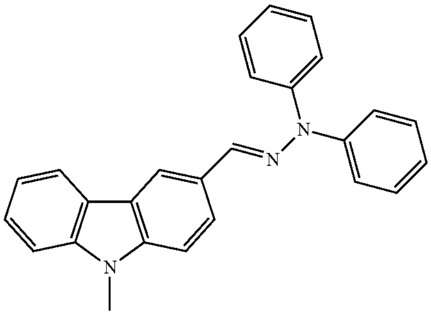

-continued
HTM19
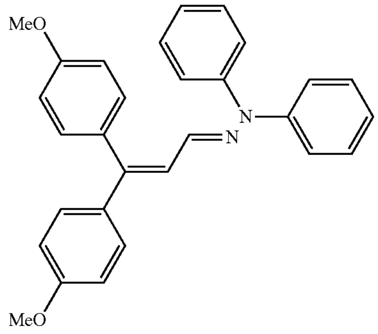
HTM20
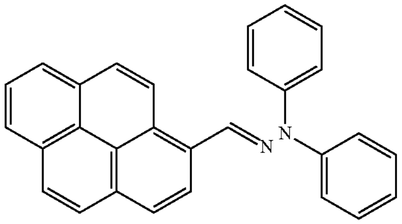
HTM21
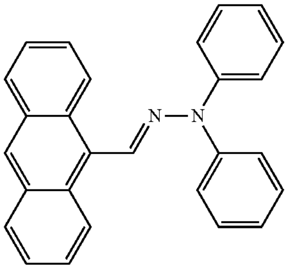
HTM22
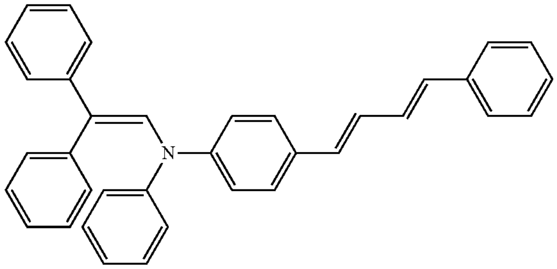
HTM23
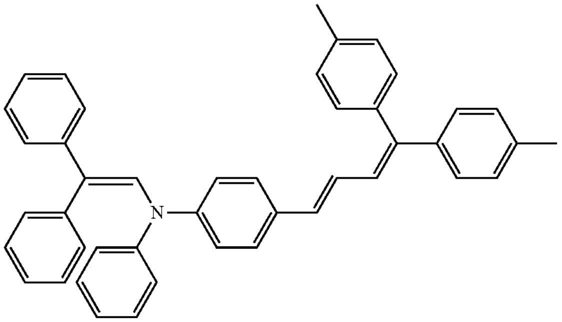
HTM24
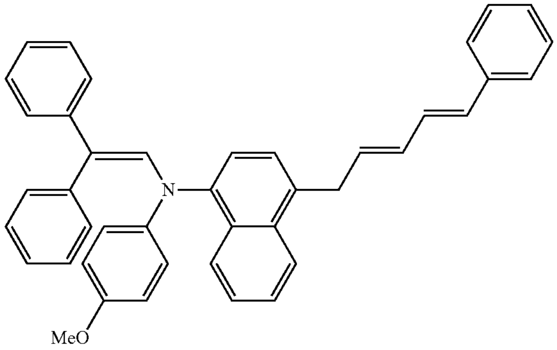
HTM25
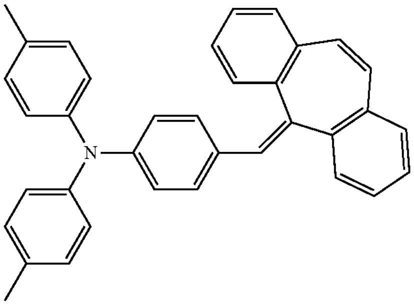
HTM26
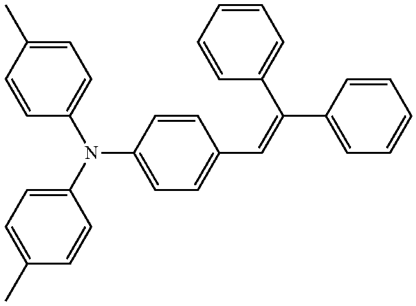
HTM27
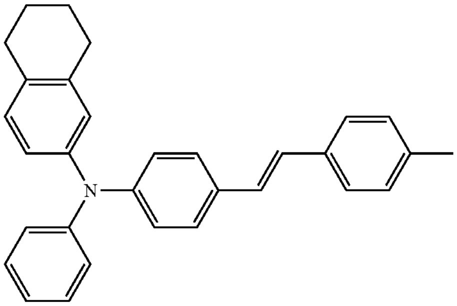
HTM28
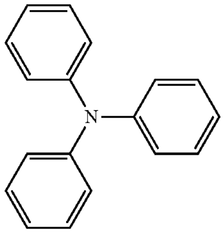

-continued
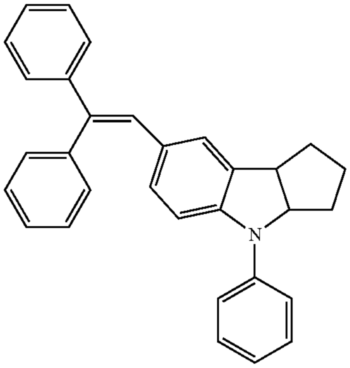
HTM29
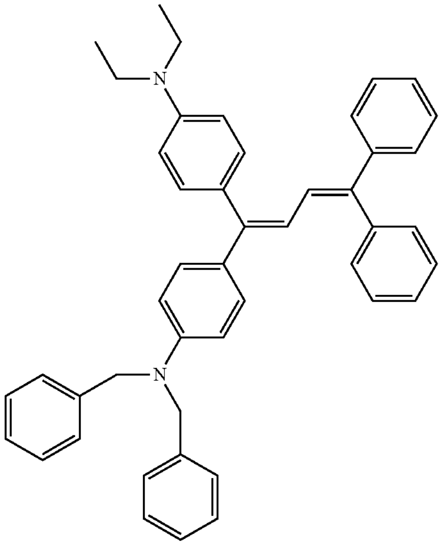
HTM30
HTM31
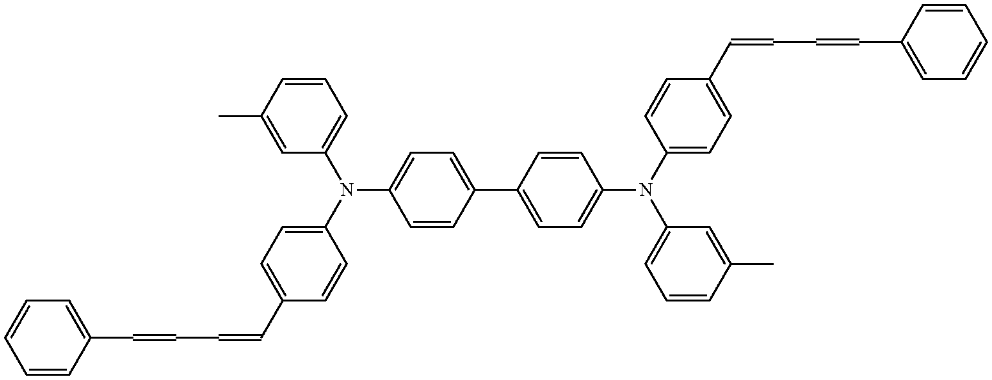
HTM32
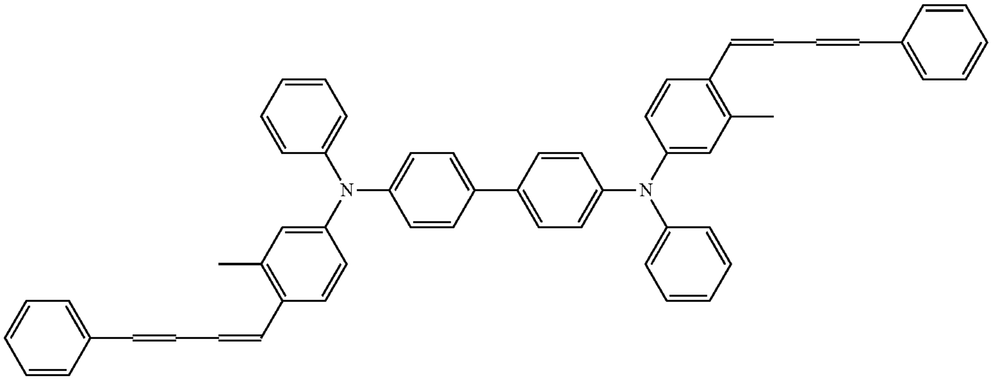

-continued
HTM33
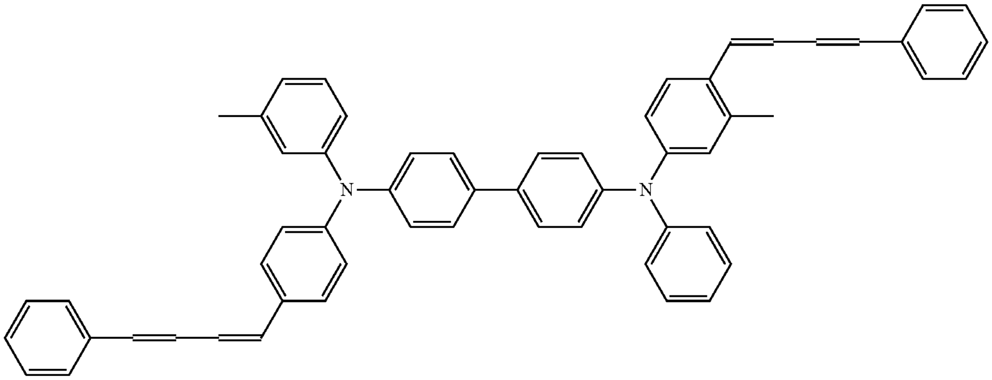
HTM34
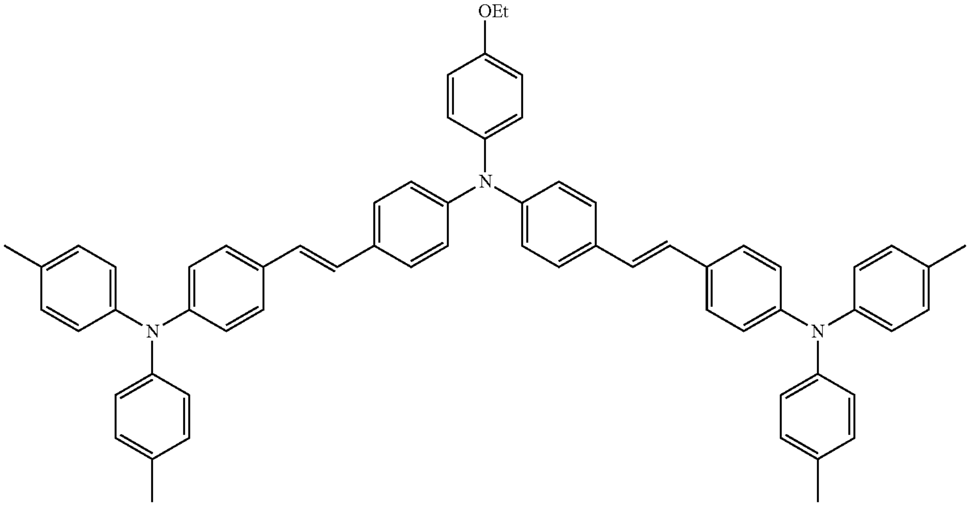
HTM35
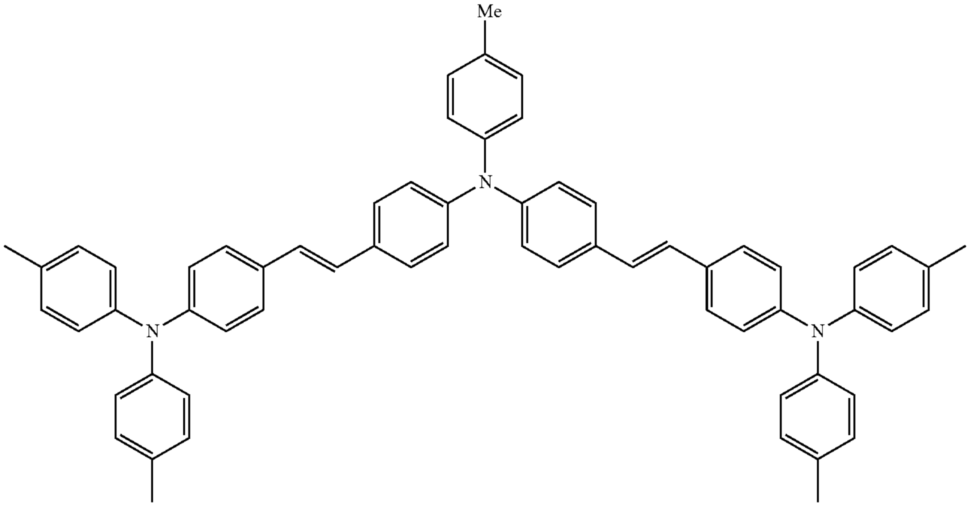

-continued
HTM36
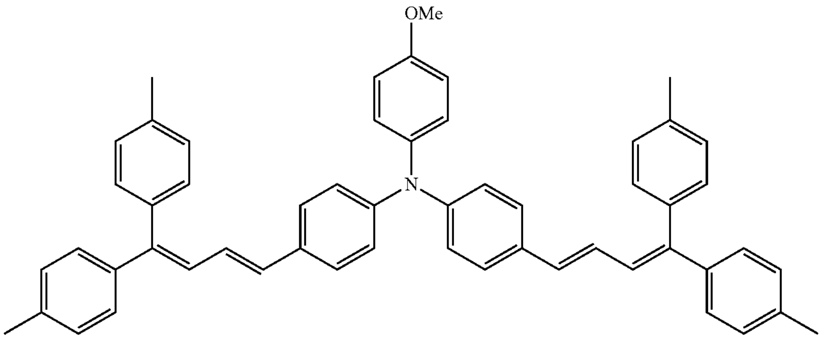
HTM37
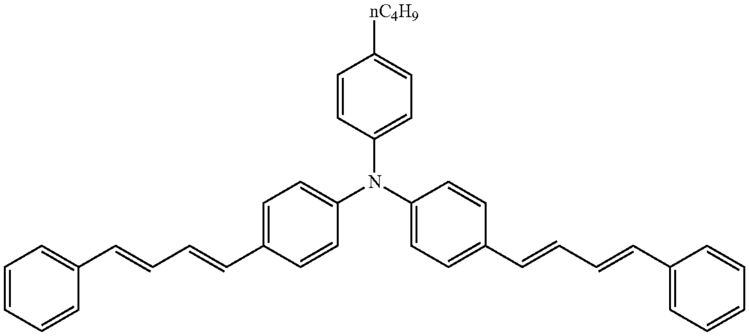
HTM38
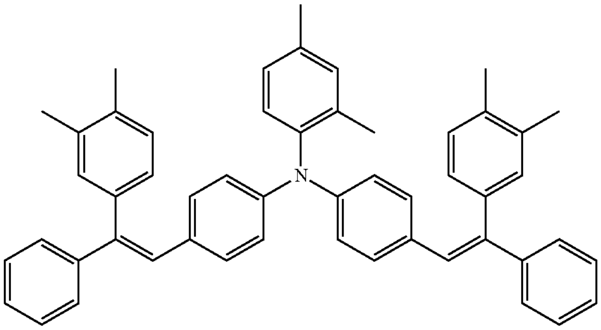
HTM39
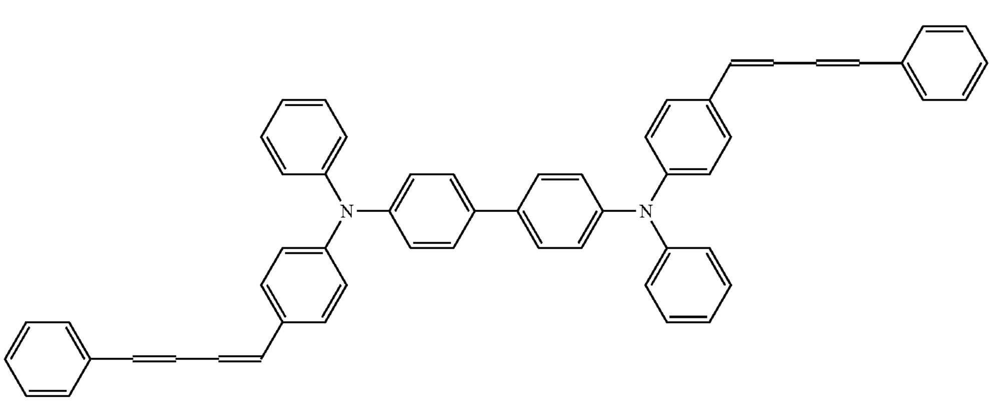

-continued
HTM40
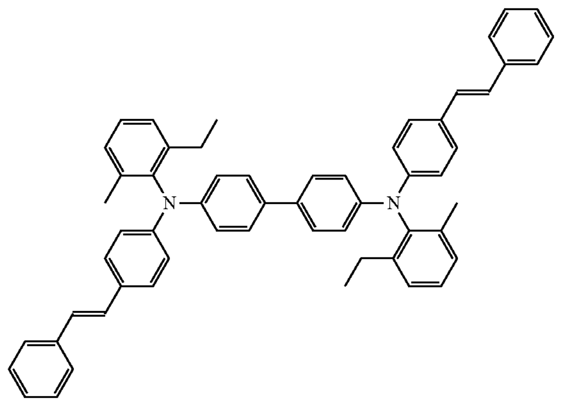
HTM41
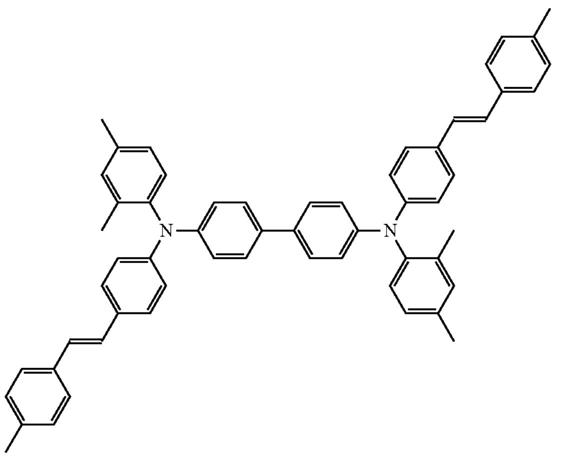
HTM42
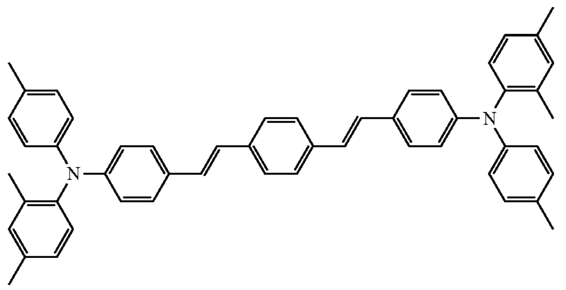
HTM43
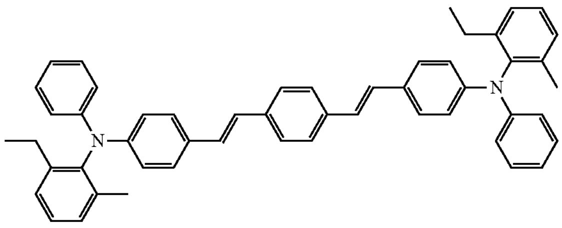
HTM44
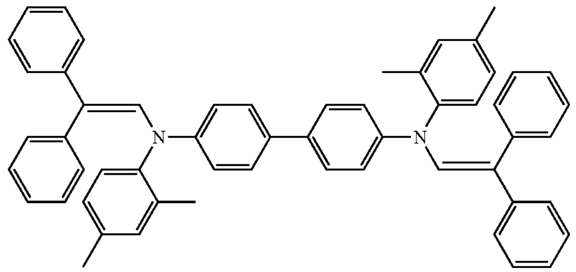
HTM45
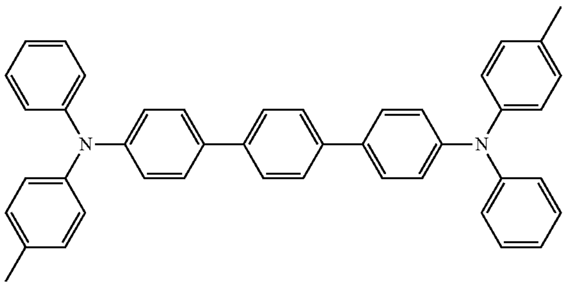
HTM46
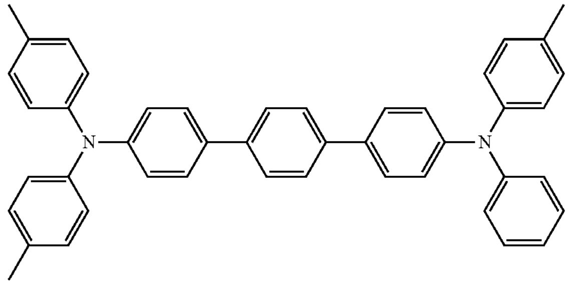
HTM47
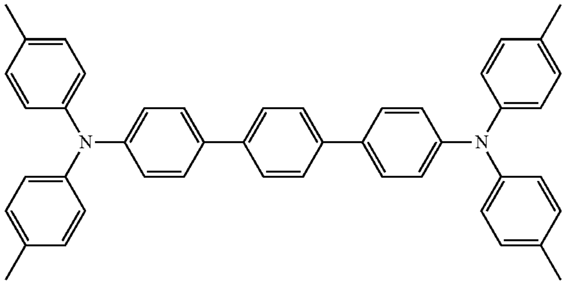

-continued

HTM48

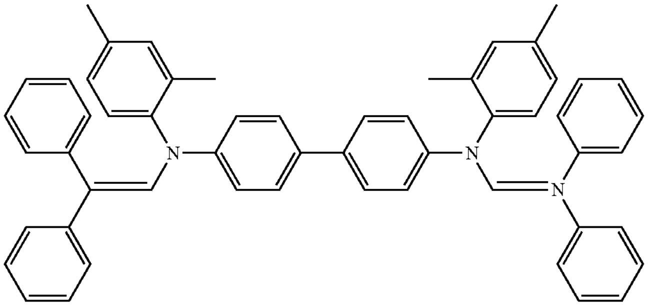

Among the above hole transport substances, from the viewpoint of electrical characteristics, compounds represented by HTM6, HTM7, HTM8, HTM9, HTM10, HTM12, HTM14, HTM25, HTM26, HTM34, HTM35, HTM37, HTM39, HTM40, HTM41, HTM42, HTM43, and HTM48 are preferred, and compounds represented by HTM6, HTM34, HTM39, HTM40, HTM41, HTM42, HTM43, and HTM48 are more preferred.

As for the ratio of the binder resin to the hole transport substance in the photosensitive layer, the hole transport substance is generally used in an amount of 20 parts by mass or more with respect to 100 parts by mass of the binder resin in the same layer. From the viewpoint of reducing residual potential, 30 parts by mass or more is preferred, and 40 parts by mass or more is more preferred from the viewpoints of stability and charge mobility at repeated use. On the other hand, the hole transport substance is generally used in an amount of 100 parts by mass or less with respect to 100 parts by mass of the binder resin in the same layer. From the viewpoint of the compatibility between the hole transport substance and the binder resin, 80 parts by mass or less is preferred.

[Electron Transport Substance]

The electron transport substance is not particularly limited as long as it is a known material, and examples thereof include electron withdrawing substances including an aromatic nitro compound such as 2,4,7-trinitrofluorenone, a cyano compound such as tetracyanoquinodimethane, and a quinone compound such as diphenoquinone, and known cyclic ketone compounds or perylene pigments (perylene derivatives).

In particular, a compound represented by the following Formula (6) is preferred.

(6)

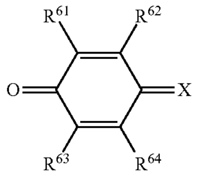

(In Formula (6), $R^{61}$ to $R^{64}$ each independently represent a hydrogen atom, an alkyl group which is optionally substituted and has 1 or more and 20 or less carbon atoms, or an alkenyl group which is optionally substituted and has 1 or more and 20 or less carbon atoms, and $R^{61}$ and $R^{62}$, or $R^{63}$ and $R^{64}$ may combine together to form a cyclic structure. X represents an organic residue having a molecular weight of 120 or more and 250 or less.)

$R^{61}$ to $R^{64}$ each independently represent a hydrogen atom, an alkyl group which is optionally substituted and has 1 or more and 20 or less carbon atoms, or an alkenyl group which is optionally substituted and has 1 or more and 20 or less carbon atoms.

Examples of the alkyl group which are optionally substituted and has 1 or more and 20 or less carbon atoms include a linear alkyl group, a branched alkyl group and a cyclic alkyl group. A linear alkyl group or a branched alkyl group is preferred from the viewpoint of the electron transport ability. The number of carbon atoms of these alkyl groups is generally 1 or more, preferably 4 or more, and is generally 20 or less, and preferably 15 or less from the viewpoint of versatility of the raw material, more preferably 10 or less, and still more preferably 5 or less, from the viewpoint of handleability during the production. Specific examples thereof include a methyl group, an ethyl group, a hexyl group, an iso-propyl group, a tert-butyl group, a tert-amyl group, a cyclohexyl group, and a cyclopentyl group. Among them, a methyl group, a tert-butyl group or a tert-amyl group is preferred, and a tert-butyl group or a tert-amyl group is more preferred from the viewpoint of solubility in an organic solvent used in a coating liquid.

Examples of the alkenyl group which are optionally substituted and has 1 or more and 20 or less carbon atoms include a linear alkenyl group, a branched alkenyl group and a cyclic alkenyl group. The number of carbon atoms of these alkenyl groups is generally 1 or more, and preferably 4 or more, and is generally 20 or less, and from the viewpoint of light attenuation characteristics of the photoreceptor, preferably 10 or less. Specific examples thereof include an ethenyl group, a 2-methyl-1-propenyl group, and a cyclohexenyl group.

The substituents $R^{61}$ to $R^{64}$ may form a cyclic structure in which $R^{61}$ and $R^{62}$ or $R^{63}$ and $R^{64}$ combine together. From the viewpoints of electron mobility, it is preferable that when both $R^{61}$ and $R^{62}$ are alkenyl groups, $R^{61}$ and $R^{62}$ combine together to form an aromatic ring, and it is more preferable that both $R^{61}$ and $R^{62}$ are ethenyl groups and combine together to form a benzene ring structure.

In the above Formula (6), X represents an organic residue having a molecular weight of 120 or more and 250 or less, and from the viewpoint of the light attenuation characteristics of the photoreceptor, Formula (6) is preferably a compound represented by any one of the following Formulas (7) to (10).

(7)

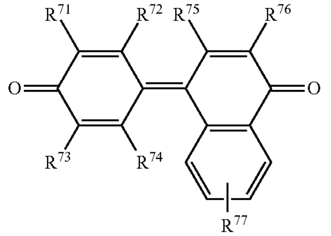

(In Formula (7), $R^{71}$ to $R^{74}$ each independently represent a hydrogen atom, an alkyl group which is optionally substituted and has 1 or more and 20 or less carbon atoms, or an alkenyl group which is optionally substituted and has 1 or more and 20 or less carbon atoms, and $R^{71}$ and $R^{72}$, or $R^{73}$ and $R^{74}$ may combine together to form a cyclic structure. $R^{75}$ to $R^{77}$ each independently represent a hydrogen atom, a halogen atom, or an alkyl group having 1 or more and 6 or less carbon atoms.)

(8)

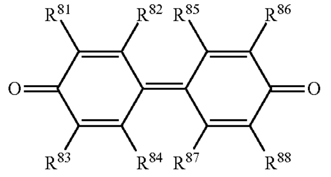

(In Formula (8), $R^{81}$ to $R^{84}$ each independently represent a hydrogen atom, an alkyl group which is optionally substituted and has 1 or more and 20 or less carbon atoms, or an alkenyl group which is optionally substituted and has 1 or more and 20 or less carbon atoms, and $R^{81}$ and $R^{82}$, or $R^{83}$ and $R^{84}$ may combine together to form a cyclic structure. $R^{85}$ to $R^{88}$ each independently represent a hydrogen atom, a halogen atom, or an alkyl group having 1 or more and 6 or less carbon atoms.)

(9)

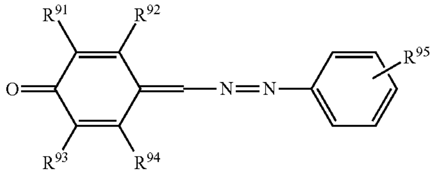

(In Formula (9), $R^{91}$ to $R^{94}$ each independently represent a hydrogen atom, an alkyl group which is optionally substituted and has 1 or more and 20 or less carbon atoms, or an alkenyl group which is optionally substituted and has 1 or more and 20 or less carbon atoms, and $R^{91}$ and $R^{92}$, or $R^{93}$ and $R^{94}$ may combine together to form a cyclic structure. $R^{95}$ represents a hydrogen atom, an alkyl group having 1 or more and 6 or less carbon atoms, or a halogen atom.)

(10)

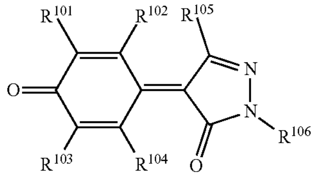

(In Formula (10), $R^{101}$ to $R^{104}$ each independently represent a hydrogen atom, an alkyl group which is optionally substituted and has 1 or more and 20 or less carbon atoms, or an alkenyl group which is optionally substituted and has 1 or more and 20 or less carbon atoms, and $R^{101}$ and $R^{102}$, or $R^{103}$ and $R^{104}$ may combine together to form a cyclic structure. $R^{105}$ and $R^{106}$ each independently represent a hydrogen atom, a halogen atom, an alkyl group having 1 or more and 6 or less carbon atoms, or an aryl group having 6 or more and 12 or less carbon atoms.)

Specific examples of $R^{71}$ to $R^{74}$, $R^{81}$ to $R^{84}$, $R^{91}$ to $R^{94}$, and $R^{101}$ to $R^{104}$ include those same as those of $R^{61}$ to $R^{64}$.

Examples of the alkyl group having 1 or more and 6 or less carbon atoms in $R^{75}$ to $R^{77}$, $R^{85}$ to $R^{88}$, $R^{95}$, $R^{105}$ and $R^{106}$ include a linear alkyl group, a branched alkyl group, and a cyclic alkyl group. The number of carbon atoms of these alkyl groups is generally 1 or more and is generally 6 or less. Specific examples thereof include a methyl group, an ethyl group, a hexyl group, an iso-propyl group, a tert-butyl group, a tert-amyl group, and a cyclohexyl group. Among them, a methyl group, a tert-butyl group, or a tert-amyl group is preferred from the viewpoint of the electron transport ability.

Examples of the halogen atom include fluorine, chlorine, bromine and iodine, and chlorine is preferred from the viewpoint of the electron transport ability.

The number of carbon atoms of the aryl group having 6 or more and 12 or less carbon atoms is generally 6 or more and is generally 12 or less. Specific examples thereof include a phenyl group and a naphthyl group, and a phenyl group is preferred from the viewpoint of film physical characteristics of the photosensitive layer. These aryl groups may be further substituted.

Among the above Formulae (7) to (10), Formula (6) is preferably Formula (7) or Formula (8), and more preferably Formula (7), from the viewpoint of image quality stability in case of repeatedly forming an image. In addition, the compound represented by Formula (6) may be used alone, compounds represented by Formula (6) having different structures may be used in combination, or it may be used in combination with other electron transport substances.

Structures of preferred electron transport substances are exemplified below.

ET-1

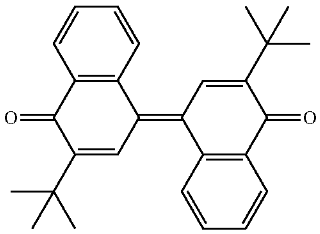

-continued
ET-2
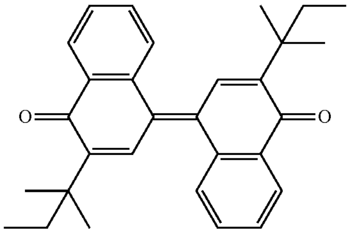
ET-3
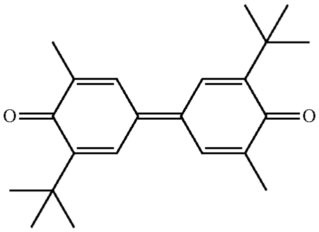
ET-4
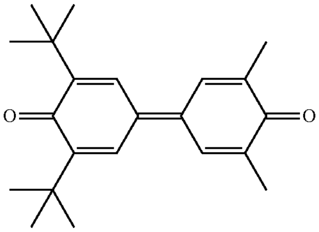
ET-5
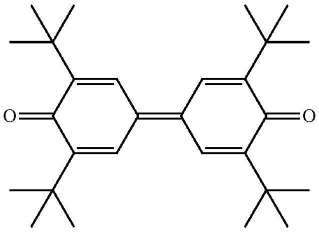
ET-6
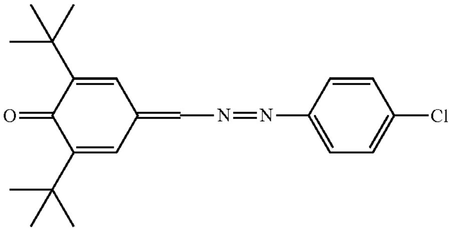
ET-7
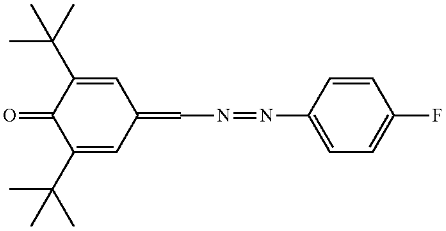
-continued
ET-8
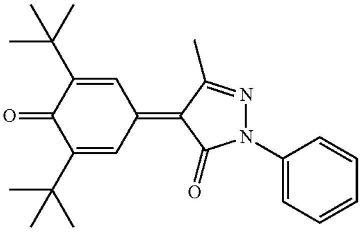
ET-9
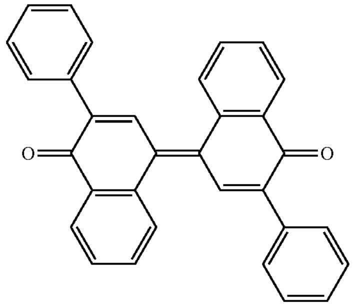
ET-10
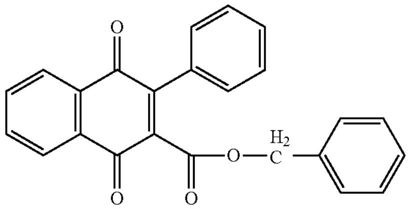
ET-11
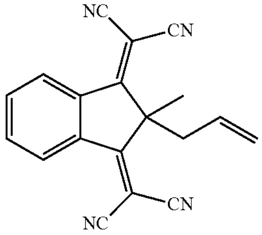
ET-12
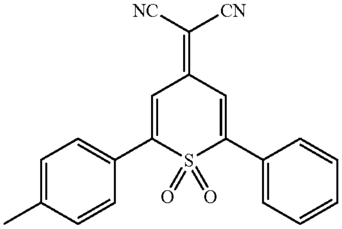
ET-13
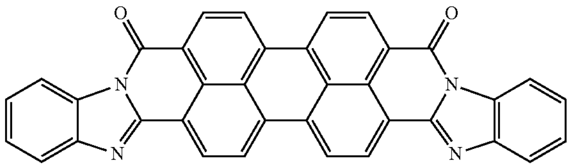
ET-14
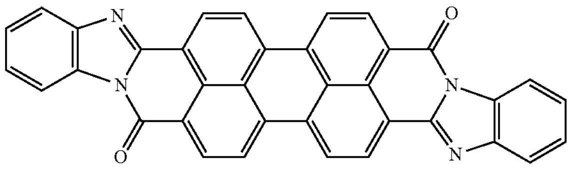

-continued

ET-15

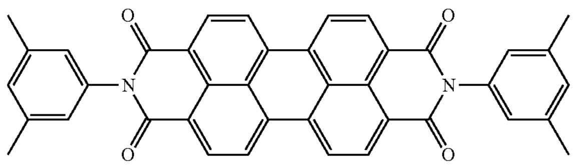

ET-16

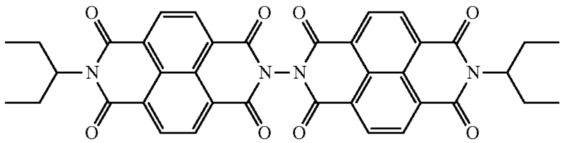

ET-17

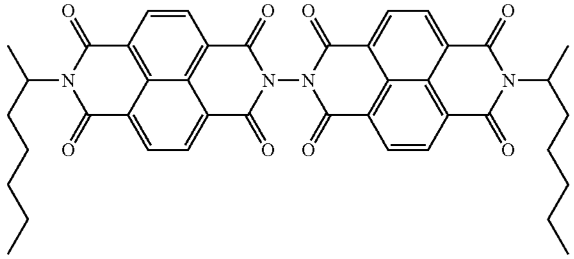

Among the above electron transport substances, from the viewpoint of electrical characteristics, compounds represented by ET-2, ET-3, ET-4, ET-5, ET-6, ET-8, ET-10, ET-11, ET-12, ET-15, ET-16, and ET-17 are preferred, and compounds represented by ET-2, ET-3, ET-4 and ET-5 are more preferred.

As for the ratio of the binder resin to the electron transport substance in the photosensitive layer, the electron transport substance is generally 10 parts by mass or more, preferably 20 parts by mass or more, and more preferably 30 parts by mass or more with respect to 100 parts by mass of the binder resin, from the viewpoint of preventing optical fatigue. On the other hand, the electron transport substance is generally 100 parts by mass or less, preferably 80 parts by mass or less, and more preferably 60 parts by mass or less, from the viewpoint of the stability of the electrical characteristics.

(Binder Resin)

Examples of the binder resin used for the photosensitive layer include a butadiene resin; a styrene resin; a polyvinyl acetate resin; a vinyl chloride resin; an acrylic ester resin; a methacrylate ester resin; a vinyl alcohol resin; a polymer and a copolymer of vinyl compounds such as ethyl vinyl ether; a polyvinyl butyral resin; a polyvinyl formal resin; a partially modified polyvinyl acetal resin; a polyarylate resin; a polyamide resin; a polyurethane resin; a cellulose ester resin; a silicone alkyd resin; a poly-N-vinylcarbazole resin; a polycarbonate resin; a polyester resin; a polyester carbonate resin; a polysulfone resin; a polyimide resin; a phenoxy resin; an epoxy resin; a silicone resin; and partially cross-linked cured products of these resins. The above resin may be modified with a silicon reagent or the like. One of these may be used alone, or two or more of these may be used in any desired ratio and in any desired combination.

In particular, the binder resin preferably contains one or more kinds of polymers obtained by interfacial polymerization. The interfacial polymerization refers to a polymerization method utilizing a poly condensation reaction which proceeds at an interface of two or more solvents (mostly organic solvent-water) which are not mixed with each other. For example, dicarboxylic acid chloride is dissolved in an organic solvent and a glycol component is dissolved in alkaline water or the like, followed by mixing the two solutions at room temperature in order to be divided into two phases. The polycondensation reaction is allowed to proceed at the interface to produce a polymer. Examples of other two components include phosgene and a glycol aqueous solution. As described in a case where polycarbonate oligomers are condensed by interfacial polymerization, there is a case where two components are not divided into two phases, and the interface is used as a polymerization site.

As the binder resin obtained by the above interfacial polymerization, a polycarbonate resin and a polyester resin are preferred, and a polycarbonate resin or a polyarylate resin is particularly preferred. In particular, the binder resin is preferably a polymer containing an aromatic diol as a raw material, and preferred examples of the aromatic diol compound include a compound represented by the following Formula (11).

(11)

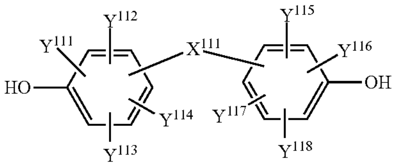

In the above Formula (11), $X^{111}$ represents a linking group represented by any of the following Formulae or a single bond.

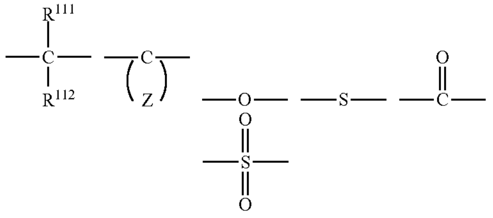

In the above Formula, $R^{111}$ and $R^{112}$ each independently represent a hydrogen atom, an alkyl group having 1 to 20 carbon atoms, an aryl group which is optionally substituted, or an alkyl halide group. Z represents a substituted or an unsubstituted carbon ring having 4 to 20 carbon atoms.

In Formula (11), $Y^{111}$ to $Y^{118}$ each independently represent a hydrogen atom, a halogen atom, an alkyl group having 1 to 20 carbon atoms, an aryl group which is optionally substituted, or an alkyl halide group.

Further, a polycarbonate resin and a polyarylate resin which contain a bisphenol or biphenol component having the following structural formula are preferred from the viewpoints of the sensitivity and the residual potential of the electrophotographic photoreceptor, and among them, the polycarbonate resin is more preferred from the viewpoint of mobility.

This example is performed to clarify the gist, and the resin is not limited to the exemplified structure as long as the resin does not deviate from the gist of the present invention.

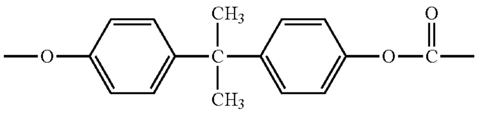
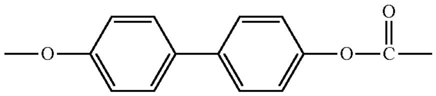
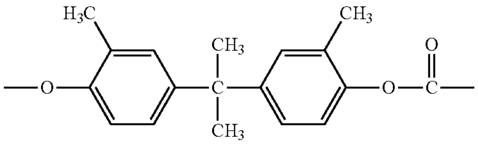
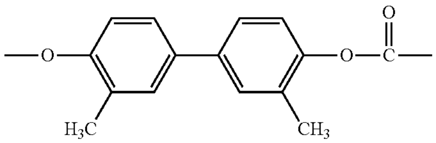
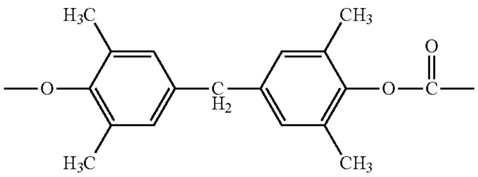
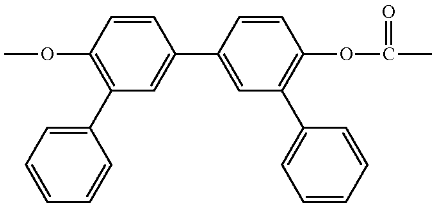
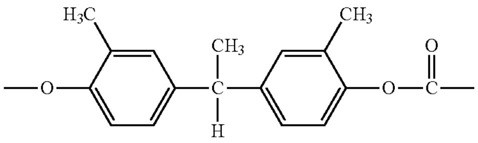
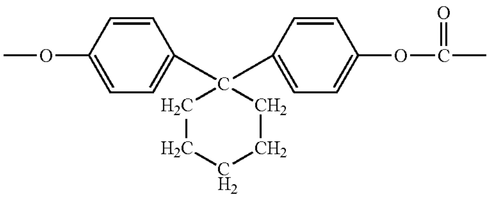
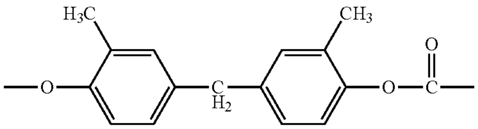
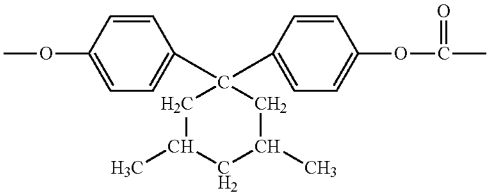
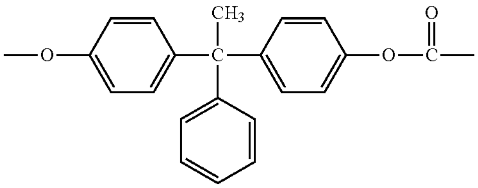
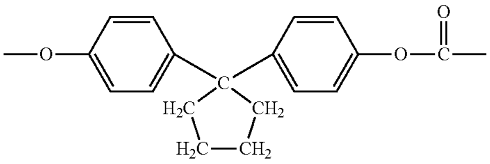
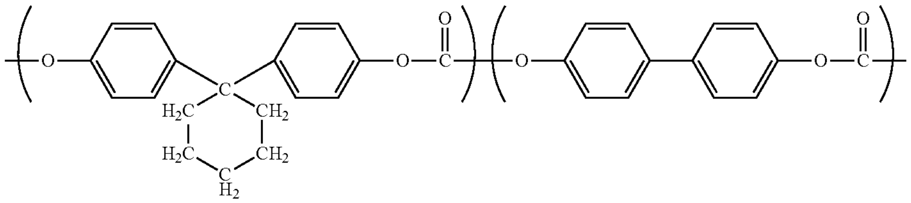
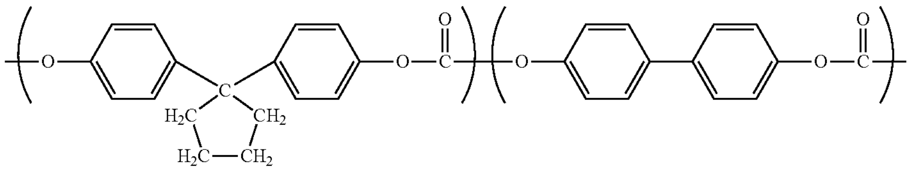
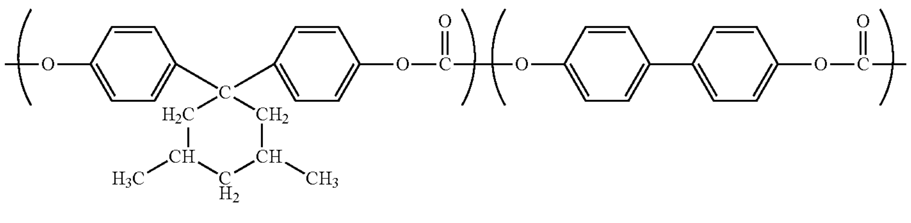

-continued

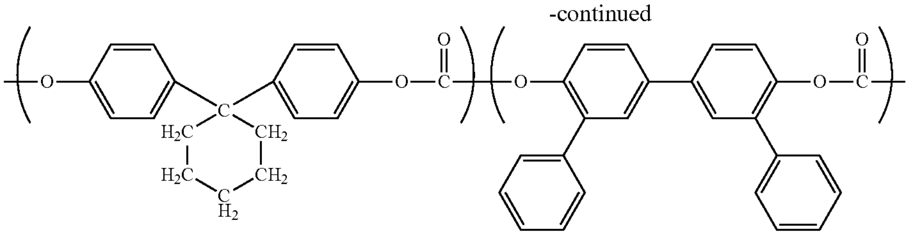

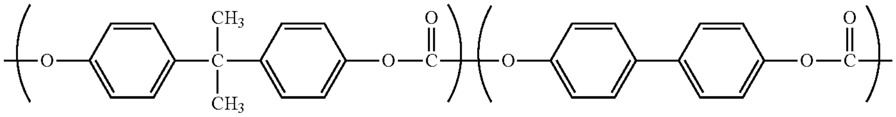

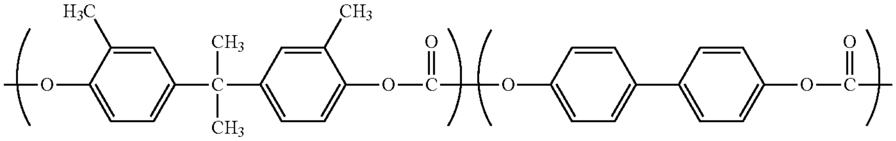

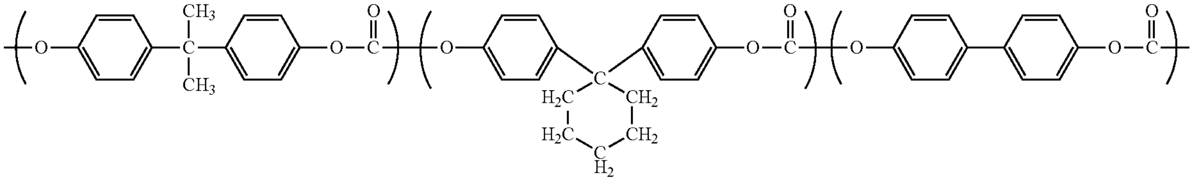

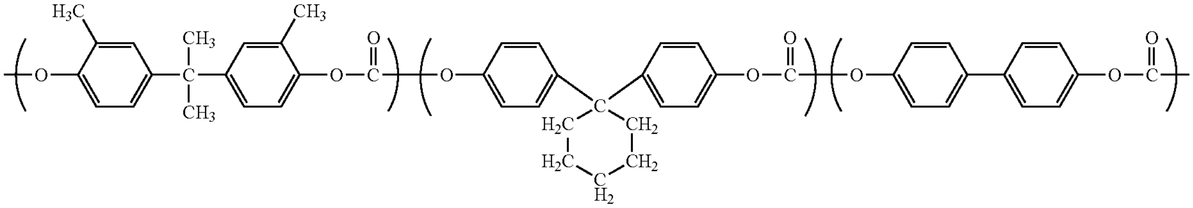

In particular, in order to maximize the effects of the present invention, a polycarbonate which contains a bisphenol derivative having the following structure is preferred.

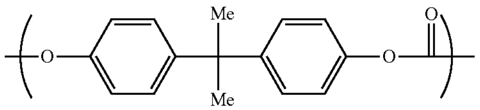

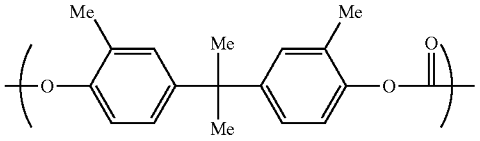

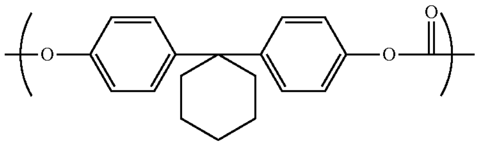

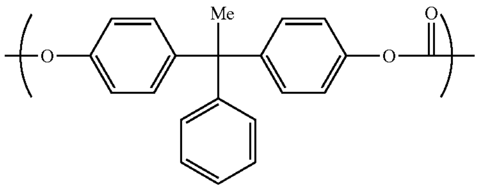

-continued

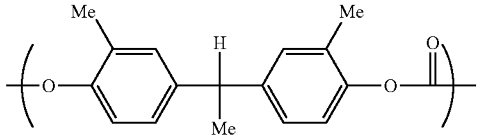

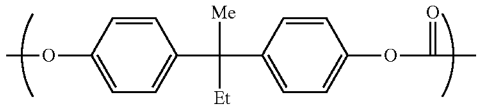

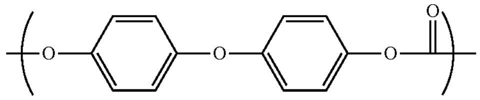

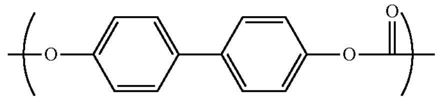

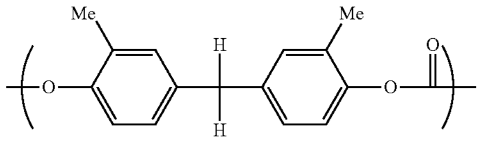

In order to improve mechanical properties, it is preferable to use polyester, particularly polyarylate. In this case, it is preferable to use a compound having the following structure as a bisphenol component.

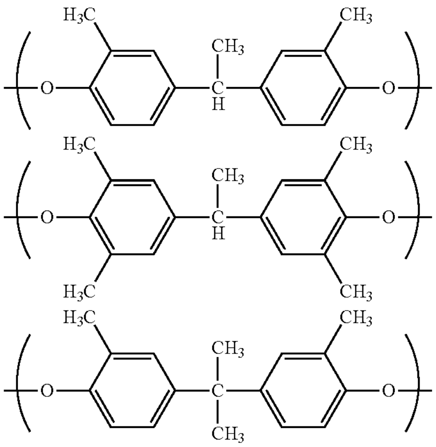

In addition, it is preferable to use a compound having the following structure as an acid component.

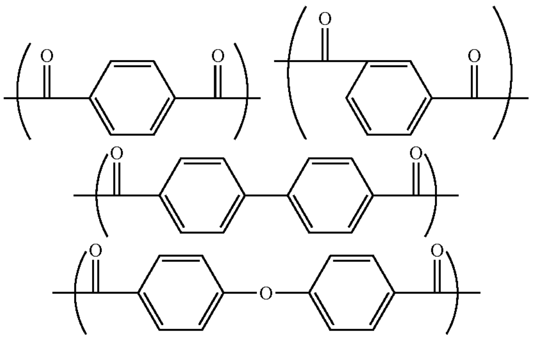

When terephthalic acid and isophthalic acid are used, the molar ratio of terephthalic acid is preferably higher, and it is preferable to use a compound having the following structure.

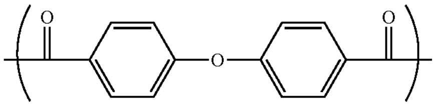

(Other Substances)

In order to improve the film forming property, flexibility, coatability, contamination resistance, gas resistance, and light resistance, the photosensitive layer may contain additives such as known antioxidants, plasticizers, ultraviolet absorbers, electron withdrawing compounds, leveling agents, and visible light blocking agents, in addition to the above materials.

The photosensitive layer may contain, if necessary, various additives such as sensitizers, dyes, pigments, and surfactants, in addition to the above leveling agents for improving the coatability. Examples of the dyes and the pigments include various pigment compounds and azo compounds (excluding the above charge generation substances), and examples of the surfactants include silicone oil and fluorine-based compounds.

One of these may be appropriately used alone, or two or more of these may be used in any desired ratio and in any desired combination in the photosensitive layer. In particular, it is preferable that the following antioxidant and electron withdrawing compound are contained.

[Antioxidant]

The antioxidant is one kind of stabilizer used to prevent oxidation of the electrophotographic photoreceptor of the present invention.

The antioxidant may be one having a function as a radical scavenger, and specific examples thereof include phenol derivatives, amine compounds, phosphonic acid esters, sulfur compounds, vitamins, vitamin derivatives, or the like.

Among them, phenol derivatives, amine compounds, and vitamins are preferred. Hindered phenols or trialkylamine derivatives having a bulky substituent near the hydroxy group are more preferred.

In addition, an aryl compound derivative having a t-butyl group at an o-position relative to a hydroxy group, and an aryl compound derivative having two t-butyl groups at o-positions relative to a hydroxy group are particularly preferred.

When the molecular weight of the antioxidant is too large, the antioxidant ability may be lowered, and a compound having a molecular weight of 1500 or less and particularly 1000 or less is preferred. As the lower limit, the molecular weight is generally 100 or more, preferably 150 or more, and more preferably 200 or more.

As the antioxidant which can be used in the present invention, all known materials used as antioxidants for plastics, rubber, petroleum, and oils and fats, ultraviolet absorbers, and light stabilizers can be used. In the present invention, one of the antioxidants may be appropriately used alone, or two or more of the antioxidants may be used in any desired ratio and in any desired combination.

Hindered phenols are particularly preferred. The hindered phenols refer to phenols having a bulky substituent near the hydroxy group.

Among the hindered phenols, dibutylhydroxytoluene, octadecyl-3,5-di-tert-butyl-4-hydroxyhydrocinnamate or 1,3,5-trimethyl-2,4,6-tris-(3,5-di-tert-butyl-4-hydroxybenzyl)-benzene is preferred particularly.

These compounds are known as antioxidants for rubbers, plastics, and oils and fats, and some are commercially available.

The amount of the above antioxidants used is not particularly limited, and is generally 0.1 parts by mass or more, and preferably 1 part by mass or more, per 100 parts by weight of binder resin in the photosensitive layer. In addition, in order to obtain good electrical characteristics and printing durability, the amount is preferably 25 parts by mass or less, and more preferably 20 parts by mass or less.

[Electron Withdrawing Compound]

The electrophotographic photoreceptor of the present invention may contain an electron withdrawing compound.

Specific examples of the electron withdrawing compound include sulfonic acid ester compounds, carboxylic acid ester compounds, organic cyano compounds, nitro compounds, aromatic halogen derivatives, or the like. Sulfonic acid ester compounds and organic cyano compounds are preferred, and sulfonic acid ester compounds are particularly preferred. Only one of the above electron withdrawing compounds may be used alone, and two or more of the electron withdrawing compounds may be used in any desired ratio or in any desired combination.

It is understood that the electron withdrawing ability of the electron withdrawing compound can be predicted by the LUMO value (hereinafter, appropriately referred to as LUMOcal). In the present invention, among the above, compounds having a LUMOcal value of −0.5 eV or less and −5.0 eV or more by structural optimization using semi-empirical molecular orbital calculation using PM3 parameters (hereinafter, the expression may be described simply as a semi-empirical molecular orbital calculation) are particularly preferably used. When the absolute value of LUMOcal is 0.5 eV or more, the effect of the electron withdrawing ability can be expected more, and when it is 5.0 eV or less, better charging can be obtained. The absolute value of LUMOcal is more preferably 1.0 eV or more, still more preferably 1.1 eV or more, and particularly preferably 1.2 eV or more. The absolute value is more preferably 4.5 eV or less, still more preferably 4.0 eV or less, and particularly preferably 3.5 eV or less.

The following compounds are mentioned as a compound whose absolute value of LUMOcal is in the above range.

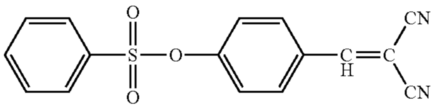

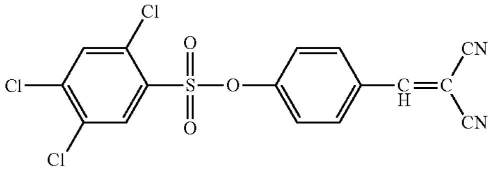

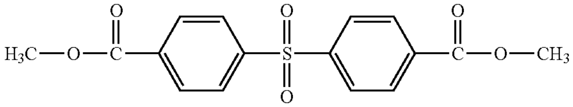

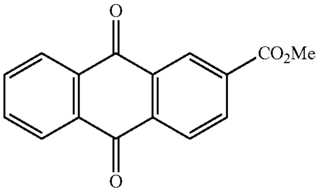

The amount of the electron withdrawing compounds used in the electrophotographic photoreceptor in the present invention is not particularly limited. In case of use in the photosensitive layer, the amount of the electron withdrawing compound is preferably 0.01 parts by mass or more, and more preferably 0.05 parts by mass or more per 100 parts by mass of the binder resin contained in the photosensitive layer. In addition, in order to obtain good electrical characteristics, the amount of the electron withdrawing compound is generally preferably 50 parts by mass or less, more preferably 40 parts by mass or less, and still more preferably 30 parts by mass or less.

(Method of Forming Photosensitive Layer)

Next, a method of forming the photosensitive layer will be described. The method of forming the photosensitive layer is not particularly limited. For example, the photosensitive layer can be formed by dispersing the charge generation substance in a coating liquid, which is obtained by dissolving (or dispersing) a charge transport substance, a binder resin, and other substances in a solvent (or dispersion medium), and coating the coating liquid onto a conductive support (in the case of providing an intermediate layer such as an undercoat layer described below, onto the intermediate layers).

Hereinafter, the solvent or dispersion medium used for forming the photosensitive layer, and the coating method will be described.

[Solvent or Dispersion Medium]

Examples of the solvent or dispersion medium used for forming the photosensitive layer include alcohols such as methanol, ethanol, propanol, and 2-methoxyethanol; ethers such as tetrahydrofuran, 1,4-dioxane, and dimethoxyethane; esters such as methyl formate and ethyl acetate; ketones such as acetone, methyl ethyl ketone and cyclohexanone; aromatic hydrocarbons such as benzene, toluene, xylene and anisole; chlorinated hydrocarbons such as dichloromethane, chloroform, 1,2-dichloroethane, 1,1,2-trichloroethane, 1,1,1-trichloroethane, tetrachloroethane, 1,2-dichloropropane, and trichlorethylene; nitrogen-containing compounds such as n-butylamine, isopropanolamine, diethylamine, triethanolamine, ethylenediamine, and triethylenediamine; and aprotic polar solvents such as acetonitrile, N-methyl pyrrolidone, N,N-dimethylformamide, and dimethyl sulfoxide. One of these may be used alone, or two or more of these may be used in any desired ratio and in any desired combination.

[Coating Method]

Examples of a coating method of the coating liquid for forming the photosensitive layer include a spray coating method, a spiral coating method, a ring coating method, a dip coating method, or the like.

Examples of the spray coating method include air spray, airless spray, electrostatic air spray, electrostatic airless spray, rotary atomization electrostatic spray, hot spray, hot airless spray, or the like.

In the dip coating method, the total solid content concentration of the coating liquid or dispersion liquid is preferably 5% by mass or more, and more preferably 10% by mass or more. In addition, the total solid concentration is preferably 50% by mass or less, and more preferably 35% by mass or less.

The viscosity of the coating liquid or dispersion liquid is preferably 50 mPa s or more, and more preferably 100 mPa s or more. In addition, the viscosity is preferably 700 mPa·s or less, and more preferably 500 mPa·s or less. Accordingly, a photosensitive layer excellent in uniformity of film thickness can be obtained.

A coating film is formed by the above coating method, and then the coating film is dried. It is preferable that the drying temperature and time are adjusted so as to perform necessary and sufficient drying.

The drying temperature is generally 100° C. or higher, preferably 110° C. or higher, and more preferably 120° C. or higher from the viewpoint of reducing the residual solvent. In addition, from the viewpoints of preventing the generation of bubbles and obtaining electrical characteristics, the temperature is generally 250° C. or lower, preferably 170° C. or lower, and more preferably 140° C. or lower. The temperature may be changed stepwise.

A hot air dryer, a steam dryer, an infrared dryer, a far-infrared dryer, or the like can be used for a drying method.

In providing the outermost layer, only air drying at room temperature may be carried out after the coating of the photosensitive layer, and heat drying by the above method may be carried out after the coating of the outermost layer.

The thickness of the photosensitive layer is appropriately selected depending on the material to be used, and is preferably 5 μm or more, more preferably 10 μm or more, and particularly preferably 15 μm or more, from the viewpoint of the lifespan. In addition, the thickness is preferably 100 μm or less, more preferably 50 μm or less, and particularly preferably 30 μm or less, from the viewpoint of electrical characteristics.

<Outermost Layer>

Next, the outermost layer of the photoreceptor of the present invention will be described. At least one outermost layer of the photoreceptor used in the present invention contains a polymer having a first structure in which at least one carbonyl group is bonded to an aromatic group and a second structure represented by the following Formula (A).

(A)

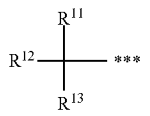

(In Formula (A), $R^{11}$ to $R^{13}$ each independently represent a hydrogen atom, a hydrocarbon group, an alkoxy group, a methylol group, or a group represented by the following Formula (2), wherein at least two of $R^{11}$ to $R^{13}$ are groups represented by the following Formula (2). *** indicates a bond with an arbitrary atom).

(2)

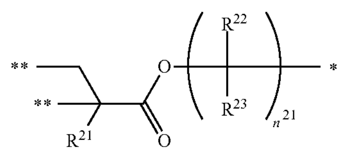

(In Formula (2), $R^{21}$ represents a hydrogen atom or a methyl group, $R^{22}$ and $R^{23}$ each independently represent a hydrogen atom, a hydrocarbon group or an alkoxy group, $n^{21}$ is an integer of 1 or more and 10 or less. * indicates a bond with a carbon atom to which $R^{11}$ to $R^{13}$ in the above Formula (A) are bonded, and ** indicates a bond with an arbitrary atom).

At least one outermost layer according to another embodiment used in the present invention contains a polymer having a structure represented by the following Formula (1).

(1)

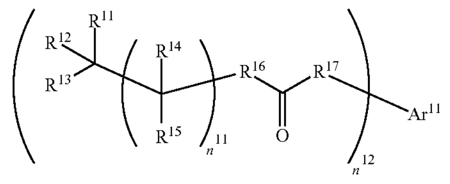

In Formula (1), $Ar^{11}$ represents an aromatic group, with the proviso that the aromatic group is optionally substituted with at least one selected from the group consisting of an alkyl group, a halogen atom, an alkoxy group, an amino group, an alkyl carbonyl group, an aryl carbonyl group, an alkyl ester group and an aryl ester group. $R^{11}$, $R^{12}$, and $R^{13}$ each independently represent a hydrogen atom, a hydrocarbon group, an alkoxy group, a methylol group, a group represented by the following Formula (2) or a group represented by the following Formula (3), and at least two of $R^{11}$ to $R^{13}$ are groups represented by the following Formula (2) or groups represented by the following Formula (3). $R^{14}$ and $R^{15}$ each independently represent a hydrogen atom, a hydrocarbon group or an alkoxy group, and $R^{16}$ and $R^{17}$ are a single bond or an oxygen atom, $n^{12}$ represents an integer of 1 or more and 6 or less, $n^{11}$ represents an integer of 1 or more and 10 or less.

(2)

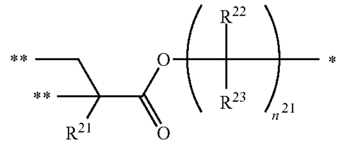

In Formula (2), $R^{21}$ represents a hydrogen atom or a methyl group, $R^{22}$ and $R^{23}$ each independently represent a hydrogen atom, a hydrocarbon group or an alkoxy group, $n^{21}$ is an integer of 1 or more and 10 or less. * indicates a bond with a carbon atom to which $R^{11}$ to $R^{13}$ in the above Formula (1) are bonded, and ** indicates a bond with an arbitrary atom.

(3)

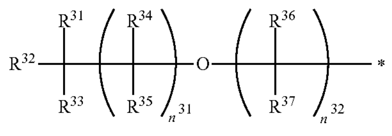

In Formula (3), $R^{31}$, $R^{32}$, and $R^{33}$ each independently represent a hydrogen atom, a hydrocarbon group, an alkoxy group, a methylol group, or a group represented by the above Formula (2), and at least two of $R^{31}$ to $R^{33}$ represent groups represented by the above Formula (2). $R^{34}$ to $R^{37}$ each independently represent a hydrogen atom, a hydrocarbon group or an alkoxy group, and $n^{31}$ and $n^{32}$ are each independently an integer of 1 or more and 10 or less. * indicates a bond with a carbon atom to which $R^{11}$ to $R^{13}$ in the above Formula (1) are bonded.

In Formula (1), the number of carbon atoms of the aromatic group of $Ar^{11}$ is generally 6 or more, and is generally 20 or less, and preferably 10 or less from the viewpoint of solubility. Specific examples thereof include a group derived from benzene, naphthalene or anthracene. Among them, a group derived from benzene is preferred.

The aromatic group of $Ar^{11}$ is optionally substituted with at least one selected from the group consisting of an alkyl group, a halogen atom, an alkoxy group, an amino group, an alkyl carbonyl group, an aryl carbonyl group, an alkyl ester group and an aryl ester group, and may preferably be substituted with at least one selected from the group consisting of an alkyl group, an alkoxy group and a halogen atom. Examples of the above alkyl group include a methyl group, an ethyl group, an n-propyl group, an iso-propyl group, an n-butyl group, an iso-butyl group and a tert-butyl group. Examples of the alkoxy group include a methoxy group, an ethoxy group, a propoxy group, a butoxy group, a phenoxy group and the like. Examples of the halogen atom include a fluorine atom, a chlorine atom, and a bromine atom. Among them, from the viewpoints of electrical characteristics and solubility, a methyl group, a tert-butyl group, a methoxy group, or a chlorine atom is preferred, and a methyl group, a tert-butyl group or a methoxy group is more preferred.

In Formula (1) and Formula (A), examples of the hydrocarbon group of $R^{11}$, $R^{12}$ and $R^{13}$ include an aliphatic hydrocarbon group and an aromatic hydrocarbon group.

Examples of the aliphatic hydrocarbon group include an alkyl group, an alkenyl group, and an alkynyl group. The number of carbon atoms of the aliphatic hydrocarbon group is not particularly limited. The number of carbon atoms of the alkyl group is generally 1 or more, and the number of carbon atoms of the alkenyl group and the alkynyl group is generally 2 or more.

On the other hand, the number of carbon atoms of the alkyl group, the alkenyl group, and the alkynyl group is preferably 20 or less, more preferably 10 or less, and particularly preferably 6 or less. When the number of carbon atoms is within the above range, high solvent affinity can be obtained.

Specific examples of the aliphatic hydrocarbon group include a methyl group, an ethyl group, an n-propyl group, an i-propyl group, an n-butyl group, a sec-butyl group, an i-butyl group, a tert-butyl group, an n-pentyl group, an isopentyl group, a sec-pentyl group, a neopentyl group, a 1-methylbutyl group, a 2-methylbutyl group, a 1,1-dimethylpropyl group, a 1,2-dimethylpropyl group, a vinyl group, a 1-propenyl group, a 2-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, an ethynyl group, a 1-propynyl group, a 2-propynyl group, a 1-butynyl group, a 2-butynyl group, a 3-butynyl group, a 1-pentynyl group, a 2-pentynyl group, a 3-pentynyl group, and a 4-pentynyl group. Among them, a methyl group and an ethyl group are preferred.

Examples of the aromatic hydrocarbon group include an aryl group and an aralkyl group. The number of carbon atoms of the aromatic hydrocarbon group is not particularly limited, and is generally 6 or more, and on the other hand, is generally 20 or less, and preferably 12 or less. When the number of carbon atoms is within the above range, solubility and electrical characteristics are excellent.

Specific examples of the aromatic hydrocarbon group include a phenyl group, a tolyl group, a xylyl group, an ethylphenyl group, an n-propylphenyl group, an i-propylphenyl group, an n-butylphenyl group, a sec-butylphenyl group, an i-butylphenyl group, a tert-butylphenyl group, a naphthyl group, an anthracene group, a biphenyl group and a pyrene group.

Examples of the alkoxy group of $R^{11}$, $R^{12}$ and $R^{13}$ include a methoxy group, an ethoxy group, a propoxy group, a butoxy group and a phenoxy group.

In Formula (A), at least two of $R^{11}$, $R^{12}$, and $R^{13}$ are groups represented by Formula (2), and from the viewpoint of film strength after the reaction, all of $R^{11}$, $R^{12}$, and $R^{13}$ are preferably groups represented by Formula (2).

In addition, in Formula (1), at least two of $R^{11}$, $R^{12}$, and $R^{13}$ are groups represented by Formula (2) or groups represented by Formula (3), and from the viewpoint of film strength after the reaction, it is preferable that all of $R^{11}$, $R^{12}$ and $R^{13}$ are groups represented by Formula (2), or all of $R^{11}$, $R^{12}$ and $R^{13}$ are groups represented by Formula (3).

In Formula (1), examples of $R^{14}$ and $R^{15}$ include those same as those of $R^{11}$ to $R^{13}$ described above. $R^{14}$ and $R^{15}$ are preferably hydrogen atoms from the viewpoint of the solubility in the solvent.

$R^{16}$ and $R^{17}$ are single bonds or oxygen atoms, and from the viewpoint of electrical characteristics, it is preferable that $R^{16}$ is an oxygen atom and $R^{17}$ is a single bond.

In Formula (1), $n^{12}$ is an integer of 1 or more and 6 or less, and is generally 1 or more, preferably 2 or more, and is generally 6 or less, preferably 4 or less, and more preferably 3 or less, $n^{12}$ is most preferably 2 from the viewpoints of the solubility and the film strength after reaction.

In Formula (2), $R^{22}$ and $R^{23}$ each independently represent a hydrogen atom, a hydrocarbon group or an alkoxy group. Specific examples thereof include those same as the hydrogen atom, the hydrocarbon group or the alkoxy group of $R^{11}$ to $R^{13}$.

In Formula (1), $n^{11}$ is an integer of 1 or more and 10 or less, and is generally 1 or more, and is generally 10 or less, preferably 6 or less, and more preferably 4 or less, $n^{11}$ is most preferably 1 from the viewpoint of the solubility in the solvent.

In Formula (2), $n^{21}$ is an integer of 1 or more and 10 or less, and is generally 1 or more, and is generally 10 or less, preferably 6 or less, and more preferably 4 or less, $n^{21}$ is most preferably 1 from the viewpoint of the solubility in the solvent.

In Formula (3), examples of $R^{31}$, $R^{32}$, and $R^{33}$ include those same as those of $R^{11}$ to $R^{13}$ described above.

Examples of $R^{34}$, $R^{35}$, $R^{36}$, and $R^{37}$ are same as those of $R^{14}$ and $R^{15}$.

Examples of $n^{31}$ and $n^{32}$ are same as those of $n^{21}$.

The structure represented by Formula (1) is preferably a structure represented by the following Formula (1-A).

(1-A)

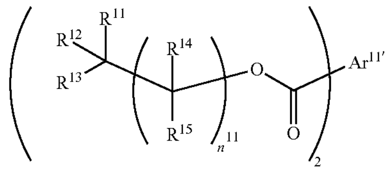

In Formula (1-A), $Ar^{11'}$ represents a divalent aromatic group, with the proviso that the divalent aromatic group is optionally substituted with at least one selected from the group consisting of an alkyl group, a halogen atom, an alkoxy group, an amino group, an alkyl carbonyl group, an aryl carbonyl group, an alkyl ester group and an aryl ester group. $R^{11}$, $R^{12}$, and $R^{13}$ each independently represent a hydrogen atom, a hydrocarbon group, an alkoxy group, a methylol group, a group represented by the above Formula (2) or a group represented by the above Formula (3), and at least two of $R^{11}$ to $R^{13}$ are groups represented by the above Formula (2) or groups represented by the above Formula (3). $R^{14}$ and $R^{15}$ each independently represent a hydrogen atom, a hydrocarbon group or an alkoxy group, and $n^{11}$ represents an integer of 1 or more and 10 or less.

Examples of $Ar^{11'}$, $R^{11}$, $R^{12}$, $R^{13}$, $R^{14}$, $R^{15}$, and $n^{11}$ in Formula (1-A) include those same as those of $Ar^{11}$, $R^{11}$, $R^{12}$, $R^{13}$, $R^{14}$, $R^{15}$, and $n^{11}$ in the above Formula (1).

In addition, the structure represented by Formula (1) is more preferably a structure represented by the following Formula (1-B).

(1-B)

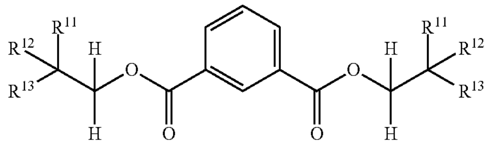

In Formula (1-B), $R^{11}$, $R^{12}$, and $R^{13}$ each independently represent a hydrogen atom, a hydrocarbon group, an alkoxy group, a methylol group, a group represented by the above Formula (2) or a group represented by the above Formula (3), and at least two of $R^{11}$ to $R^{13}$ are groups represented by the above Formula (2) or groups represented by the above Formula (3).

Examples of $R^{11}$ to $R^{13}$ in Formula (1-B) include those same as those of $R^{11}$ to $R^{13}$ in the above Formula (1).

When the polymer having a structure in which at least one carbonyl group is bonded to an aromatic group and a structure represented by Formula (A) or the polymer having a structure represented by Formula (1) is contained, a photoreceptor having excellent mechanical strength and good electrical characteristics can be obtained. Further, the characteristics of the two polymers are that they have an aromatic group or $Ar^{11}$ and that they have a plurality of structures represented by Formula (2).

The raw material of the polymer having a structure in which at least one carbonyl group is bonded to an aromatic group and a structure represented by Formula (A) is not particularly limited, and is preferably obtained by polymerizing a compound having a structure in which at least one carbonyl group is bonded to an aromatic group and a structure represented by the following Formula (A').

(A')

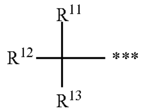

(In Formula (A'), $R^{11}$ to $R^{13}$ each independently represent a hydrogen atom, a hydrocarbon group, an alkoxy group, a methylol group, or a group represented by the following Formula (2'), and at least two of $R^{11}$ to $R^{13}$ are groups represented by the following Formula (2'). *** indicates a bond with an arbitrary atom.)

(2')

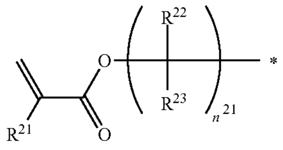

(In Formula (2'), $R^{21}$ represents a hydrogen atom or a methyl group, $R^{22}$ and $R^{23}$ each independently represent a hydrogen atom, a hydrocarbon group or an alkoxy group, and $n^{21}$ is an integer of 1 or more and 10 or less. * indicates a bond with a carbon atom to which $R^{11}$ to $R^{13}$ in the above Formula (A') are bonded.)

The raw material of the polymer having a structure represented by Formula (1) is not particularly limited, and is preferably obtained by polymerizing a compound having a structure represented by the following Formula (1').

(1')

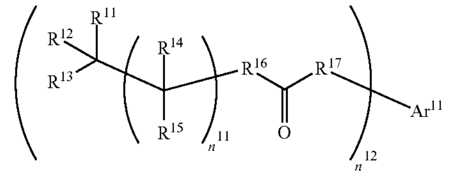

In Formula (1'), $Ar^{11}$ represents an aromatic group, with the proviso that the aromatic group is optionally substituted with at least one selected from the group consisting of an alkyl group, a halogen atom, an alkoxy group, an amino group, an alkyl carbonyl group, an aryl carbonyl group, an alkyl ester group and an aryl ester group. $R^{11}$, $R^{12}$, and $R^{13}$ each independently represent a hydrogen atom, a hydrocarbon group, an alkoxy group, a methylol group, a group represented by the following Formula (2') or a group represented by the following Formula (3'), and at least two of $R^{11}$ to $R^{13}$ are groups represented by the following Formula (2') or groups represented by the following Formula (3'). $R^{14}$ and $R^{15}$ each independently represent a hydrogen atom, a hydrocarbon group or an alkoxy group, and $R^{16}$ and $R^{17}$ are a single bond or an oxygen atom, $n^{12}$ represents an integer of 1 or more and 6 or less, $n^{11}$ represents an integer of 1 or more and 10 or less.

(2')

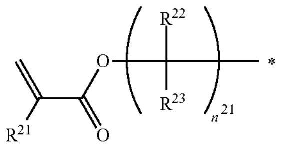

In Formula (2'), $R^{21}$ represents a hydrogen atom or a methyl group, $R^{22}$ and $R^{23}$ each independently represent a hydrogen atom, a hydrocarbon group or an alkoxy group, and $n^{21}$ is an integer of 1 or more and 10 or less. * indicates a bond with a carbon atom to which $R^{11}$ to $R^{13}$ in the above Formula (1') are bonded.

(3')

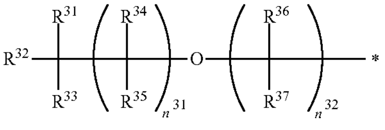

In Formula (3'), $R^{31}$, $R^{32}$, and $R^{33}$ each independently represent a hydrogen atom, a hydrocarbon group, an alkoxy group, a methylol group, or a group represented by the above Formula (2'), wherein at least two of $R^{31}$ to $R^{33}$ represent groups represented by the above Formula (2'). $R^{34}$ to $R^{37}$ each independently represent a hydrogen atom, a hydrocarbon group or an alkoxy group, and $n^{31}$ and $n^{32}$ are each independently an integer of 1 or more and 10 or less. * indicates a bond with a carbon atom to which $R^{11}$ to $R^{13}$ in the above Formula (1') are bonded.

The Formula (2') has an acryloyl group or a methacryloyl group which is a chain polymerizable functional group. Therefore, the compound having a structure in which at least one carbonyl group is bonded to an aromatic group and a structure represented by the above Formula (A') and the compound having a structure represented by the above Formula (1') have a plurality of acryloyl groups or methacryloyl groups. Therefore, it is considered that intermolecular cross-linking due to the polymerization reaction occurs at a high density, and a cured film having excellent mechanical strength is formed.

When a charge transport substance having a chain polymerizable functional group described below is used on the outermost layer, by having an aromatic group or $Ar^{11}$, π-electrons of the aromatic group or $Ar^{11}$ interact with the charge transport substance to improve the compatibility with the charge transport substance. As a result, it is presumed that the effects of preventing a decrease in mechanical strength due to the non-uniformity of the outermost layer such as phase separation, and also smoothing the charge transport in the outermost layer, and improving the electrical characteristics can be obtained. On the other hand, it is presumed that, when the outermost layer contains metal oxide particles described below, with the interaction between the JI electrons of the aromatic groups or $Ar^{11}$ and the surface of metal oxide particles, the dispersibility is improved, and as a result, the effects of smoothing the charge transport in the outermost layer and improving the electrical characteristics can be obtained.

It is considered that, from the viewpoint of the spread of conjugated bonds, the above effects are better in a case of having an aromatic group such as $Ar^{11}$ rather than a cyclic alkenyl group in which a hydrogen atom is added to a part of an aromatic group, or a cyclic alkyl group in which a hydrogen atom is added to all of the aromatic group. In addition, when at least one carbonyl group is bonded to an aromatic group, that is, when the site connecting $Ar^{11}$ and $R^{11}$ to $R^{13}$ has a structure of —$R^{16}$—CO—$R^{17}$—, a photoreceptor having low water absorption, excellent environmental dependence, and excellent electrical characteristics can be obtained.

Hereinafter, the compound having a structure in which at least one carbonyl group is bonded to an aromatic group and a structure represented by the following Formula (A'), and a compound having a structure represented by Formula (1') are exemplified.

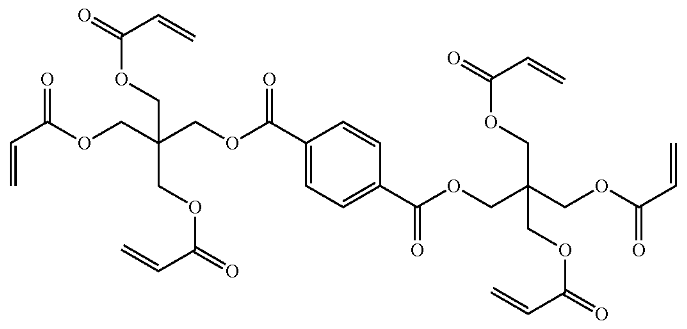

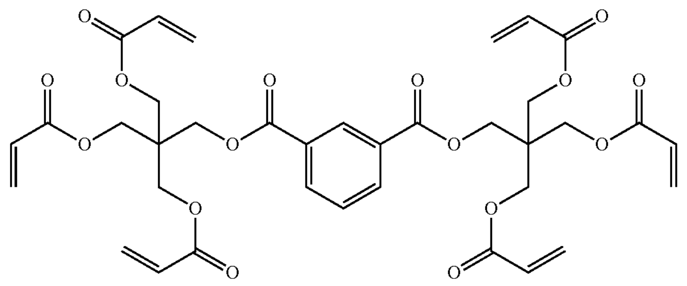

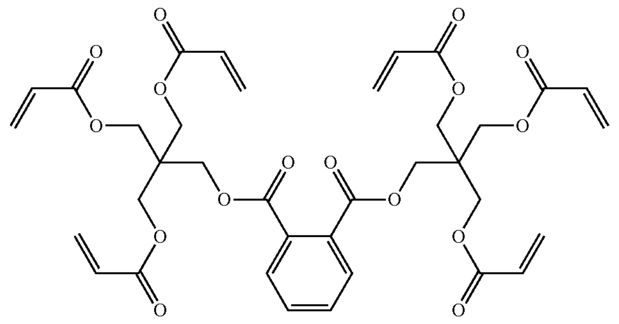

-continued
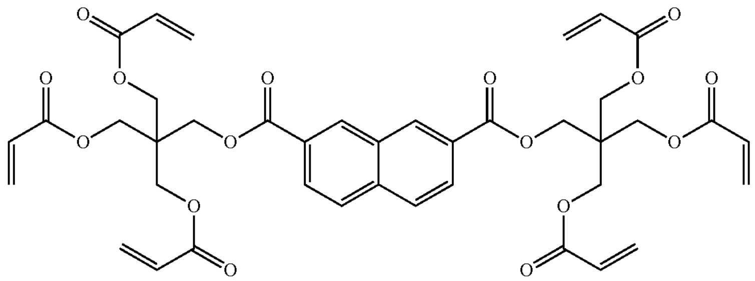
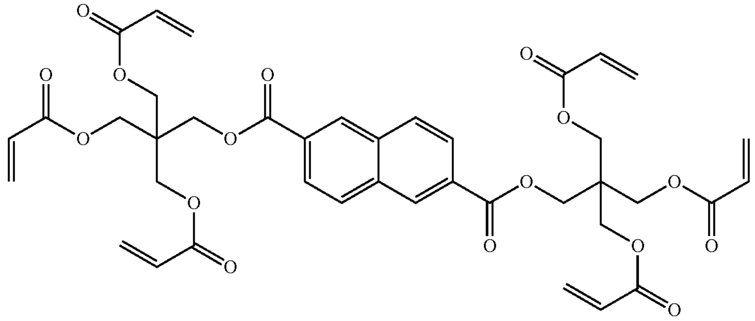
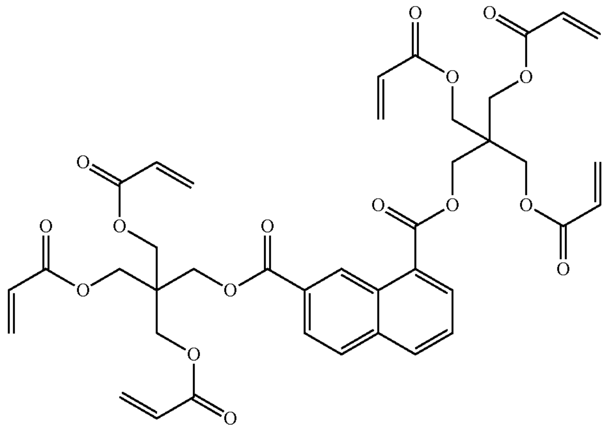
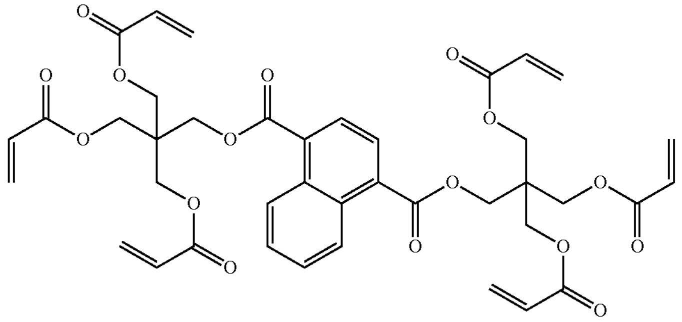
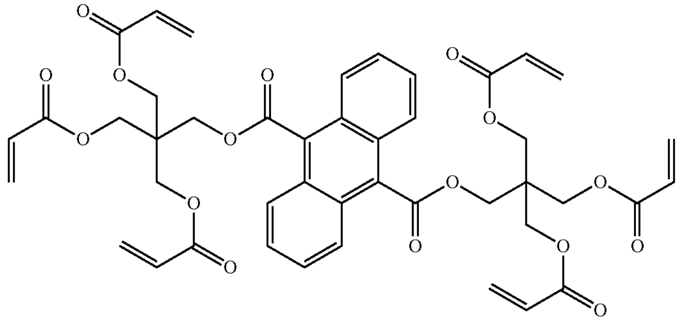

-continued
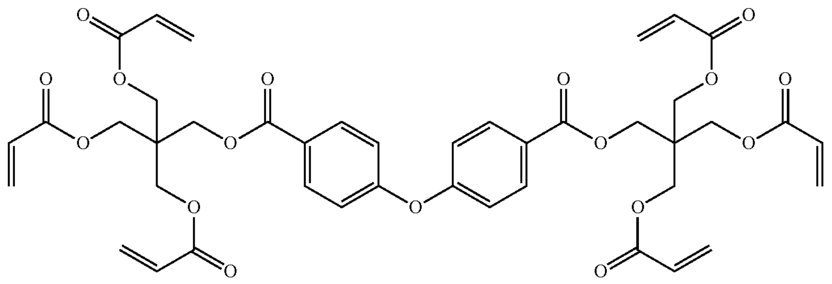
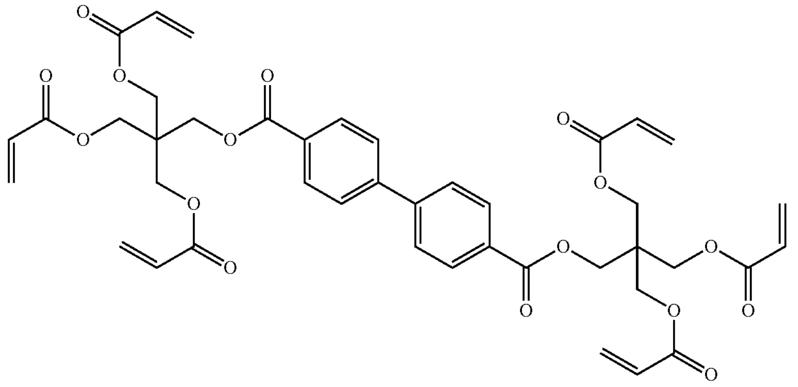
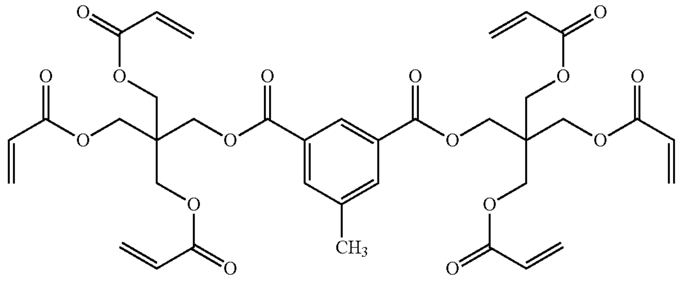
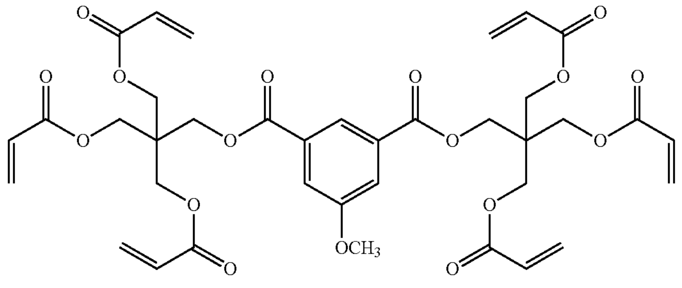
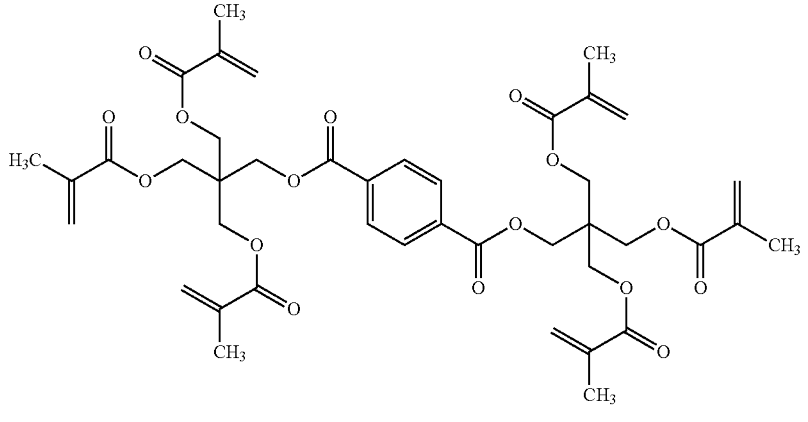

-continued
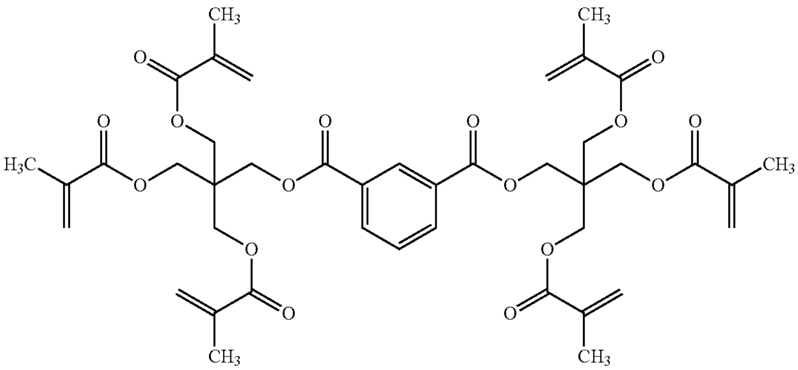
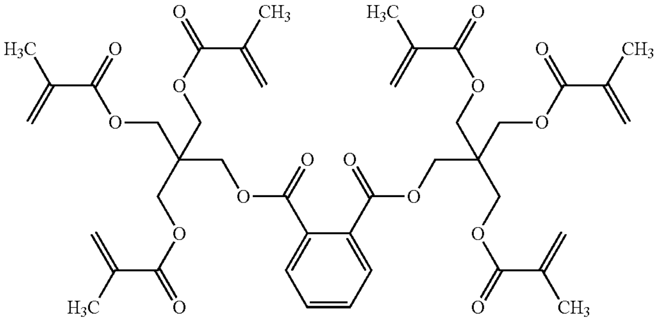
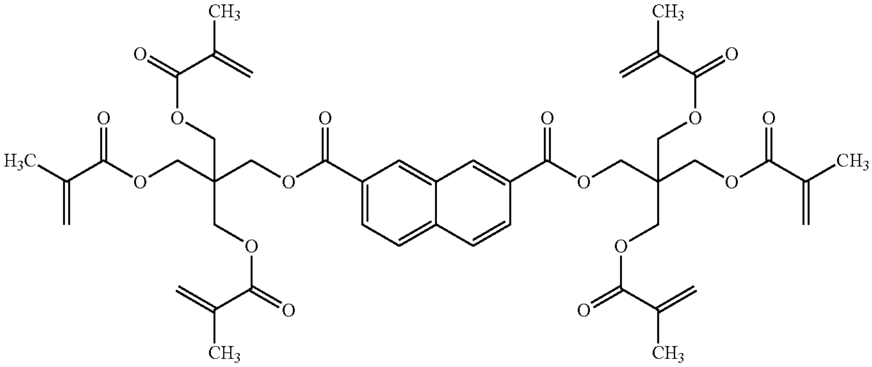
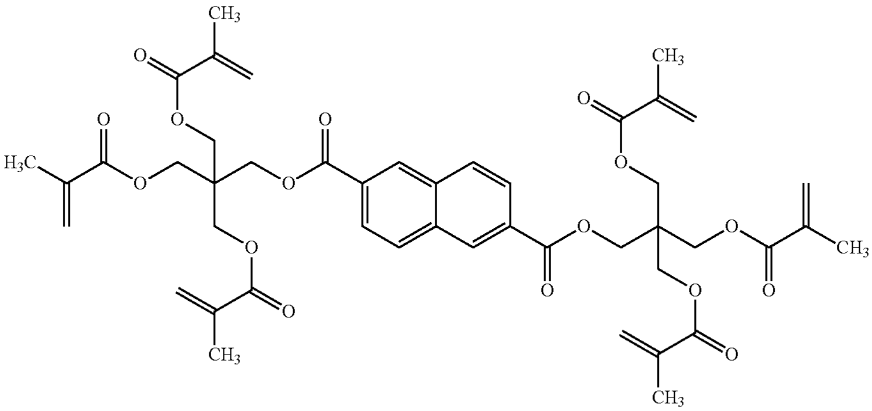

-continued
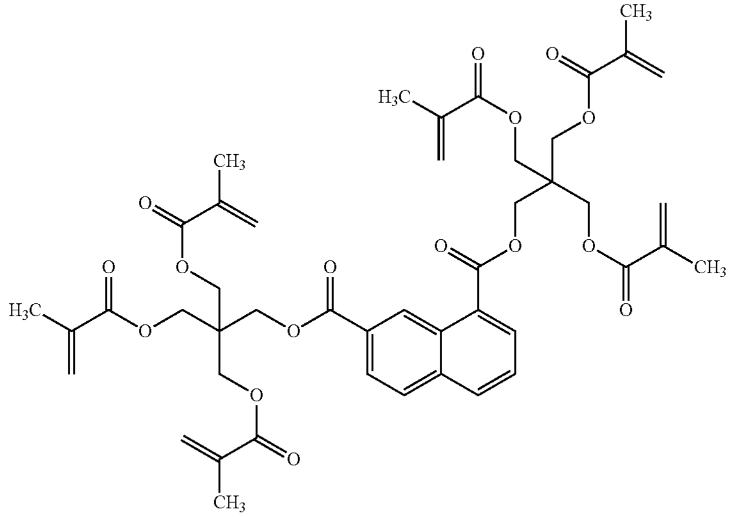
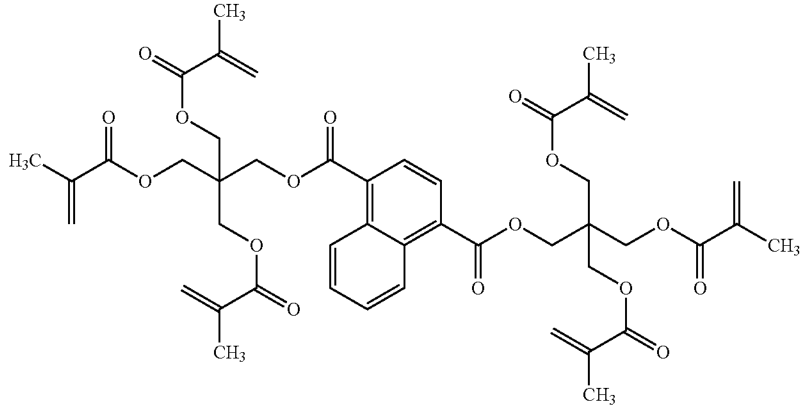
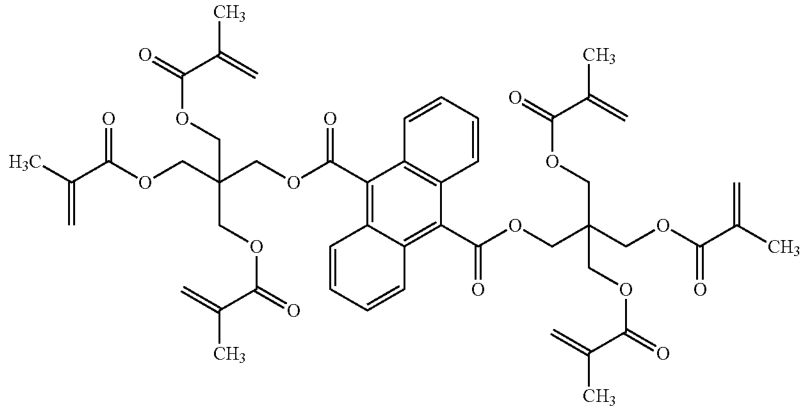
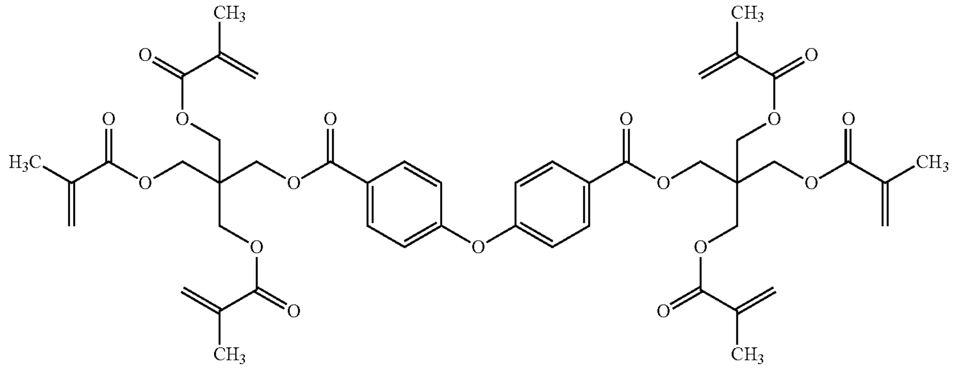

-continued
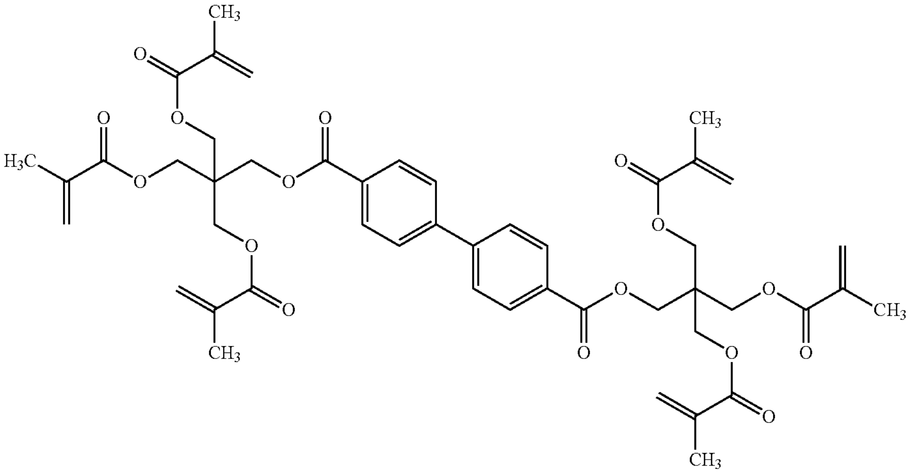
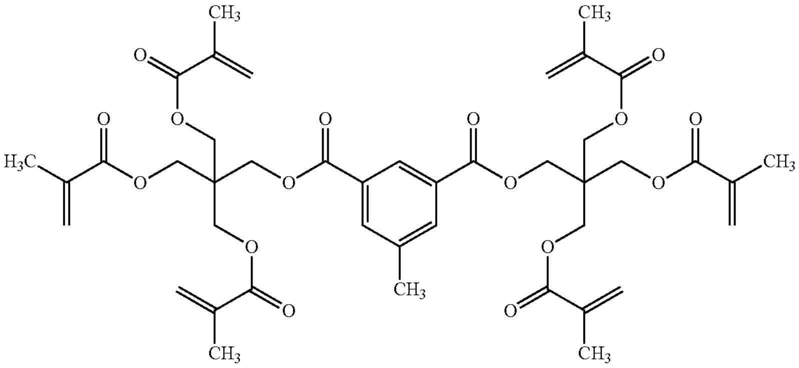
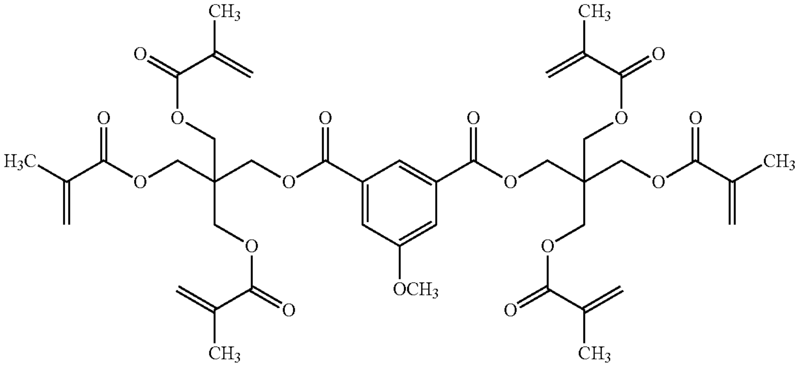
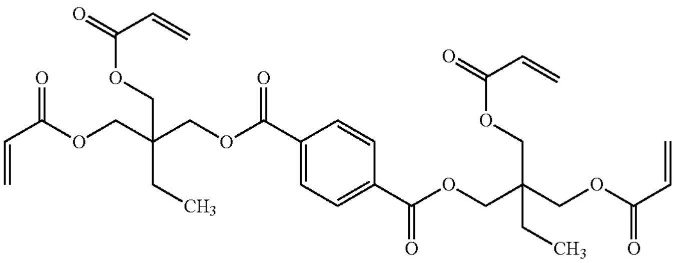
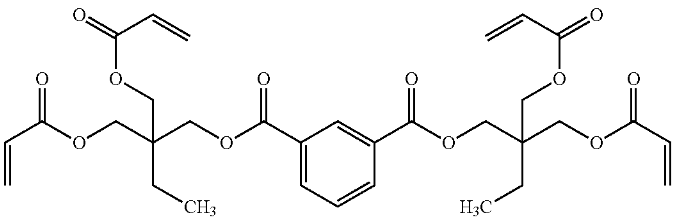

-continued
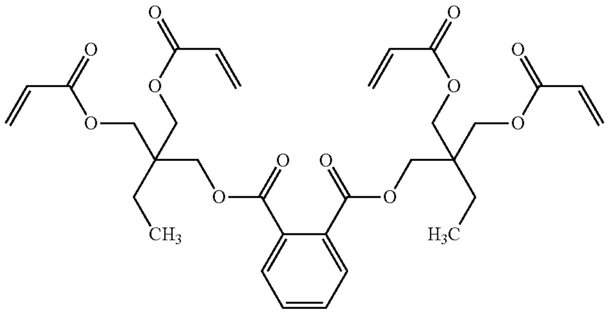
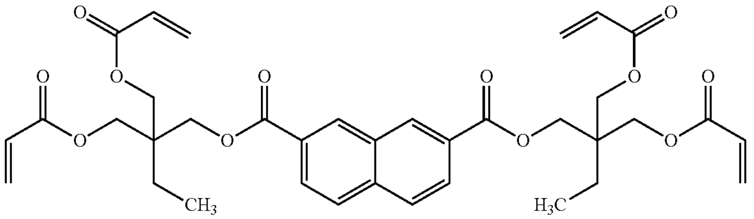
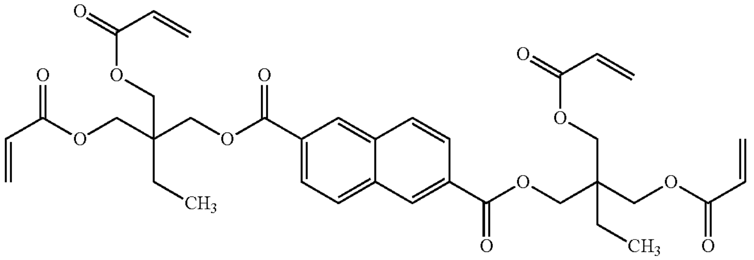
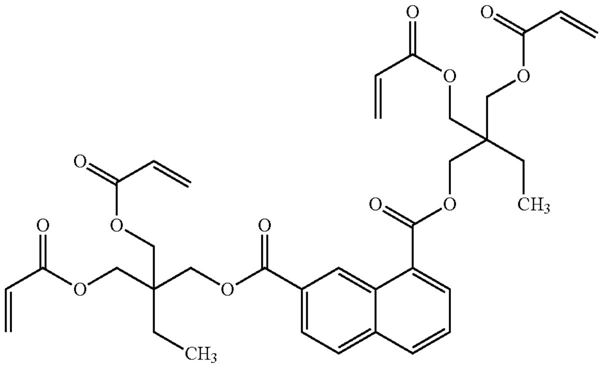
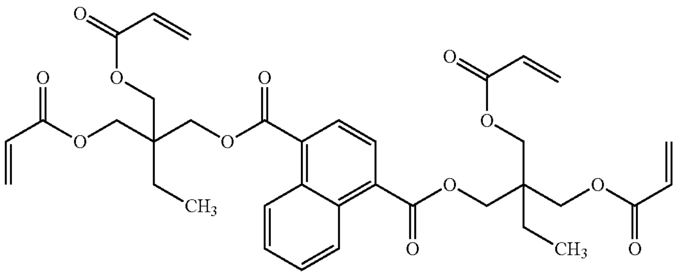
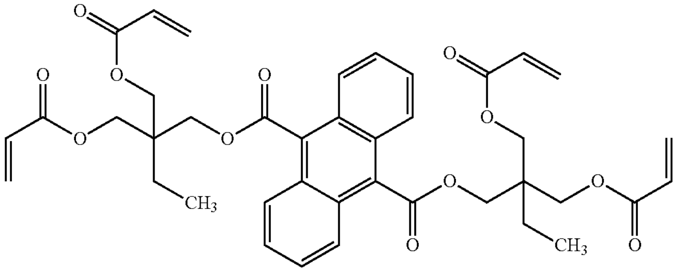

-continued
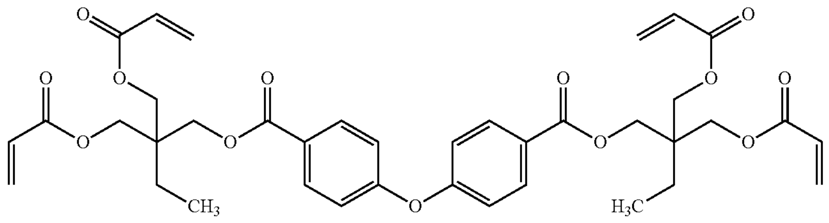
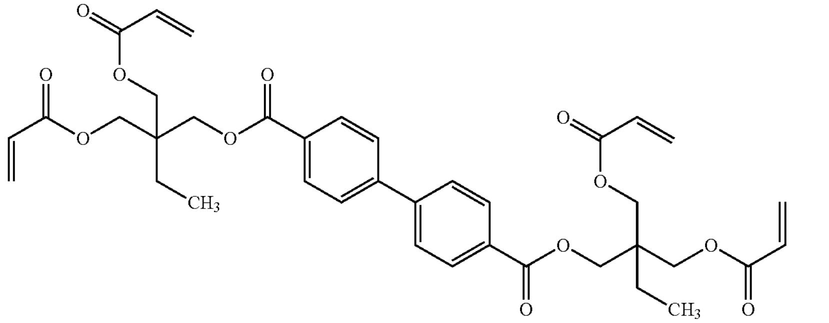
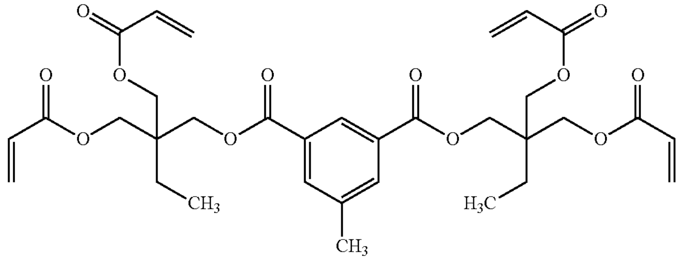
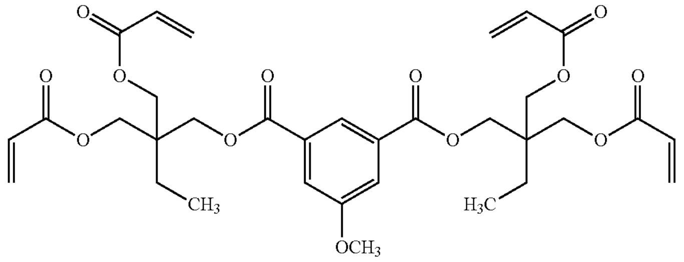
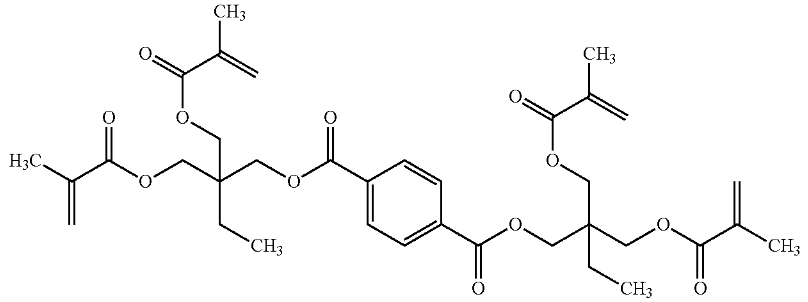
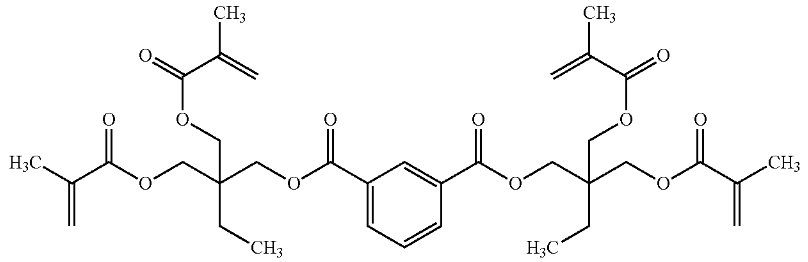

-continued
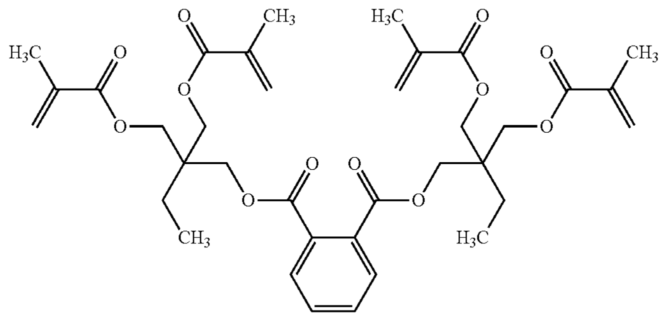
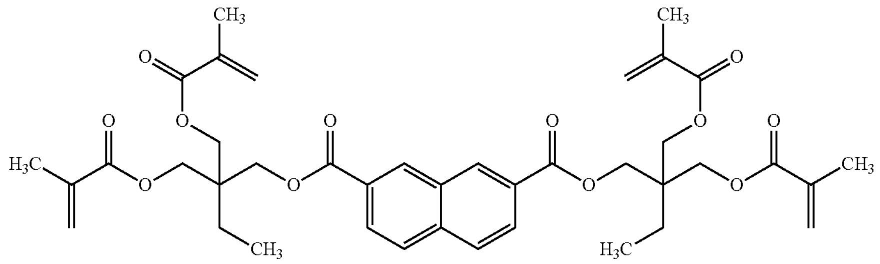
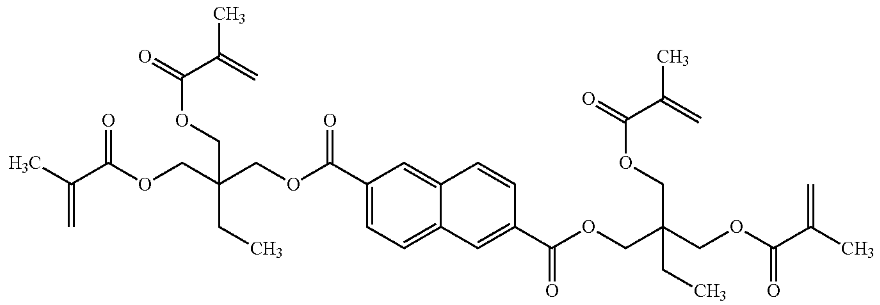
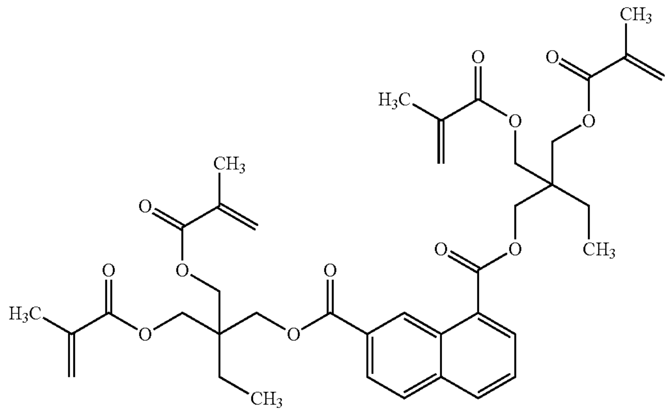
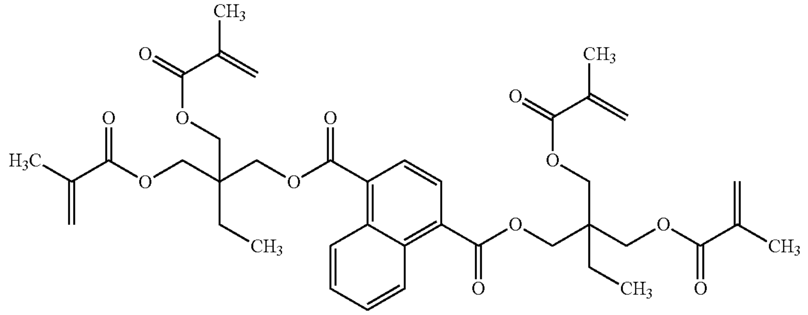

-continued
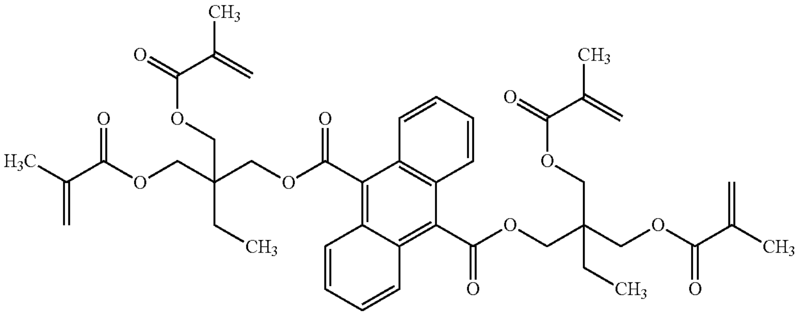
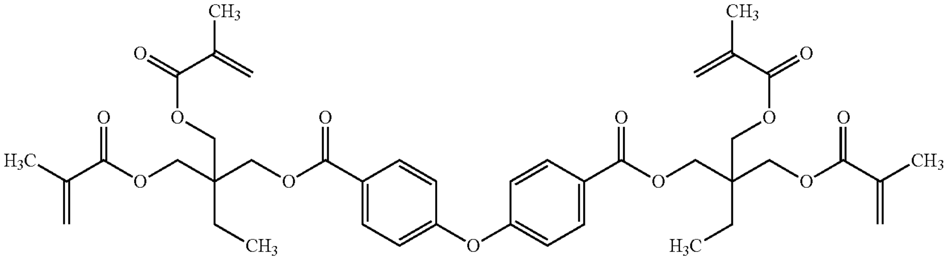
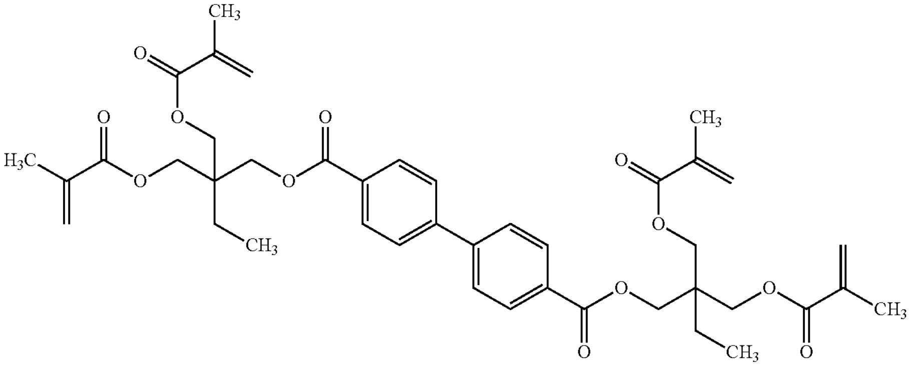
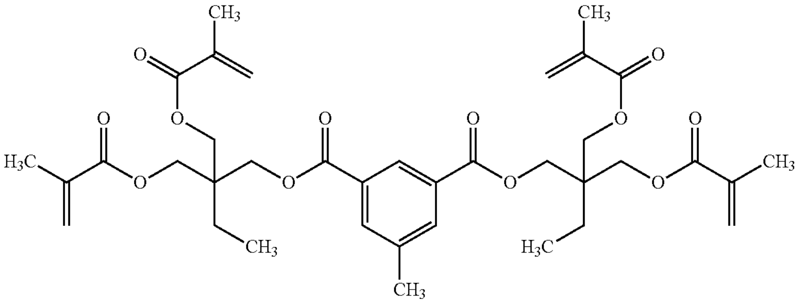
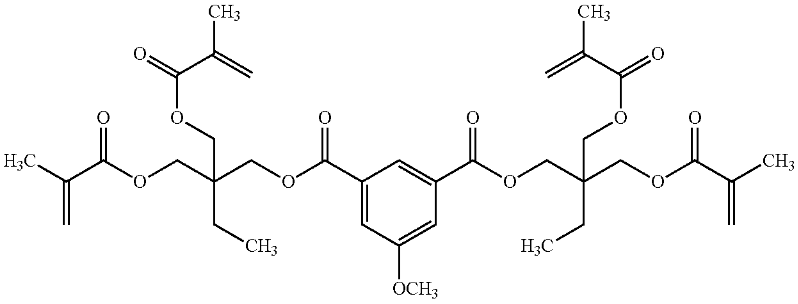

-continued
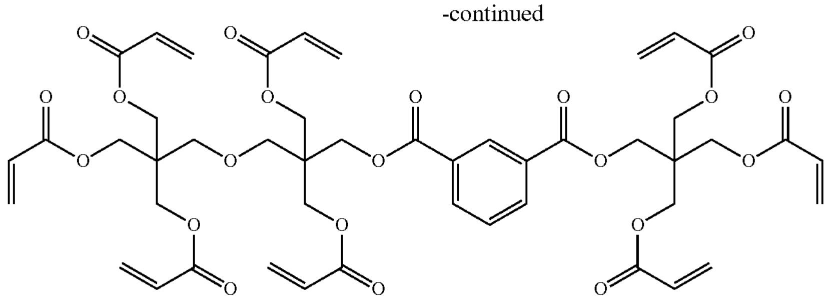
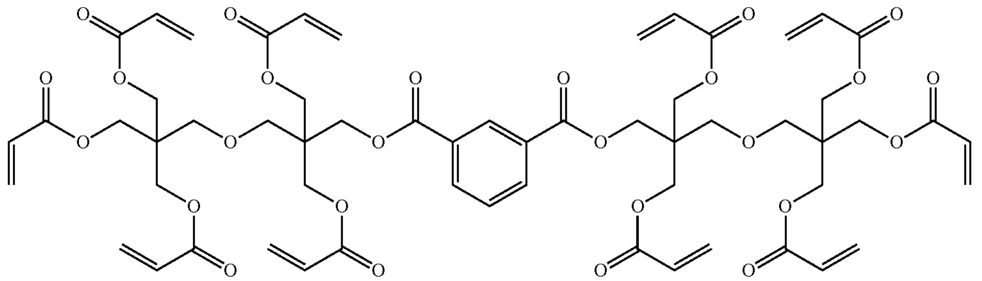
Among them, the following structures are preferred from the viewpoints of the solubility and the electrical characteristics.
(1-1)
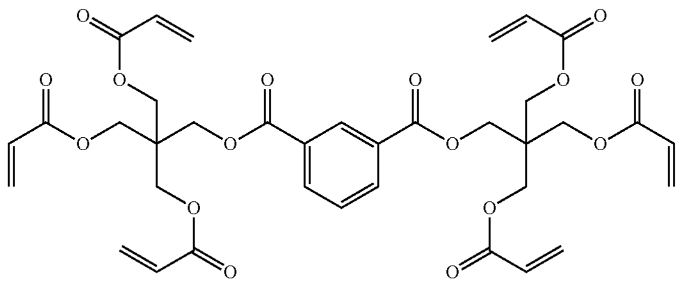
(1-2)
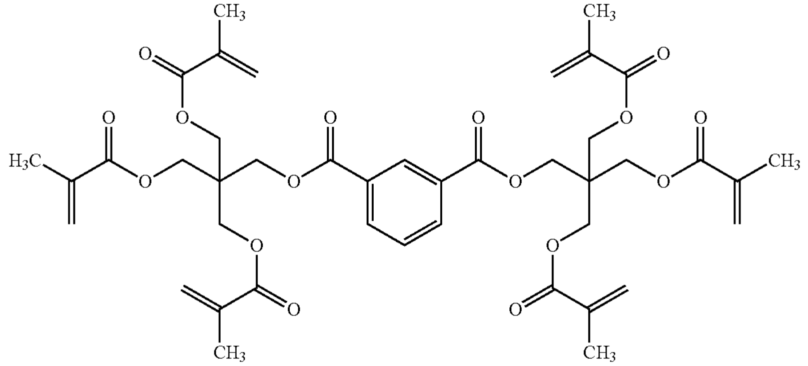
(1-3)
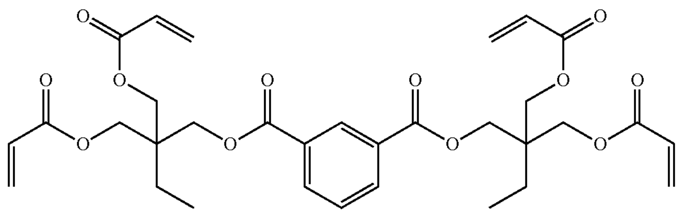

-continued (1-4)

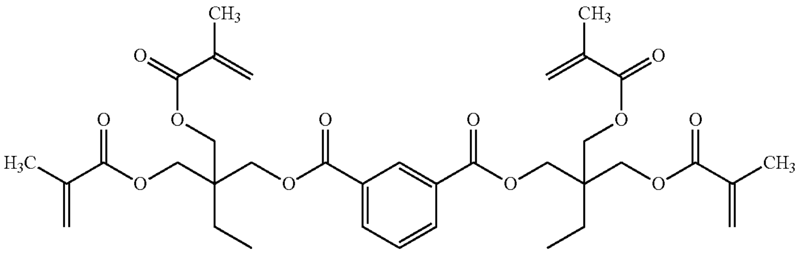

From the viewpoint of improving the mechanical strength and the charge transportability of the outermost layer, the polymer having a first structure in which at least one carbonyl group is bonded to an aromatic group and a second structure represented by Formula (A), or the polymer having a structure represented by Formula (1) preferably further has a partial structure having a charge transport ability.

The raw material of the polymer having a structure in which at least one carbonyl group is bonded to an aromatic group, a structure represented by Formula (A), and a partial structure having a charge transport ability, and the raw material of the polymer having a structure represented by Formula (1) and a partial structure having a charge transport ability are not particularly limited. The raw material is preferably obtained by polymerizing a compound having a structure represented by Formula (1') and a charge transport substance having a chain polymerizable functional group.

Examples of the chain polymerizable functional group of the charge transport substance having a chain polymerizable functional group include an acryloyl group, a methacryloyl group, a vinyl group and epoxy group. Among them, an acryloyl group or a methacryloyl group is preferred from the viewpoint of curability.

Examples of the structure of the charge transport substance portion of the charge transport substance having a chain polymerizable functional group, that is, the partial structure of the polymer having a charge transport ability, include heterocyclic compounds such as a carbazole derivative, an indole derivative, an imidazole derivative, an oxazole derivative, a pyrazole derivative, a thiadiazole derivative, and a benzofuran derivative, and electron donating substances such as an aniline derivative, a hydrazone derivative, an aromatic amine derivative, an arylamine derivative, a stilbene derivative, a butadiene derivative, an enamine derivative, and a combination of a plurality of kinds of these compounds or a polymer having a group formed of these compounds in a main chain or a side chain. Among them, a carbazole derivative, an aromatic amine derivative, an arylamine derivative, a stilbene derivative, a butadiene derivative, an enamine derivative, and a combination of a plurality of kinds of these compounds are preferred from the viewpoint of the electrical characteristics.

The partial structure having a charge transport ability is preferably a triarylamine structure, and more preferably a structure represented by the following Formula (4).

(4)

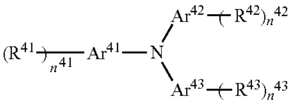

In Formula (4), $Ar^{41}$ to $Ar^{43}$ represent aromatic group. $R^{41}$ to $R^{43}$ each independently represent a hydrogen atom, an alkyl group, an alkoxy group, an aryl group, an alkyl halide group, a halogen atom, a benzyl group or a group represented by the following Formula (5). $n^{41}$ to $n^{43}$ each independently represent an integer of 1 or more. When $n^{41}$ is 1, $R^{41}$ is a group represented by the following Formula (5). When $n^{41}$ is an integer of 2 or more, $R^{41}$ existing of 2 or more may be the same or different, and at least one $R^{41}$ is a group of the following Formula (5). When $n^{42}$ is an integer of 2 or more, $R^{42}$ existing of 2 or more may be the same or different. When $n^{43}$ is an integer of 2 or more, $R^{43}$ existing of 2 or more may be the same or different.

(5)

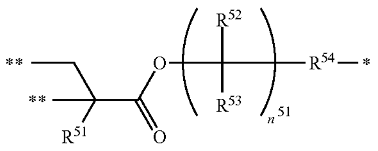

In Formula (5), $R^{51}$ represents a hydrogen atom or a methyl group, $R^{52}$ and $R^{53}$ each independently represent a hydrogen atom, a hydrocarbon group or an alkoxy group, $R^{54}$ represents a single bond or an oxygen atom, and $n^{51}$ represents an integer of 0 or more and 10 or less. * indicates a bond with $Ar^{41}$ to $Ar^{43}$ in the above Formula (4), and ** indicates a bond with an arbitrary atom.

In Formula (4), $Ar^{41}$ to $Ar^{43}$ are aromatic groups. Examples of a monovalent aromatic group include a phenyl group, a naphthyl group, an anthracenyl group, a phenanthrenyl group, a pyrene group, a biphenyl group and a fluorene group. Among them, a phenyl group is preferred from the viewpoint of the solubility or the photocurability. Examples of the divalent aromatic group include a phenylene group, a naphthylene group, an anthrylene group, a phenanthrene group, a pyrenylene group and a biphenylene group. Among them, a phenylene group is preferred from the viewpoint of the solubility or the photocurability.

$R^{41}$ to $R^{43}$ each independently represent a hydrogen atom, an alkyl group, an alkoxy group, an aryl group, an alkyl halide group, a halogen atom, a benzyl group or the above Formula (5). Among them, the number of carbon atoms of the alkyl group, the alkoxy group, and the alkyl halide group is generally 1 or more, and on the other hand, is generally 10 or less, preferably 8 or less, more preferably 6 or less, and further more preferably 4 or less.

Specific examples of the alkyl group include a methyl group, an ethyl group, a propyl group, an isopropyl group, a butyl group, a tert-butyl group, an isobutyl group, a cyclohexyl group, or the like. Specific examples of the alkoxy group include a methoxy group, an ethoxy group, a propoxy group, a cyclohexoxy group, or the like. Examples of the aryl group include a phenyl group, a naphthyl group, or the like. Examples of the alkyl halide group include a chloroalkyl group, a fluoroalkyl group, or the like. Examples of the halogen atom include a fluorine atom, a chlorine atom, a bromine atom, or the like. A methyl group, an ethyl group, or a phenyl group is more preferred.

$n^{41}$ to $n^{43}$ are each independently an integer of 1 or more, generally 1 or more, generally 5 or less, preferably 3 or less, and most preferably 1. When $n^{41}$ is 1, $R^{41}$ is a group represented by the following Formula (5). When $n^{41}$ is an integer of 2 or more, $R^{41}$ existing of 2 or more may be the same or different, and at least one is a group represented by the following Formula (5). When $n^{42}$ is an integer of 2 or more, $R^{42}$ existing of 2 or more may be the same or different. When $n^{43}$ is an integer of 2 or more, $R^{43}$ existing of 2 or more may be the same or different. From the viewpoint of the strength of the cured film, it is preferable that $n^{41}$ to $n^{43}$ are 1, $R^{41}$ is a group represented by Formula (5), and either $R^{42}$ or $R^{43}$ is a group represented by Formula (5), or $n^{41}$ to $n^{43}$ are 1, and $R^{41}$ to $R^{43}$ are groups represented by Formula (5). From the viewpoint of the solubility, it is more preferable that $n^{41}$ to $n^{43}$ are 1, $R^{41}$ is a group represented by Formula (5), and either $R^{42}$ or $R^{43}$ is a group represented by Formula (5).

Examples of $R^{52}$ and $R^{53}$ are same as those of $R^{22}$ and $R^{23}$, respectively.

$n^{51}$ is an integer of 0 or more and 10 or less, and is generally 0 or more, generally 10 or less, preferably 6 or less, more preferably 4 or less, and further more preferably 3 or less.

The raw material of the polymer having a structure represented by Formula (1) and a structure represented by Formula (4) is not particularly limited, and is preferably obtained by polymerizing the compound having a structure represented by Formula (1') and a compound having a structure represented by the following Formula (4').

(4')

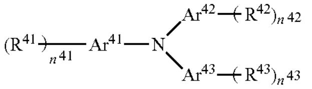

In Formula (4'), $Ar^{41}$ to $Ar^{43}$ are aromatic groups. $R^{41}$ to $R^{43}$ each independently represent a hydrogen atom, an alkyl group, an alkoxy group, an aryl group, an alkyl halide group, a halogen atom, a benzyl group or a group represented by the following Formula (5'). $n^{41}$ to $n^{43}$ each independently represent an integer of 1 or more. When $n^{41}$ is 1, $R^{41}$ is a group represented by the following Formula (5'). When $n^{41}$ is an integer of 2 or more, $R^{41}$ existing of 2 or more may be the same or different, and at least one $R^{41}$ is a group represented by the following Formula (5'). When $n^{42}$ is an integer of 2 or more, $R^{42}$ existing of 2 or more may be the same or different. When $n^{43}$ is an integer of 2 or more, $R^{43}$ existing of 2 or more may be the same or different.

(5')

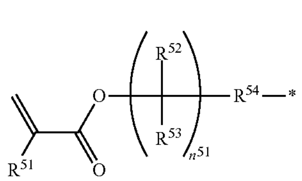

In Formula (5'), $R^{51}$ represents a hydrogen atom or a methyl group, $R^{52}$ and $R^{53}$ each independently represent a hydrogen atom, a hydrocarbon group or an alkoxy group, $R^{54}$ represents a single bond or an oxygen atom, and $n^{51}$ represents an integer of 0 or more and 10 or less. * indicates a bond with $Ar^{41}$ to $Ar^{43}$ in the above Formula (4').

Hereinafter, a compound having a structure represented by Formula (4') will be exemplified.

(4-1)

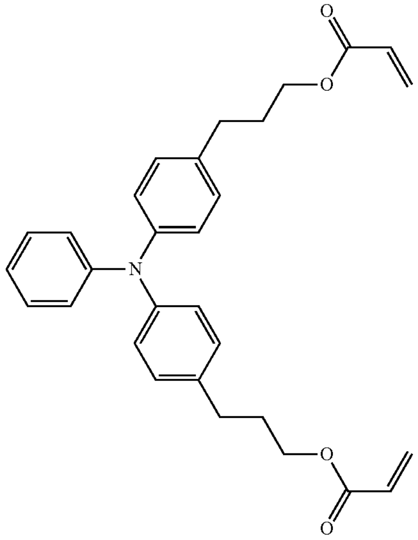

(4-2)

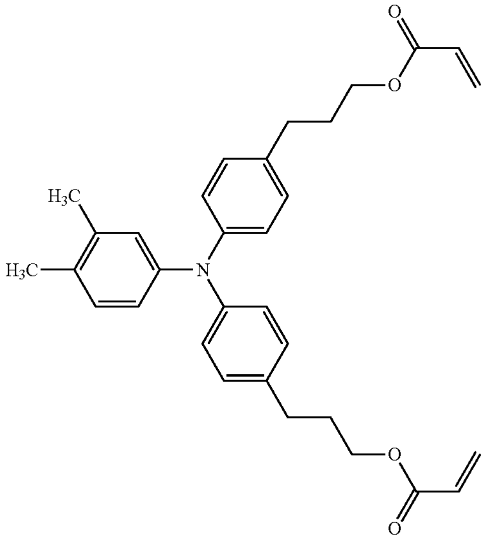

-continued
(4-3)
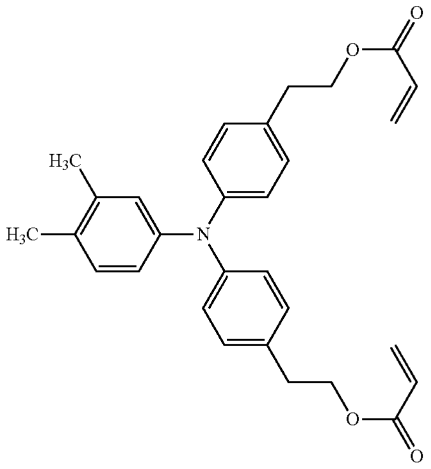
(4-4)
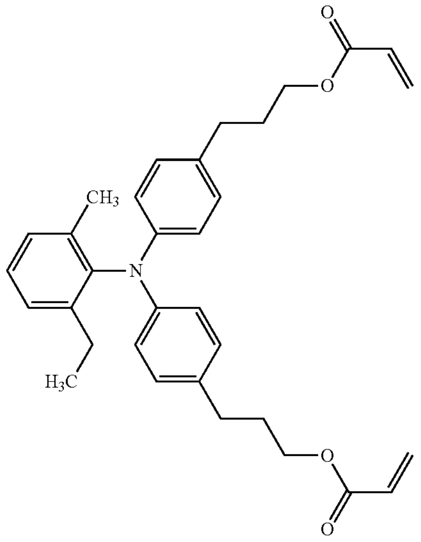
(4-5)
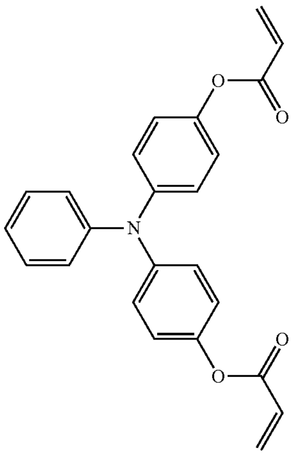
-continued
(4-6)
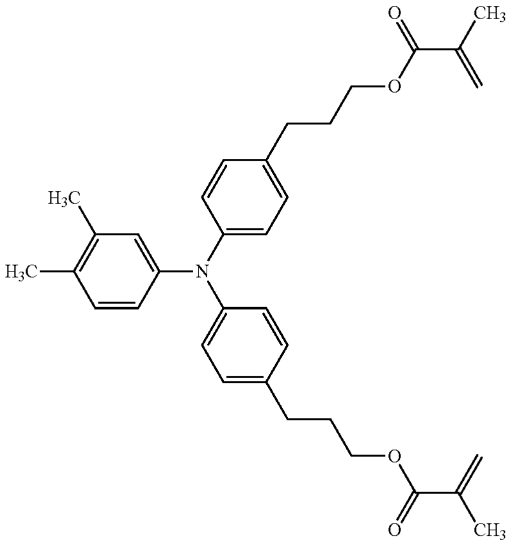
(4-7)
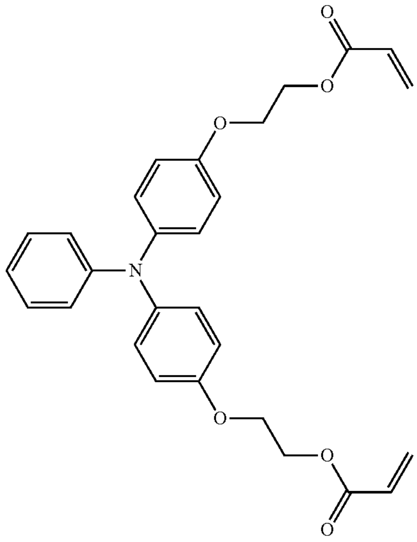
(4-8)
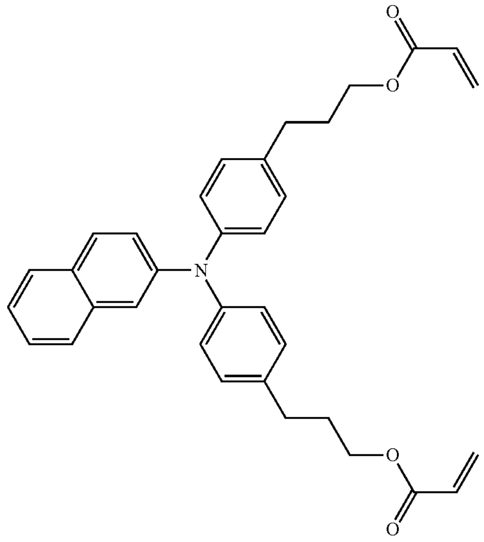

-continued (4-9)

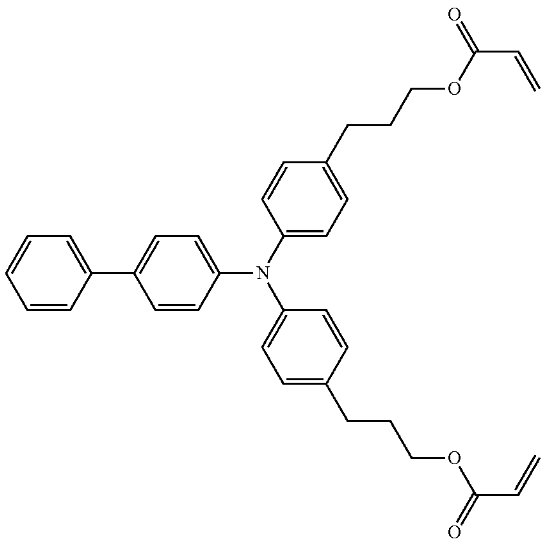

Among the above compounds, from the viewpoint of the electrical characteristics, compounds represented by Formula (4-1), Formula (4-2), Formula (4-3), Formula (4-4), Formula (4-6), and Formula (4-7) are preferred, and compounds represented by Formula (4-1), Formula (4-2), and Formula (4-3) are more preferred.

When, in the polymer having a structure in which at least one carbonyl group is bonded to an aromatic group and a structure represented by Formula (A), the partial structure having a charge transport ability is a triarylamine structure, the weight ratio (mass ratio) of the structure in which at least one carbonyl group is bonded to the aromatic group with respect to the triarylamine structure is preferably 0.2 or more and 4 or less, and more preferably 0.4 or more and 2 or less.

In a polymer having the first structure represented by Formula (1) and the second structure represented by Formula (4), when the weight ratio of the structure represented by Formula (1) to the structure represented by Formula (4) is defined as [1]/[4], [1]/[4] is generally 0.2 or more, and preferably 0.4 or more, and is generally 4 or less, and preferably 2 or less.

The compound having a structure represented by Formula (1') can be synthesized by an esterification or carbonated reaction of the corresponding acid chloride and alcohol. Alternatively, the compound can also be synthesized by a dehydration esterification reaction of the corresponding carboxylic acid and alcohol under acidic conditions. From the viewpoint of the electrical characteristics, the compound is preferably produced by an esterification reaction of an acid chloride and an alcohol.

From the viewpoint of adjusting the mechanical strength of the outermost layer, the polymer having the first structure in which at least one carbonyl group is bonded to an aromatic group and the second structure represented by Formula (A), or the polymer having a structure represented by Formula (1) may further have another partial structure. The raw material of such a polymer is not particularly limited, and for example, is preferably obtained by polymerizing the compound having a structure represented by Formula (1') and the compound having a chain polymerizable functional group.

Examples of the chain polymerizable functional group of the compound having a chain polymerizable functional group include an acryloyl group, a methacryloyl group, a vinyl group, and an epoxy group. The compound having a chain polymerizable functional group is not particularly limited as long as it is a known material, and is preferably a monomer, an oligomer, or a polymer having an acryloyl group or a methacryloyl group from the viewpoint of curability.

Examples of a preferred compound having a chain polymerizable functional group are exemplified below.

Examples thereof include trimethylolpropane triacrylate (TMPTA), trimethylolpropane trimethacrylate, HPA-modified trimethylolpropane triacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate, glycerol triacrylate, ECH-modified glycerol triacrylate, EO-modified glycerol triacrylate, PO-modified glycerol triacrylate, tris(acryloxyethyl) isocyanurate, caprolactone-modified tris(acryloxyethyl) isocyanurate, EO-modified tris (acryloxyethyl) isocyanurate, PO-modified tris (acryloxyethyl) isocyanurate, dipentaerythritol hexaacrylate, caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate, pentaerythritol ethoxytetraacrylate, EO-modified phosphate triacrylate, 2,2,5,5,-tetrahydroxymethylcyclopentanone tetraacrylate, 2-hydroxy-3-acryloyloxypropyl methacrylate, polyethylene glycol diacrylate, polypropylene glycol diacrylate, polytetramethylene glycol diacrylate, EO-modified bisphenol A diacrylate, PO-modified bisphenol A diacrylate, 9,9-bis[4-(2-acryloyloxyethoxy)phenyl] fluorene, tricyclodecanedimethanol diacrylate, decanediol diacrylate, hexanediol diacrylate, ethylene glycol dimethacrylate, polyethylene glycol dimethacrylate, EO-modified bisphenol A dimethacrylate, PO-modified bisphenol A dimethacrylate, tricyclodecanedimethanol dimethacrylate, decanediol dimethacrylate, hexanediol dimethacrylate, or the like. Here, EO means ethylene oxide and PO means propylene oxide.

As the oligomer or polymer having an acryloyl group or a methacryloyl group, known urethane acrylates, ester acrylates, acrylic acrylates, epoxy acrylates and the like can be used.

Examples of the urethane acrylate include "EBECRYL (registered trademark) 8301", "EBECRYL 1290", "EBECRYL 1830", and "KRM 8200" (all manufactured by DAICEL-ALLNEX LTD.), "UV1700B", "UV7640B", "UV7605B", "UV6300B", and "UV7550B" (all manufactured by Mitsubishi Chemical Corporation), or the like.

Examples of the ester acrylate include "M-7100", "M-7300K", "M-8030", "M-8060", "M-8100", "M-8530", "M-8560", and "M-9050" (all manufactured by TOAGOSEI CO., LTD.), or the like.

Examples of the acrylic acrylate include "8BR-600", "8BR-930 MB", "8KX-078", "8KX-089", and "8KX-168" (all manufactured by TAISEI FINE CHEMICAL CO., LTD.), or the like.

These may be used alone or in combination of two or more thereof.

At least one outermost layer of the electrophotographic photoreceptor according to the present invention may contain a charge transport substance or metal oxide particles for the purpose of imparting the charge transport ability, in addition to the polymer having the first structure in which at least one carbonyl group is bonded to an aromatic group and the second structure represented by Formula (A), and the polymer having a structure represented by Formula (1). In order to promote the polymerization reaction, a polymerization initiator may be contained. In addition, in order to reduce the frictional resistance or wear of the surface of the electrophotographic photoreceptor, the outermost layer may contain a fluororesin, a silicone resin or the like, and may contain particles formed of these resins or particles of inorganic compounds such as aluminum oxide.

The materials (charge transport substance, metal oxide particles, and polymerization initiator) that may be contained in the outermost layer will be described in detail below. These materials include those used as raw materials for forming the outermost layer.

(Charge Transport Substance)

As the charge transport substance contained in the outermost layer, the same charge transport substance as that used in the photosensitive layer can be used.

The amount of the charge transport substance used in at least one outermost layer of the electrophotographic photoreceptor according to the present invention is not particularly limited, and is preferably 10 parts by mass or more, more preferably 30 parts by mass or more, and particularly preferably 50 parts by mass or more with respect to 100 parts by mass of the binder resin, from the viewpoint of the electrical characteristics. Further, the amount is preferably 300 parts by mass or less, more preferably 200 parts by mass or less, and particularly preferably 150 parts by mass or less, from the viewpoint of maintaining good surface resistance. The charge transport substance referred to here does not include the above "charge transport substance having a chain polymerizable functional group" and metal oxide particles described below.

(Metal Oxide Particles)

The outermost layer may contain metal oxide particles from the viewpoints of imparting the charge transport ability and improving the mechanical strength.

In general, any metal oxide particles usable for an electrophotographic photoreceptor can be used as the metal oxide particles.

Specific examples of the metal oxide particles include particles of a metal oxide containing one metallic element, such as titanium oxide, tin oxide, aluminum oxide, silicon oxide, zirconium oxide, zinc oxide, and iron oxide, and particles of a metal oxide containing a plurality of metallic elements, such as calcium titanate, strontium titanate, and barium titanate. Among them, metal oxide particles whose band gap is 2 eV to 4 eV are preferred.

One kind of these metal oxide particles may be used alone, or two or more kinds of these metal oxide particles may be mixed together and used. Among these metal oxide particles, titanium oxide, tin oxide, aluminum oxide, silicon oxide, and zinc oxide are preferred, and titanium oxide and tin oxide are more preferred. Titanium oxide is particularly preferred.

As the crystal form of the titanium oxide particles, any of rutile, anatase, brookite, and amorphous can be used. In addition, a plurality of crystalline states may be included from these crystalline states which are different from each other.

The surface of the metal oxide particles may be subjected to various surface treatments. A treatment with inorganic substances such as tin oxide, aluminum oxide, antimony oxide, zirconium oxide, and silicon oxide, or organic substances such as stearic acid, a polyol, and an organic silicon compound may be performed. In particular, in the case of using titanium oxide particles, the surface is preferably subjected to a surface treatment with an organic silicon compound.

Examples of the organic silicon compound include: silicone oils such as dimethylpolysiloxane and methylhydrogenpolysiloxane; organosilanes such as methyldimethoxysilane and diphenyldimethoxysilane; silazanes such as hexamethyldisilazane; silane coupling agents such as 3-methacryloyloxypropyltrimethoxysilane, 3-acryloyloxypropyltrimethoxysilane, vinyltrimethoxysilane, γ-mercaptopropyltrimethoxysilane, and γ-aminopropyltriethoxysilane; or the like. In particular, from the viewpoint of improving the mechanical strength of the outermost layer, 3-methacryloyloxypropyltrimethoxysilane, 3-acryloyloxypropyltrimethoxysilane, or vinyltrimethoxysilane, which has a chain polymerizable functional group, is preferred.

The outermost surface of the particles subjected to a surface treatment is treated with such a treating agent. Alternatively, the outermost surface may be treated with a treating agent such as aluminum oxide, silicon oxide, or zirconium oxide before the treatment.

The metal oxide particles to be used are preferably those having an average primary particle diameter of 500 nm or less, more preferably 100 nm or less, and still more preferably 50 nm or less, and more preferably those having an average primary particle diameter of 1 nm or more, still more preferably 5 nm or more. The average primary particle diameter can be obtained according to an arithmetic mean value of diameters of particles which are observed directly by a transmission electron microscope (hereinafter, referred to as TEM).

Examples of specific trade names of the titanium oxide particles among the metal oxide particles according to the present invention include: ultrafine particle titanium oxide without a surface treatment "TTO-55 (N)" and "TTO-51 (N)", ultrafine particle titanium oxide coated with $Al_2O_3$ "TTO-55 (A)" and "TTO-55 (B)", ultrafine particle titanium oxide subjected to a surface treatment with stearic acid "TTO-55 (C)", ultrafine particle titanium oxide subjected to a surface treatment with $Al_2O_3$ and organosiloxane "TTO-55 (S)", high purity titanium oxide "C-EL", titanium oxide prepared by a sulfuric acid method "R-550", "R-580", "R-630", "R-670", "R-680", "R-780", "A-100", "A-220", and "W-10", titanium oxide prepared by a chlorine method "CR-50", "CR-58", "CR-60", "CR-60-2", and "CR-67", and conductive titanium oxide "ET-300W" (all manufactured by Ishihara Sangyo Kaisha, Ltd.); titanium oxide such as "R-60", "A-110" and "A-150", "SR-1", "R-GL", "R-5N", "R-5N-2", "R-52N", "RK-1", and "A-SP" which are coated with $Al_2O_3$, "R-GX" and "R-7E" which are coated with $SiO_2$ and $Al_2O_3$, "R-650" coated with ZnO, $SiO_2$ and $Al_2O_3$, and "R-61N" coated with $ZrO_2$ and $Al_2O_3$ (all manufactured by Sakai Chemical Industry Co., Ltd.); "TR-700" subjected to a surface treatment with $SiO_2$ and AhCh. "TR-840" and "TA-500" subjected to a surface treatment with ZnO, $SiO_2$, and $Al_2O_3$, titanium oxide without a surface treatment such as "TA-100", "TA-200" and "TA-300", and "TA-400" subjected to a surface treatment with $Al_2O_3$ (all manufactured by Fuji Titanium Industry Co., Ltd.); "MT-150W" and "MT-500B" without a surface treatment, "MT-100SA" and "MT-500SA" subjected to a surface treatment with $SiO_2$ and $Al_2O_3$, and "MT-100SAS" and "MT-500SAS" subjected to a surface treatment with $SiO_2$, $Al_2O_3$, and organosiloxane (manufactured by Tayca Co., Ltd.); or the like.

Specific examples of the trade name of the aluminum oxide particles include "Aluminium Oxide C" (manufactured by Nippon Aerosil Co., Ltd.) or the like.

Specific examples of the trade name of silicon oxide particles include "200CF" and "R972" (manufactured by Nippon Aerosil Co., Ltd.), "KEP-30" (manufactured by Nippon Shokubai Co., Ltd.), or the like.

Specific examples of the trade name of tin oxide particles include "SN-100P" and "SN-100D" (manufactured by Ishihara Sangyo Kaisha, Ltd.), "SnO2" (manufactured by CIK-Nano Tek Corporation), "S-2000", phosphorus-doped tin oxide "SP-2", antimony-doped tin oxide "T-1", and indium-doped tin oxide "E-ITO" (manufactured by Mitsubishi Materials Corporation), or the like.

Specific examples of the trade name of zinc oxide particles include "MZ-305S" (manufactured by Tayca Corporation). However, the metal oxide particles usable in the present invention are not limited to these.

The content of the metal oxide particles in at least one outermost layer of the electrophotographic photoreceptor according to the present invention is not particularly limited, and from the viewpoint of electrical characteristics, is preferably 10 parts by mass or more, more preferably 20 parts by mass or more, and particularly preferably 30 parts by mass or more with respect to 100 parts by mass of the binder resin. Further, the content is preferably 300 parts by mass or less, more preferably 200 parts by mass or less, and particularly preferably 100 parts by mass or less, from the viewpoint of maintaining good surface resistance.

(Polymerization Initiator)

The polymerization initiator includes a thermal polymerization initiator, a photopolymerization initiator or the like.

Examples of the thermal polymerization initiator include: peroxide compounds such as 2,5-dimethylhexane-2,5-dihydroperoxide, dicumyl peroxide, benzoyl peroxide, t-butyl peroxide, t-butyl cumyl peroxide, t-butyl hydroperoxide, cumene hydroperoxide, and lauroyl peroxide; and azo compounds such as 2,2'-azobis(isobutyronitrile), 2,2'-azobis(2-methylbutyronitrile), 2,2'-azobis(2,4-dimethylvaleronitrile), 2,2'-azobis(cyclohexanecarbonitrile), 2,2'-azobis(methyl isobutyrate), 2,2'-azobis(isobutylamidine hydrochloride), and 4,4'-azobis-4-cyanovaleric acid.

The photopolymerization initiator can be classified into direct cleavage type and hydrogen abstraction type according to the difference in radical generation mechanism. When the direct cleavage type photopolymerization initiator absorbs light energy, a part of the covalent bond in the molecule is cleaved to generate a radical. On the other hand, in the hydrogen abstraction type photopolymerization initiator, a molecule excited by absorbing light energy generates radicals by abstracting hydrogen from a hydrogen donor.

Examples of the direct cleavage type photopolymerization initiator include: acetophenone-based or ketal-based compounds such as acetophenone, 2-benzoyl-2-propanol, 1-benzoylcyclohexanol, 2,2-diethoxyacetophenone, benzyl dimethyl ketal, and 2-methyl-4'-(methylthio)-2-morpholinopropiophenone; benzoin ether compounds such as benzoin, benzoin methyl ether, benzoin ethyl ether, benzoin isobutyl ether, benzoin isopropyl ether, and O-tosyl benzoin; and acylphosphine oxide-based compounds such as diphenyl (2,4,6-trimethylbenzoyl) phosphine oxide, phenyl bis(2,4,6-trimethylbenzoyl) phosphine oxide, and lithium phenyl (2,4,6-trimethylbenzoyl) phosphonate.

Examples of the hydrogen abstraction type photopolymerization initiator include: benzophenone-based compounds such as benzophenone, 4-benzoylbenzoic acid, 2-benzoylbenzoic acid, methyl 2-benzoylbenzoate, methyl benzoylformate, benzyl, p-anisil, 2-benzoylnaphthalene, 4,4'-bis(dimethylamino) benzophenone, 4,4'-dichlorobenzophenone, and 1,4-dibenzoylbenzene; and anthraquinone-based or thioxanthone-based compounds such as 2-ethyl anthraquinone, 2-isopropylthioxanthone, 2-chlorothioxanthone, 2,4-dimethylthioxanthone, 2,4-diethylthioxanthone, and 2,4-dichlorothioxanthone. Examples of other photopolymerization initiators include camphorquinone, 1-phenyl-1,2-propanedione-2-(o-ethoxycarbonyl)oxime, acridine-based compounds, triazine-based compounds, imidazole-based compounds, or the like.

The photopolymerization initiator preferably has an absorption wavelength in the wavelength region of the light source used for light irradiation in order to efficiently absorb light energy and generate radicals. On the other hand, when among the compounds contained in the outermost layer, components other than the photopolymerization initiator may have absorption in this wavelength region, the photopolymerization initiator may not be able to absorb sufficient light energy, and the radical generation efficiency may decrease. Since general binder resins, general charge transport substances, and general metal oxide particles have an absorption wavelength in the ultraviolet region (UV), this effect is particularly remarkable when the light source used for light irradiation is ultraviolet light (UV). From the viewpoint of preventing such a defect, it is preferable to contain an acylphosphine oxide-based compound having an absorption wavelength on a relatively long wavelength side among the photopolymerization initiators. In addition, also from the viewpoints that light can be transmitted to the inside of the outermost layer and the internal curability is good, the acylphosphine oxide-based compounds is preferred because of having a photobleaching effect in which the absorption wavelength region changes to the lower wavelength side due to self-cleavage. In this case, it is more preferable to use a hydrogen abstraction type initiator in combination from the viewpoint of supplementing the curability of the surface of the outermost layer. The content ratio of the hydrogen abstraction type initiator to the acylphosphine oxide-based compound is not particularly limited. With respect to 1 part by mass of the acylphosphine oxide-based compound, the hydrogen abstraction type initiator is preferably 0.1 part by mass or more from the viewpoint of supplementing the curability of the surface, and is preferably 5 parts by mass or less from the viewpoint of maintaining the internal curability.

Further, those having a photopolymerization promoting effect can be used alone or in combination with the above photopolymerization initiator. Examples thereof include triethanolamine, methyldiethanolamine, ethyl 4-(dimethylamino)benzoate, isoamyl 4-(dimethylamino)benzoate, 2-dimethylaminoethyl benzoate, and 4,4'-dimethylaminobenzophenone.

These polymerization initiators may be used alone or in admixture of two or more thereof. The content of the polymerization initiator is 0.5 to 40 parts by mass, and preferably 1 to 20 parts by mass, with respect to 100 parts by mass of the total content having radical polymerizable property, as the composition of the raw material forming the outermost layer. The polymerization initiator is consumed in the process of forming the outermost layer.

(Method of Forming Outermost Layer)

Next, a method of forming the outermost layer will be described. The method of forming the outermost layer is not particularly limited. For example, the outermost layer can be formed by coating a coating liquid in which a binder resin, a charge transport substance, metal oxide particles, and other substances are dissolved in a solvent or a coating liquid in which the above substances are dispersed in a dispersion medium.

When the outermost layer containing the polymer having the first structure in which at least one carbonyl group is bonded to an aromatic group and the second structure represented by Formula (A) is formed, the outermost layer is formed by polymerizing a compound having a structure in which at least one carbonyl group is bonded to an aromatic group and a structure represented by the above Formula (A').

Hereinafter, the solvent or dispersion medium used for forming the outermost layer, and the coating method will be described.

[Solvent Used for Coating Liquid for Forming Outermost Layer]

As the organic solvent used for the coating liquid for forming the outermost layer, any organic solvent which can dissolve the substance according to the present invention can be used.

Specific examples thereof include: alcohols such as methanol, ethanol, propanol and 2-methoxyethanol; ethers such as tetrahydrofuran, 1,4-dioxane, and dimethoxyethane; esters such as methyl formate and ethyl acetate; ketones such as acetone, methyl ethyl ketone, and cyclohexanone; aromatic hydrocarbons such as benzene, toluene, xylene and anisole; chlorinated hydrocarbons such as dichloromethane, chloroform, 1,2-dichloroethane, 1,1,2-trichloroethane, 1,1,1-trichloroethane, tetrachloroethane, 1,2-dichloropropane, and trichlorethylene; nitrogen-containing compounds such as n-butylamine, isopropanolamine, diethylamine, triethanolamine, ethylenediamine, and triethylenediamine; and aprotic polar solvents such as acetonitrile, N-methylpyrrolidone, N,N-dimethylformamide, and dimethyl sulfoxide. A mixed solvent, which is selected from these in any desired combination and any desired ratio, can also be used.

In addition, even if an organic solvent is a solvent which does not dissolve the substance for the outermost layer according to the present invention singly, the solvent can be used as long as it can dissolve the substance by, for example, being a mixed solvent with the above organic solvent.

In general, coating unevenness can be reduced by using a mixed solvent. When a dip coating method is used in the coating method described below, it is preferable to select a solvent that does not dissolve the lower layer. From this viewpoint, it is preferable to contain alcohols, which have low solubility in polycarbonate and polyarylate, which are preferably used for the photosensitive layer.

The ratio of the amount of the organic solvent used in the coating liquid for forming the outermost layer to the solid content differs depending on the coating method of the coating liquid for forming the outermost layer, and may be appropriately changed such that a uniform coating film is formed in the coating method to be applied.

[Coating Method]

A coating method of the coating liquid for forming the outermost layer is not particularly limited, and examples thereof include a spray coating method, a spiral coating method, a ring coating method, a dip coating method, or the like.

The coating film is formed by the above coating method, and then the coating film is dried. There is no limitation on temperature and time as long as necessary and sufficient drying can be obtained. However, when the outermost layer is coated only by air drying after coating of the photosensitive layer, sufficient drying is preferably performed similar to that described in [Coating Method] of the photosensitive layer described above.

The thickness of the outermost layer is appropriately selected depending on the material to be used, and is preferably 0.1 μm or more, more preferably 0.2 μm or more, and particularly preferably 0.5 μm or more, from the viewpoint of the lifespan. In addition, the thickness is preferably 10 μm or less, more preferably 5 μm or less, and particularly preferably 3 μm or less, from the viewpoint of the electrical characteristics.

[Method of Curing Outermost Layer]

The outermost layer is formed by coating such a coating liquid and then applying energy from the outside for curing. The external energy used at this time includes heat, light, and radiation. The method of applying heat energy is performed by heating from the coated surface side or the support side using air, a gas such as nitrogen, steam, various heat media, infrared rays, or electromagnetic waves.

The heating temperature is preferably 100° C. or higher and 170° C. or lower. Being higher than or equal to the lower limit temperature, the reaction rate is sufficient and the reaction proceeds completely. Being lower than or equal to the upper limit temperature, the reaction proceeds uniformly and it is possible to prevent the occurrence of large strain in the outermost layer. In order to allow the curing reaction to proceed uniformly, it is also effective to heat at a relatively low temperature of lower than 100° C. and then further heat to 100° C. or higher to complete the reaction.

As light energy, UV irradiation light sources such as a high pressure mercury lamp, a metal halide lamp, an electrodeless lamp bulb, and a light emitting diode, which have an emission wavelength mainly of ultraviolet light (UV), can be used. It is also possible to select a visible light source according to the absorption wavelength of the chain polymerizable compound or the photopolymerization initiator The light irradiation amount is preferably 100 $mJ/cm^2$ or more, more preferably 500 $mJ/cm^2$ or more, and particularly preferably 1000 $mJ/cm^2$ or more from the viewpoint of the curability. In addition, the light irradiation amount is preferably 20000 $mJ/cm^2$ or less, more preferably 10000 $mJ/cm^2$ or less, and particularly preferably 5000 $mJ/cm^2$ or less, from the viewpoint of the electrical characteristics.

Examples of radiation energy include those using an electron beam (EB).

Among the above energy, those using light energy are preferred from the viewpoints of ease of the reaction rate control, simplicity of the apparatus, and the length of the pot life.

After curing the outermost layer, a heating step may be added from the viewpoints of relaxation of residual stress, relaxation of residual radicals, and improvement of electrical characteristics. The heating temperature is preferably 60° C. or higher, and more preferably 100° C. or higher, and is preferably 200° C. or lower, and more preferably 150° C. or lower.

<Undercoat Layer>

The electrophotographic photoreceptor of the present invention may include an undercoat layer between the photosensitive layer and the conductive support.

As the undercoat layer, a resin or a resin in which an organic pigment, metal oxide particles or the like is dispersed is used.

Examples of the organic pigment used for the undercoat layer include a phthalocyanine pigment, an azo pigment, a quinacridone pigment, an indigo pigment, a perylene pigment, a polycyclic quinone pigment, an anthanthrone pigment, a benzimidazole pigment, or the like. Among them, a phthalocyanine pigment and an azo pigment, specifically, a phthalocyanine pigment and an azo pigment in case of use as the charge generation substance described above can be mentioned.

Examples of the metal oxide particles used for the undercoat layer include particles of a metal oxide containing one metallic element, such as titanium oxide, aluminum oxide, silicon oxide, zirconium oxide, zinc oxide, and iron oxide, and particles of a metal oxide containing a plurality of metallic elements, such as calcium titanate, strontium titanate, and barium titanate. In the undercoat layer, only one kind of the above particles may be used, or a plurality of kinds of the above particles may be mixed and used in any desired ratio and in any desired combination.

Among the above metal oxide particles, titanium oxide and aluminum oxide are preferred, and titanium oxide is particularly preferred. The surface of the titanium oxide particles may be treated with an inorganic substance such as tin oxide, aluminum oxide, antimony oxide, zirconium oxide, and silicon oxide, or an organic substance such as stearic acid, a polyol, and silicon. As the crystal form of the titanium oxide particles, any of rutile, anatase, brookite, and amorphous can be used. In addition, a plurality of crystalline states may be contained.

The particle diameter of the metal oxide particles used for the undercoat layer is not particularly limited. The average primary particle diameter thereof is preferably 10 nm or more, and is preferably 100 nm or less, and more preferably 50 nm or less, from the viewpoints of the characteristics of the undercoat layer and the stability of the solution for forming the undercoat layer.

Here, it is desirable that the undercoat layer is formed in a form in which particles are dispersed in a binder resin. Examples of the binder resin to be used in the undercoat layer include those selected from: polyvinyl acetal-based resins such as a polyvinyl butyral resin, a polyvinyl formal resin, and a partially acetalized polyvinyl butyral resin in which the butyral moieties have been partially modified with formal, acetal, or the like; polyarylate resins; polycarbonate resins; polyester resins; modified ether-based polyester resins; phenoxy resins; polyvinyl chloride resins; polyvinylidene chloride resins; polyvinyl acetate resins; polystyrene resins; acrylic resins; methacrylic resins; polyacrylamide resins; polyamide resins; polyvinylpyridine resins; cellulosic resins; polyurethane resins; epoxy resins; silicon resins; polyvinyl alcohol resins; polyvinylpyrrolidone resins; caseins; copolymers based on vinyl chloride and vinyl acetate, such as a vinyl chloride-vinyl acetate copolymer, a hydroxy-modified vinyl chloride-vinyl acetate copolymer, a carboxyl-modified vinyl chloride-vinyl acetate copolymer, and a vinyl chloride-vinyl acetate-maleic anhydride copolymer; insulating resins such as a styrene-butadiene copolymer, a vinylidene chloride-acrylonitrile copolymer, a styrene-alkyd resin, a silicon-alkyd resin, and a phenol-formaldehyde resin; and organic photoconductive polymers such as a poly-N-vinylcarbazole, a polyvinylanthracene, and a polyvinylperylene, and can be used. However, the binder resin is not limited to these polymers. In addition, any one of these binder resins may be used alone, or two or more thereof may be mixed and used, or may be used in a cured form with a curing agent. Among them, preferred are the polyvinyl acetal-based resins such as a polyvinyl butyral resin, a polyvinyl formal resin, and a partially acetalized polyvinyl butyral resin in which the butyral moieties have been partially modified with formal, acetal, or the like, alcohol soluble copolymerized polyamides, modified polyamides, and the like, because of exhibiting good dispersibility and coatability.

The mixing ratio of the particles to the binder resin can be optionally selected, and is preferably in a range of 10% by mass to 500% by mass, from the viewpoints of the stability and the coatability of the dispersion liquid.

The film thickness of the undercoat layer can be optionally selected, and is preferably 0.1 μm or more and 20 μm or less, in terms of the properties of the electrophotographic photoreceptor and the coatability of the dispersion liquid. In addition, the undercoat layer may contain known antioxidants or the like.

<Other Layers>

The electrophotographic photoreceptor of the present invention may appropriately include other layers as necessary in addition to the conductive support, the photosensitive layer, the outermost layer, and the undercoat layer.

Electrophotographic Photoreceptor Cartridge>

The electrophotographic photoreceptor cartridge according to the present invention includes the above electrophotographic photoreceptor. As for other configurations of the electrophotographic photoreceptor cartridge, known ones can be used by a known method. For example, the electrophotographic photoreceptor cartridge includes an electrophotographic photoreceptor and at least one apparatus selected from the group consisting of a charging apparatus configured to charge the electrophotographic photoreceptor, an exposure apparatus configured to expose the charged electrophotographic photoreceptor to form an electrostatic latent image, and a development apparatus configured to develop the electrostatic latent image formed on the electrophotographic photoreceptor.

<Image Forming Apparatus>

The image forming apparatus according to the present invention includes the above electrophotographic photoreceptor. As for other configurations of the image forming apparatus, known ones can be used by a known method. For example, the image forming apparatus includes an electrophotographic photoreceptor, a charging apparatus configured to charge the electrophotographic photoreceptor, an exposure apparatus configured to expose the charged electrophotographic photoreceptor to form an electrostatic latent image, and a developing apparatus configured to develop the electrostatic latent image formed on the electrophotographic photoreceptor.

EXAMPLES

Hereinafter, examples are shown to describe embodiments according to the present invention more specifically. However, the following Examples are given to describe the invention in detail, and the present invention is not limited to the examples described below and can be optionally modified and implemented without departing from the scope of the present invention. In addition, the description of "part" in the following Examples and Comparative Examples indicates "parts by mass" unless otherwise specified.

Production Example 1: Production of Compound (1-1)

Into a 200 mL 4-port reaction vessel, isophthalic acid chloride (manufactured by Tokyo Chemical Industry Co., Ltd., 5.00 g) and pentaerythritol triacrylate (triester 57%) ("NK ester A-TMM-3LM-N" manufactured by SHIN-NAKAMURA CHEMICAL CO, LTD., 22.04 g) were weighed, and dissolved in toluene (90 mL). Subsequently, a mixed solution of triethylamine (7.48 g) and toluene (10 mL) was added dropwise to the reaction vessel cooled to 0° C. to 5° C. over 20 minutes. After setting the reaction temperature to room temperature and continuing stirring for 5 hours, 0.1N hydrochloric acid (80 mL) was added and acid washing was performed. The organic layer was separated, and the organic layer was washed twice with 0.1N hydrochloric acid (80 mL) and further washed twice with demineralized water (80 mL). Thereafter, 1 mg of 4-methoxyphenol was added to the separated organic layer and concentrated to obtain a reaction product mainly composed of a compound (1-1).

<Preparation of Lamination Type Photoreceptor>

The lamination type photoreceptor was produced by the following procedure.

(Formation of Undercoat Layer)

Rutile-type titanium oxide having an average primary particle diameter of 40 nm ("TTO55N" manufactured by Ishihara Sangyo Kaisha, Ltd.), 3% by mass of methyl dimethoxysilane ("TSL 8117" manufactured by Toshiba Silicone Co., Ltd.) with respect to titanium oxide, and surface-treated titanium oxide obtained by mixing using a Henschel mixer were dispersed by a ball mill in a mixed solvent with a weight ratio of methanol/1-propanol of 7/3 to obtain a surface-treated titanium oxide dispersion slurry. The dispersion slurry, a mixed solvent containing methanol/l-propanol/toluene, and pellets of copolymerized polyamide made of ε-caprolactam/bis(4-amino-3-methylcyclohexyl) methane/hexamethylenediamine/decamethylenedicarboxylic acid/octadecamethylenedicarboxylic acid in a composition molar ratio of 60%/15%/5%/15%/5% were heated, stirred, and mixed, so as to dissolve the pellets of polyamide. Thereafter, an ultrasonic dispersion treatment was performed to prepare a coating liquid for forming the undercoat layer having a solid content concentration of 18.0% and containing methanol/l-propanol/toluene in a weight ratio of 7/1/2 and surface-treated titanium oxide/copolymerized polyamide in a weight ratio of 3/1. The coating liquid was coated onto an aluminum plate having a thickness of 0.3 mm with a wire bar and air-dried to provide an undercoat layer such that the film thickness after drying was 1.5 μm.

(Formation of Charge Generation Layer)

As a charge generation substance, 20 parts of D-form titanyl phthalocyanine, showing a clear peak of a diffraction angle 2θ±0.2° at 27.3° in powder X-ray diffraction using CuKα rays, was mixed with 280 parts of 1,2-dimethoxyethane, and the mixture was ground by a sand grind mill for 2 hours, so as to perform a pulverized dispersion treatment. Subsequently, 400 parts of a 2.5% 1,2-dimethoxy ethane solution of polyvinyl butyral (trade name "Denka butyral" #6000C, manufactured by Denki Kagaku Kogyo Kabushiki Kaisha) and 170 parts of 1,2-dimethoxyethane were mixed to prepare a coating liquid for the charge generation layer. The coating liquid was coated onto the undercoat layer with a wire bar and air-dried to form a charge generation layer such that the film thickness after drying was 0.4 μm.

(Formation of Charge Transport Layer)

With 389 parts of a mixed solvent of tetrahydrofuran (hereinafter abbreviated as THF as appropriate) and toluene (hereinafter abbreviated as TL as appropriate) (THF: 80% by mass, and TL: 20% by mass), 43 parts of a charge transport substance represented by the above HTM39, 100 parts of a binder resin 1 of the following structure, 8 parts of an antioxidant 1 of the following structure, 0.07 parts of an electron withdrawing compound 1 of the following structure, and 0.06 parts of silicone oil ("KF-96" manufactured by Shin-Etsu Chemical Co., Ltd.) as a leveling agent were mixed, to prepare a coating liquid for a charge transport layer. The coating liquid was coated onto the charge generation layer with a bar coater and dried at 125° C. for 20 minutes to form a charge transport layer such that the film thickness after drying was about 20 μm.

BINDER RESIN 1

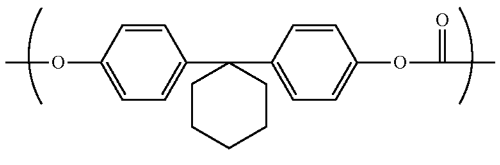

ANTIOXIDANT 1

VISCOSITY AVERAGE MOLECULOR WEIGHT: 40000

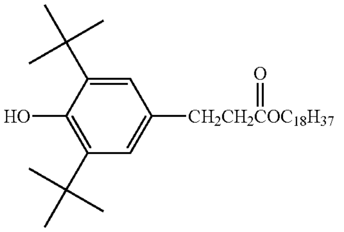

ELECTRON WITHDRAWING COMPOUND 1

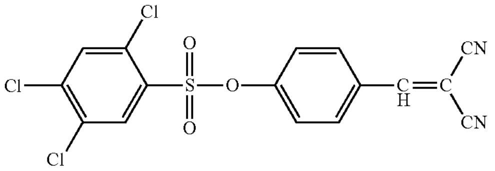

Example 1

<Formation of Outermost Layer>

To prepare a coating liquid for the outermost layer, 100 parts of the reaction product obtained in Production Example 1, 100 parts of a compound represented by Formula (4-3) (hereinafter referred to as a compound (4-3)), 1 part of benzophenone, 1 part of methyl benzoylformate and 1 part of diphenyl(2,4,6-trimethylbenzoyl)phosphine oxide as photopolymerization initiators, and 0.1 parts of a leveling agent ("MEGAFACE F-563" manufactured by DIC Corporation) were mixed with 1800 parts of a mixed solvent of isopropanol (hereinafter abbreviated as IPA as appropriate) and THF (IPA: 80% by mass, and THF: 20% by mass). The coating liquid was coated onto the lamination type photoreceptor with a wire bar and dried at 90° C. for 10 minutes such that the film thickness after curing was about 3 μm. From the surface side of the coating film, UV light was irradiated so as to have a light amount of 8000 $mJ/cm^2$ using a UV light irradiation device (manufactured by Heraeus Holding) equipped with an electrodeless lamp bulb (D bulb). Further, after heating at 125° C. for 30 minutes, the coating film was allowed to be cool to 25° C. to form the outermost layer, and an electrophotographic photoreceptor was obtained.

Example 2

An outermost layer was formed and an electrophotographic photoreceptor was obtained in the same manner as in Example 1, except that the light amount of the UV light was set to 4000 mJ/$cm^2$.

Example 3

An outermost layer was formed and an electrophotographic photoreceptor was obtained in the same manner as in Example 1, except that the film thickness of the outermost layer was set to 6 μm.

Example 4

An outermost layer was formed and an electrophotographic photoreceptor was obtained in the same manner as in Example 1, except that a compound represented by Formula (4-2) (hereinafter referred to as a compound (4-2)) was used instead of the compound (4-3), and the film thickness of the outermost layer was set to 6 μm.

Example 5

100 parts of the reaction product obtained in Production Example 1, 74 parts of titanium oxide particles ("TTO55N" manufactured by Ishihara Sangyo Kaisha, Ltd.) which were surface-treated with 7% by mass of 3-methacryloyloxypropyltrimethoxysilane per the titanium oxide particles, and 1 part of benzophenone and 2 parts of diphenyl(2,4,6-trimethylbenzoyl)phosphine oxide as photopolymerization initiators were mixed with 880 parts of a mixed solvent of methanol, 1-propanol and toluene (methanol: 70% by mass, 1-propanol: 10% by mass, and toluene: 20% by mass), to prepare a coating liquid for the outermost layer. The coating liquid was coated onto the lamination type photoreceptor with a wire bar such that the film thickness after curing was about 3 μm. From the surface side of the coating film, UV light was irradiated so as to have a light amount of 4000 mJ/$cm^2$ using a UV light irradiation device equipped with a metal halide lamp. Further, after heating at 125° C. for 30 minutes, the coating film was allowed to be cool to 25° C. to form the outermost layer, and an electrophotographic photoreceptor was obtained.

Comparative Example 1

An outermost layer was formed and an electrophotographic photoreceptor was obtained in the same manner as in Example 1, except that EBECRYL 1290 (DAICEL-ALLNEX LTD) having a structure corresponding to EBECRYL (registered trademark) 8301 described in Examples 2 to 4 of Patent Literature 1 (US-A-2015-099225) was used instead of the reaction product obtained in Production Example 1, and the film thickness of the outermost layer was set to 6 μm.

Comparative Example 2

An outermost layer was formed and an electrophotographic photoreceptor was obtained in the same manner as in Comparative Example 1, except that the light amount of the UV light was set to 4000 mJ/$cm^2$.

Comparative Example 3

An outermost layer was formed and an electrophotographic photoreceptor was obtained in the same manner as in Comparative Example 1, except that urethane acrylate UV6300B (Mitsubishi Chemical Corporation) was used instead of EBECRYL 1290 (DAICEL-ALLNEX LTD).

Comparative Example 4

An outermost layer was formed and an electrophotographic photoreceptor was obtained in the same manner as in Comparative Example 1, except that ester acrylate M-9050 (TOAGOSEI CO., LTD.) was used instead of EBECRYL 1290 (DAICEL-ALLNEX LTD) and the film thickness of the outermost layer was set to 3 μm.

Comparative Example 5

An outermost layer was formed and an electrophotographic photoreceptor was obtained in the same manner as in Comparative Example 1, except that a compound (4-2) was used instead of the compound (4-3).

Comparative Example 6

An outermost layer was formed and an electrophotographic photoreceptor was obtained in the same manner as in Comparative Example 3, except that a compound (4-2) was used instead of the compound (4-3).

Comparative Example 7

An outermost layer was formed and an electrophotographic photoreceptor was obtained in the same manner as in Example 5, except that urethane acrylate UV6300B (Mitsubishi Chemical Corporation) was used instead of the reaction product obtained in Production Example 1.

<Preparation of Single-Layer Type Photoreceptor>

The single-layer type photoreceptor was produced by the following procedure.

(Formation of Adhesive Layer)

With 280 parts of 1,2-dimethoxyethane, 20 parts of D-form titanyl phthalocyanine, showing a clear peak of a diffraction angle 2θ±0.2° at 27.3° in powder X-ray diffraction using CuKα rays was mixed, and the mixture was ground by a sand grind mill for 2 hours, so as to perform a pulverized dispersion treatment. Subsequently, 400 parts of a 2.5% 1,2-dimethoxyethane solution of polyvinyl butyral (trade name "Denka butyral" #6000C, manufactured by Denki Kagaku Kogyo Kabushiki Kaisha) and 170 parts of 1,2-dimethoxyethane were mixed to prepare a coating liquid for an adhesive layer The coating liquid was coated onto an aluminum plate having a thickness of 0.3 mm with a wire bar and air-dried to form an adhesive layer such that the film thickness after drying was 0.4 μm.

(Formation of Single-Layer Type Photosensitive Layer)

To prepare a coating liquid for a single-layer type photosensitive layer, 4.5 parts of the D-form titanyl phthalocyanine, showing a clear peak of a diffraction angle 2θ±0.2° at 27.3° in powder X-ray diffraction using CuKα rays, 4.5 parts of a perylene pigment 1 of the following structure, 70 parts of a hole transport substance represented by the above HTM48, 50 parts of an electron transport substance represented by the ET-2, 100 parts of the above binder resin 1, 4.5 parts of a butyral resin, 10 parts of a low molecular weight compound 1 of the following structure, and 0.05 parts of silicone oil ("KF-96" manufactured by Shinetsu Chemical Co., Ltd.) as a leveling agent were mixed with 974 parts of a mixed solvent of tetrahydrofuran (hereinafter abbreviated as THF as appropriate) and toluene (hereinafter abbreviated as TL as appropriate) (THF: 60% by mass, and TL: 40% by mass). The coating liquid was coated onto the adhesive layer with a bar coater and dried at 125° C. for 20 minutes to form a single-layer type photosensitive layer such that the film thickness after drying was about 20 μm.

PERYLENE PIGMENT 1

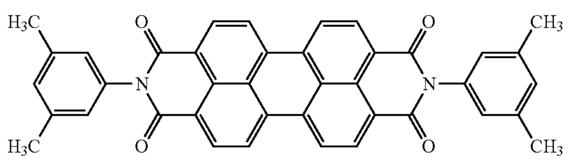

LOW MOLECULAR WEIGHT COMPOUND 1

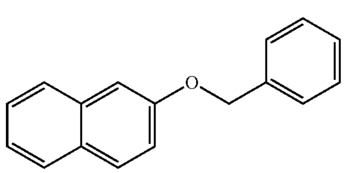

Example 6

To prepare a coating liquid for the outermost layer, 100 parts of the reaction product obtained in Production Example 1, 74 parts of titanium oxide particles ("TTO55N" manufactured by Ishihara Sangyo Kaisha, Ltd.) which were surface-treated with 7% by mass of 3-methacryloyloxypropyltrimethoxysilane per the titanium oxide particles, and 1 part of benzophenone and 2 parts of diphenyl(2,4,6-trimethylbenzoyl)phosphine oxide as photopolymerization initiators were mixed with 880 parts of a mixed solvent of methanol, 1-propanol and toluene (methanol: 70% by mass, 1-propanol: 10% by mass, and toluene: 20% by mass). The coating liquid was coated onto the single-layer type photoreceptor with a wire bar such that the film thickness after curing was about 3 μm. From the surface side of the coating film, UV light was irradiated so as to have a light amount of 4000 mJ/$cm^2$ using a UV light irradiation device equipped with a metal halide lamp. Further, after heating at 125° C. for 30 minutes, the coating film was allowed to be cool to 25° C. to form the outermost layer, and an electrophotographic photoreceptor was obtained.

Comparative Example 8

An outermost layer was formed and an electrophotographic photoreceptor was obtained in the same manner as in Example 6, except that urethane acrylate UV6300B (Mitsubishi Chemical Corporation) was used instead of the reaction product obtained in Production Example 1.

Comparative Example 9

An outermost layer was formed and an electrophotographic photoreceptor was obtained in the same manner as in Comparative Example 6, except that urethane acrylate CN975 (manufactured by Arkema) was used instead of UV6300B (manufactured by Mitsubishi Chemical Corporation).

<Test of Electrical Characteristics>

Using EPA8200 manufactured by Kawaguchi Electric Works Co., Ltd., the electrophotographic photoreceptors obtained in Examples and Comparative Examples were charged by applying a current of 30 μA to a Corotron charger. At this time, Example 6 and Comparative Example 8 were charged with a positive polarity, and the others were charged with a negative polarity. The charged photoreceptor was irradiated for 10 seconds with 55 nw monochromatic light obtained from light of a halogen lamp through a 780 nm monochromatic light filter. The surface potential at this time was defined as a residual potential Vr. Further, the difference between the Vr of the first measurement and the Vr of the sixth measurement was defined as ΔVr. The measurement was performed in an environment in which the temperature was 25° C. and the relative humidity was 50%. One having a smaller absolute value of Vr indicates a good photoreceptor having a smaller residual potential. One having a smaller absolute value of ΔVr indicates a good photoreceptor having a small change in residual potential due to repeated use.

The results are shown in Table (1), Table (2), and Table (3).

<Measurement of Hardness and Elastic Deformation Rate of Surface of Photoreceptor>

The universal hardness and the elastic deformation rate of the surface of the photoreceptor were measured using a micro hardness tester FISCHERSCOPE HM2000 manufactured by Fisher Co., Ltd. in an environment of a temperature of 25° C. and a relative humidity of 50%. A Vickers diamond indenter for quadrangular pyramid with a facing angle of 136° was used for the measurement. The measurement conditions were set as follows, and the load applied to the indenter and the indentation depth under the load were continuously read, and profiles as shown in the FIGURE was obtained by respectively plotting the load and the indentation depth on the Y-axis and the X-axis. By applying a load to the indenter, the profile shifts from A to B in the FIGURE, and by removing the load, the profile shifts from B to C in the FIGURE.

Measurement Conditions

Maximum indentation load: 1 mN

Time required for loading: 10 seconds

Time required for removing load: 10 seconds

The universal hardness is a value defined by the following equation based on the indentation depth at that time.

Universal hardness (N/$mm^2$)=test load (N)/surface area of Vickers indenter under test load ($mm^2$)

The elastic deformation rate is a value defined by the following equation, and is the ratio of the work done by the film based on elasticity during load removal to the total work amount required for indentation.

$$\text{Elastic deformation rate (\%)}=(We/Wt)\times 100$$

In the above equation, "Wt" represents the total work amount (nJ) and indicates the area surrounded by A-B-D-A in the FIGURE. "We" represents the elastic deformation work amount (nJ), and indicates the area surrounded by C-B-D-C in the FIGURE. The larger the elastic deformation rate, the deformation with respect to the load is less likely to remain, and when the elastic deformation rate is 100, it means that no deformation remains.

TABLE 1

| | Vr (V) | ΔVr (V) | Hardness (N/$mm^2$) | Elastic deformation rate (%) |
|---|---|---|---|---|
| Example 1 | −88 | −42 | 319 | 62 |
| Example 2 | −53 | −23 | 278 | 58 |

TABLE 1-continued

| | Vr (V) | ΔVr (V) | Hardness ($N/mm^2$) | Elastic deformation rate (%) |
|---|---|---|---|---|
| Example 3 | −102 | −41 | 291 | 58 |
| Example 4 | −66 | −47 | 307 | 60 |
| Comparative Example 1 | −182 | −90 | 269 | 56 |
| Comparative Example 2 | −148 | −68 | 256 | 53 |
| Comparative Example 3 | −191 | −86 | 226 | 53 |
| Comparative Example 4 | −104 | −55 | 316 | 55 |
| Comparative Example 5 | −78 | −68 | 240 | 55 |
| Comparative Example 6 | −97 | −79 | 207 | 51 |
| Comparative Example 9 | −148 | −71 | 293 | 62 |

TABLE 2

| | Vr (V) | ΔVr (V) | Hardness ($N/mm^2$) | Elastic deformation rate (%) |
|---|---|---|---|---|
| Example 5 | −20 | −1 | 342 | 57 |
| Comparative Example 7 | −29 | −7 | 222 | 41 |

TABLE 3

| | Vr (V) | ΔVr (V) | Hardness ($N/mm^2$) | Elastic deformation rate (%) |
|---|---|---|---|---|
| Example 6 | 20 | 8 | 327 | 55 |
| Comparative Example 8 | 23 | 8 | 220 | 46 |

<Measurement Result>

As seen from the results in Tables (1) to (3), in Examples in which the outermost layer contains a polymer having a first structure in which at least one carbonyl group is bonded to an aromatic group and a second structure represented by Formula (A), or the outermost layer contains a polymer having a structure represented by Formula (1), the residual potentials Vr and ΔVr (difference between Vr at the first measurement and the sixth measurement) are small, and the electrical characteristics are good. In addition, it can be seen that the hardness and elastic deformation rate are high, and the mechanical strength is excellent.

Although the present invention has been described in detail with reference to specific examples, it is obvious to those skilled in the art that various changes and modifications may be made without departing from the spirit and the scope of the present invention. The present application is based on a Japanese Patent Application (Japanese Patent Application No. 2019-081060) filed on Apr. 22, 2019, contents of which are incorporated herein by reference.

The invention claimed is:

1. An electrophotographic photoreceptor comprising a plurality of layers comprising at least one outermost layer including a polymer having a first structure where at least one carbonyl group is bonded to an aromatic group and a second structure of the following Formula (A):

(A)

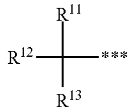

wherein, in Formula (A), $R^{11}$ to $R^{13}$ each independently represent a hydrogen atom, a hydrocarbon group, an alkoxy group, a methylol group, or a group of the following Formula (2), wherein at least two of $R^{11}$ to $R^{13}$ are groups of the following Formula (2), and

*** indicates a bond with an arbitrary atom:

(2)

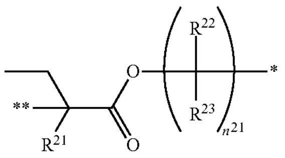

wherein, in Formula (2), $R^{21}$ represents a hydrogen atom or a methyl group, $R^{22}$ and $R^{23}$ each independently represent a hydrogen atom, a hydrocarbon group or an alkoxy group, $n^{21}$ is an integer of 1 or more and 10 or less,

* indicates a bond with a carbon atom to which $R^{11}$ to $R^{13}$ in the above Formula (A) are bonded, and

** indicates a bond with an arbitrary atom.

2. The electrophotographic photoreceptor according to claim 1, wherein the polymer is a cured product obtained by curing a compound having the first structure where at least one carbonyl group is bonded to an aromatic group and a second structure of the following Formula (A'):

(A')

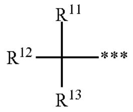

wherein, in Formula (A'), $R^{11}$ to $R^{13}$ each independently represent a hydrogen atom, a hydrocarbon group, an alkoxy group, a methylol group, or a group of the following Formula (2'), wherein at least two of $R^{11}$ to $R^{13}$ are groups of the following Formula (2'), and

*** indicates a bond with an arbitrary atom:

(2')

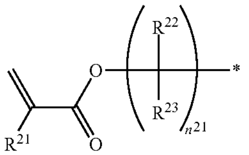

wherein, in Formula (2'), $R^{21}$ represents a hydrogen atom or a methyl group, $R^{22}$ and $R^{23}$ each independently represent a hydrogen atom, a hydrocarbon group or an alkoxy group, $n^{21}$ is an integer of 1 or more and 10 or less, and

* indicates a bond with a carbon atom to which $R^{11}$ to $R^{13}$ in the above Formula (A') are bonded.

3. An electrophotographic photoreceptor, comprising a plurality of layers comprising at least one outermost layer, wherein at least one of the outermost layer comprises a polymer having a structure of the following Formula (1):

(1)

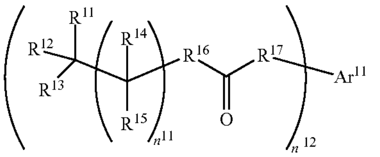

wherein, in Formula (1), $Ar^{11}$ represents an aromatic group, with the proviso that the aromatic group is optionally substituted with at least one selected from the group consisting of an alkyl group, a halogen atom, an alkoxy group, an amino group, an alkyl carbonyl group, an aryl carbonyl group, an alkyl ester group and an aryl ester group, $R^{11}$ to $R^{13}$ each independently represent a hydrogen atom, a hydrocarbon group, an alkoxy group, a methylol group, a group of the following Formula (2) or a group of the following Formula (3), wherein at least two of $R^{11}$ to $R^{13}$ are groups of the following Formula (2) or groups of the following Formula (3), $R^{14}$ and $R^{15}$ each independently represent a hydrogen atom, a hydrocarbon group or an alkoxy group, $R^{16}$ and $R^{17}$ are a single bond or an oxygen atom, and $n^{12}$ represents an integer of 1 or more and 6 or less, and $n^{11}$ represents an integer of 1 or more and 10 or less, (2)

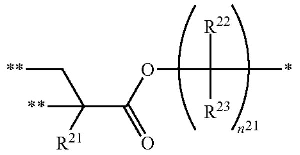

wherein, in Formula (2), $R^{21}$ represents a hydrogen atom or a methyl group, $R^{22}$ and $R^{23}$ each independently represent a hydrogen atom, a hydrocarbon group or an alkoxy group, $n^{21}$ is an integer of 1 or more and 10 or less,

* indicates a bond with a carbon atom to which $R^{11}$ to $R^{13}$ in the above Formula (1) are bonded, and

** indicates a bond with an arbitrary atom, (3)

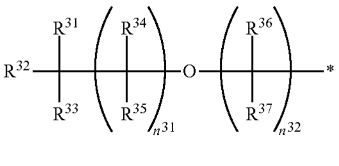

wherein, in Formula (3), $R^{31}$ to $R^{33}$ each independently represent a hydrogen atom, a hydrocarbon group, an alkoxy group, a methylol group, or a group of the above Formula (2), wherein at least two of $R^{31}$ to $R^{33}$ represent groups of the above Formula (2), $R^{34}$ to $R^{37}$ each independently represent a hydrogen atom, a hydrocarbon group or an alkoxy group, and $n^{31}$ and $n^{32}$ are each independently an integer of 1 or more and 10 or less, and

* indicates a bond with a carbon atom to which $R^{11}$ to $R^{13}$ in the above Formula (1) are bonded.

4. The electrophotographic photoreceptor according to claim 3, wherein the structure of Formula (1) is a structure of the following Formula (1-A):

(1-A)

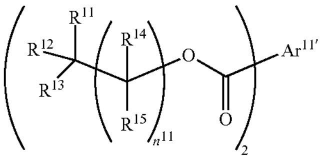

wherein, in Formula (1-A), $Ar^{11'}$ represents a divalent aromatic group, with the proviso that the divalent aromatic group is optionally substituted with at least one selected from the group consisting of an alkyl group, a halogen atom, an alkoxy group, an amino group, an alkyl carbonyl group, an aryl carbonyl group, an alkyl ester group and an aryl ester group, $R^{11}$ to $R^{13}$ each independently represent a hydrogen atom, a hydrocarbon group, an alkoxy group, a methylol group, a group of the above Formula (2) or a group of the above Formula (3), wherein at least two of $R^{11}$ to $R^{13}$ are groups of the above Formula (2) or groups of the above Formula (3), $R^{14}$ and $R^{15}$ each independently represent a hydrogen atom, a hydrocarbon group or an alkoxy group, and $n^{11}$ is an integer of 1 or more and 10 or less.

5. The electrophotographic photoreceptor according to claim 1, wherein the polymer further comprises a partial structure having a charge transport ability.

6. The electrophotographic photoreceptor according to claim 5, wherein the partial structure having a charge transport ability is a triarylamine structure.

7. The electrophotographic photoreceptor according to claim 6, wherein a weight ratio of the structure in which at least one carbonyl group is bonded to the aromatic group to the triarylamine structure is 0.2 or more and 4 or less.

8. The electrophotographic photoreceptor according to claim 5, wherein the partial structure having a charge transport ability is a structure of the following Formula (4):

(4)

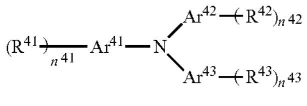

wherein, in Formula (4), $Ar^{41}$ to $Ar^{43}$ represent an aromatic group, $R^{41}$ to $R^{43}$ each independently represent a hydrogen atom, an alkyl group, an alkoxy group, an aryl group, an alkyl halide group, a halogen atom, a benzyl group or a group of the following Formula (5), $n^{41}$ to $n^{43}$ are independently an integer of 1 or more, with the proviso that: when $n^{41}$ is 1, $R^{41}$ is the group of the following Formula (5); when $n^{41}$ is an integer of 2 or more, $R^{41}$ existing of 2 or more may be the same or different, and at least one $R^{41}$ is the group of the following Formula (5);

when $n^{42}$ is an integer of 2 or more, $R^{42}$ existing of 2 or more may be the same or different; and when $n^{43}$ is an integer of 2 or more, $R^{43}$ existing of 2 or more may be the same or different, (5)

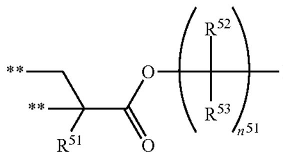

wherein, in Formula (5), $R^{51}$ represents a hydrogen atom or a methyl group, $R^{52}$ and $R^{53}$ each independently represent a hydrogen atom, a hydrocarbon group or an alkoxy group, $R^{54}$ represents a single bond or an oxygen atom, $n^{51}$ represents an integer of 0 or more and 10 or less,

* indicates a bond with $Ar^{41}$ to $Ar^{43}$ in the above Formula (4), and

** indicates a bond with an arbitrary atom.

9. The electrophotographic photoreceptor according to claim 1, wherein the outermost layer further comprises metal oxide particles.

10. An electrophotographic photoreceptor cartridge having the electrophotographic photoreceptor according to claim 1.

11. An image forming apparatus having the electrophotographic photoreceptor according to claim 1.

12. A method for producing an electrophotographic photoreceptor having a plurality of layers comprising at least one outermost layer, comprising polymerizing a compound having a first structure where at least one carbonyl group bonded to an aromatic group and a second structure of the following Formula (A') to form at least one of the outermost layer:

(A')

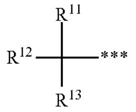

wherein, in Formula (A'), $R^{11}$ to $R^{13}$ each independently represent a hydrogen atom, a hydrocarbon group, an alkoxy group, a methylol group, or a group of the following Formula (2'), wherein at least two of $R^{11}$ to $R^{13}$ are groups of the following Formula (2'), and

* indicates a bond with an arbitrary atom, (2')

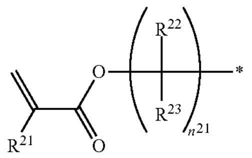

wherein, in Formula (2'), $R^{21}$ represents a hydrogen atom or a methyl group, $R^{22}$ and $R^{23}$ each independently represent a hydrogen atom, a hydrocarbon group or an alkoxy group, and $n^{21}$ is an integer of 1 or more and 10 or less, and

* indicates a bond with a carbon atom to which $R^{11}$ to $R^{13}$ in the above Formula (A') are bonded.

13. The electrophotographic photoreceptor according to claim 1, wherein the aromatic group to which the carbonyl group is bonded in the first structure includes a group derived from benzene.

14. The electrophotographic photoreceptor according to claim 1, wherein the aromatic group to which the carbonyl group is bonded in the first structure includes a group derived from naphthalene.

15. The electrophotographic photoreceptor according to claim 1, wherein the aromatic group to which the carbonyl group is bonded in the first structure includes a group derived from anthracene.

16. The electrophotographic photoreceptor according to claim 1, wherein $R^{21}$ represents the hydrogen atom.

17. The electrophotographic photoreceptor according to claim 1, wherein $R^{21}$ represents the methyl group.

* * * * *